United States Patent
Yamazaki

Patent Number: 5,983,181
Date of Patent: Nov. 9, 1999

[54] METHOD AND APPARATUS FOR READING-OUT/COLLATING A TABLE DOCUMENT, AND COMPUTER-READABLE RECORDING MEDIUM WITH PROGRAM MAKING COMPUTER EXECUTE METHOD STORED THEREIN

[75] Inventor: Nobuhide Yamazaki, Kanagawa, Japan

[73] Assignee: Justsystem Corp., Tokushima, Japan

[21] Appl. No.: 08/984,216

[22] Filed: Dec. 3, 1997

[30] Foreign Application Priority Data

Apr. 14, 1997 [JP] Japan .................................. 9-096157

[51] Int. Cl.[6] ...................................... G10L 5/02
[52] U.S. Cl. .................. 704/260; 704/263; 704/277; 704/278
[58] Field of Search ........................ 704/260, 263, 704/277, 278

[56] References Cited

FOREIGN PATENT DOCUMENTS

| | | |
|---|---|---|
| 3-214196 | 9/1991 | Japan . |
| 4-20996 | 1/1992 | Japan . |
| 4-24715 | 1/1992 | Japan . |
| 4-360232 | 12/1992 | Japan . |
| 5-46607 | 2/1993 | Japan . |
| 6-337876 | 12/1994 | Japan . |
| 7-200546 | 8/1995 | Japan . |
| 7-200554 | 8/1995 | Japan . |
| 8-171395 | 7/1996 | Japan . |
| 8-263089 | 10/1996 | Japan . |

Primary Examiner—David R. Hudspeth
Assistant Examiner—Daniel Abebe
Attorney, Agent, or Firm—McDermott, Will & Emery

[57] ABSTRACT

The table document preparation module prepares a table document containing cells, the read-out attribute setting module sets a read-out attribute specifying a way of reading-out cell data supplied through the setting screen from the table document preparation module being assisted by the setting display module, and voice-generating data generation module generates voice-generating data for the table document according to the way of reading out specified by the read-out attribute, and the voice synthesis module synthesizes voices according to the voice-generating data.

39 Claims, 49 Drawing Sheets

FIG.5A
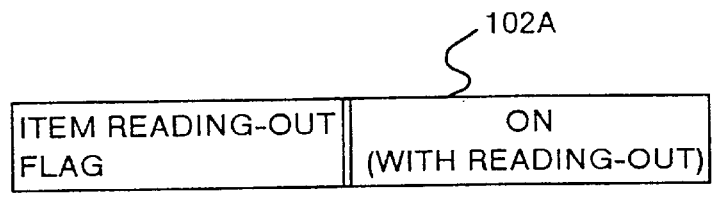
FIG.5B
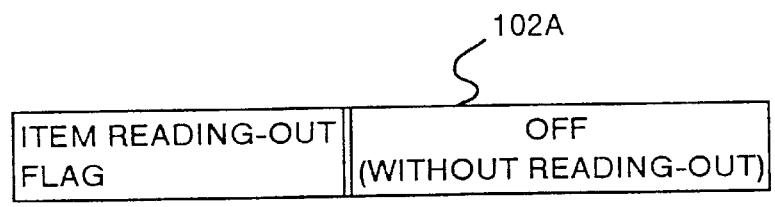
FIG.6
| CELL AS OBJECT | WAY OF READING OUT CHARACTER STRING |
|---|---|
| (2,A) ~ (2,C) | TOKYO, FINE, 19° |
| (3,A) ~ (3,C) | OSAKA, CLOUDY, 18° |

FIG.9

| FILE NAME | CELL AS OBJECT | READ-OUT ATTRIBUTE |
|---|---|---|

| ITEM | UNIT | WAY OF READING |
|---|---|---|
| DATE | DAY | NICHI |
| | MONTH | GATSU |
| | YEAR | NEN |
| TIME | SECOND | BYO |
| | MINUTE | FUN |
| | O'CLOCK | JI |
| · | · | · |
| · | · | · |
| · | · | · |

FIG.13

| FILE NAME | FILE-A | 203 |
|---|---|---|
| CELL AS OBJECT | (2,C) ~ (4,C) | |
| READ-OUT ATTRIBUTE | DATE : dd-mm-yy | |

FIG.14

| CELL AS OBJECT | WAY OF READING OUT CHARACTER STRING |
|---|---|
| (2,C) | '60, APRIL, 1ST. |
| (4,C) | '70, OCTOBER, 5TH. |
| (3,C) | '50, AUGUST, 10TH. |

FIG.23A

READ-OUT  RANGE — 1C31, 1C32

| 地域 | 天気 | 最高気温 |
|---|---|---|
| 東京 | 晴れ | 19.0° |
| 大阪 | くもり | 18.0° |
| 鹿児島 | 晴れ | 19.5° |

READ-O | RANGE
1. READ-OUT DIRECTION
   ○ COLUMN
   ● ROW
2. READ-OUT RANGE
[SET] [STOP]

| 地域 | | |
| 東京 | | |
| 大阪 | くもり | 18.0° |
| 鹿児島 | 晴れ | 19.5° |

IN THE PROCESS OF READING-OUT
[SET]

| 地域 | | 温 |
| 東京 | 晴れ | 19.0° |
| 大阪 | くもり | 18.0° |
| 鹿児島 | 晴れ | 19.5° |

SS3

TOKYO, FINE, 19°
KAGOSHIMA, FINE, 19.5°

307

| CELL AS OBJECT | WAY OF READING CHARACTER STRING |
|---|---|
| ROW 1 : (2,A)~(2,C) | TOKYO, FINE, 19° .0. |
| ROW 2 : (4,A)~(4,C) | KAGOSHIMA, CLOUDY, 19.5° |

| CELL AS OBJECT | WAY OF READING CHARACTER STRING |
|---|---|
| COLUMN 1 : (2,A)~(4,A) | TOKYO, OSAKA, KAGOSHIMA. |
| COLUMN 2 : (2,C)~(4,C) | 19° .0, 18° .0, 19.5° |

FIG.28

| TYPES | CONVERSION RULES |
|---|---|
| READING IN ENGLISH | 日→SUNDAY‥10月→OCTOBER‥/→SLASH ⋯ |
| READING FOR NUMERALS 1 | 1→HITOTSU, 2→FUTATSU, ⋯ 20→FUTAJU ⋯ |
| READING FOR NUMERALS 2 | "0" BETWEEN SUCCESSIVE NUMBERS IS PHONETICALLY CONVERTED TO "TONDE" |
| READING FOR DAY OF THE WEEK 1 | 日→NICHIYOBI, 月→GETSUYOBI ⋯ |
| READING FOR DAY OF THE WEEK 2 | 日→NICHIYO, 月→GETSUYO ⋯ |
| READING FOR SCORE | 1→ITTEN, 2→NITEN ⋯ 10→JUTTEN ⋯ |
| READING FOR TEL No. AND ADDRESS | "—" IS PHONETICALLY CONVERTED TO "NO" |
| ⋮ | ⋮ |

| CELL AS OBJECT | SETTING DICTIONARY |
|---|---|
| COLUMN 1 : (2,A)~(4,A) | READING FOR DAY OF THE WEEK 1 |
| COLUMN 2 : (2,B)~(4,B) | READING FOR SCORE |
| COLUMN 3 : (2,C)~(4,C) | READING FOR SCORE |

41

| | |
|---|---|
| POINTING OF CELL AS OBJECT FOR BEING READ OUT (CURSOL DISPLAY POSITIION) | ( i,j ) |
| POSITION AT WHICH CELL-MOVEMENT IS STOPPED | ( i,j ) |
| POSITION AT WHICH CELL-MOVEMENT RESUMED | ( i-1,j ) or ( i,j-1 ) |
| DIRECTION OF CELL-MOVEMENT | COLUMN OR ROW |

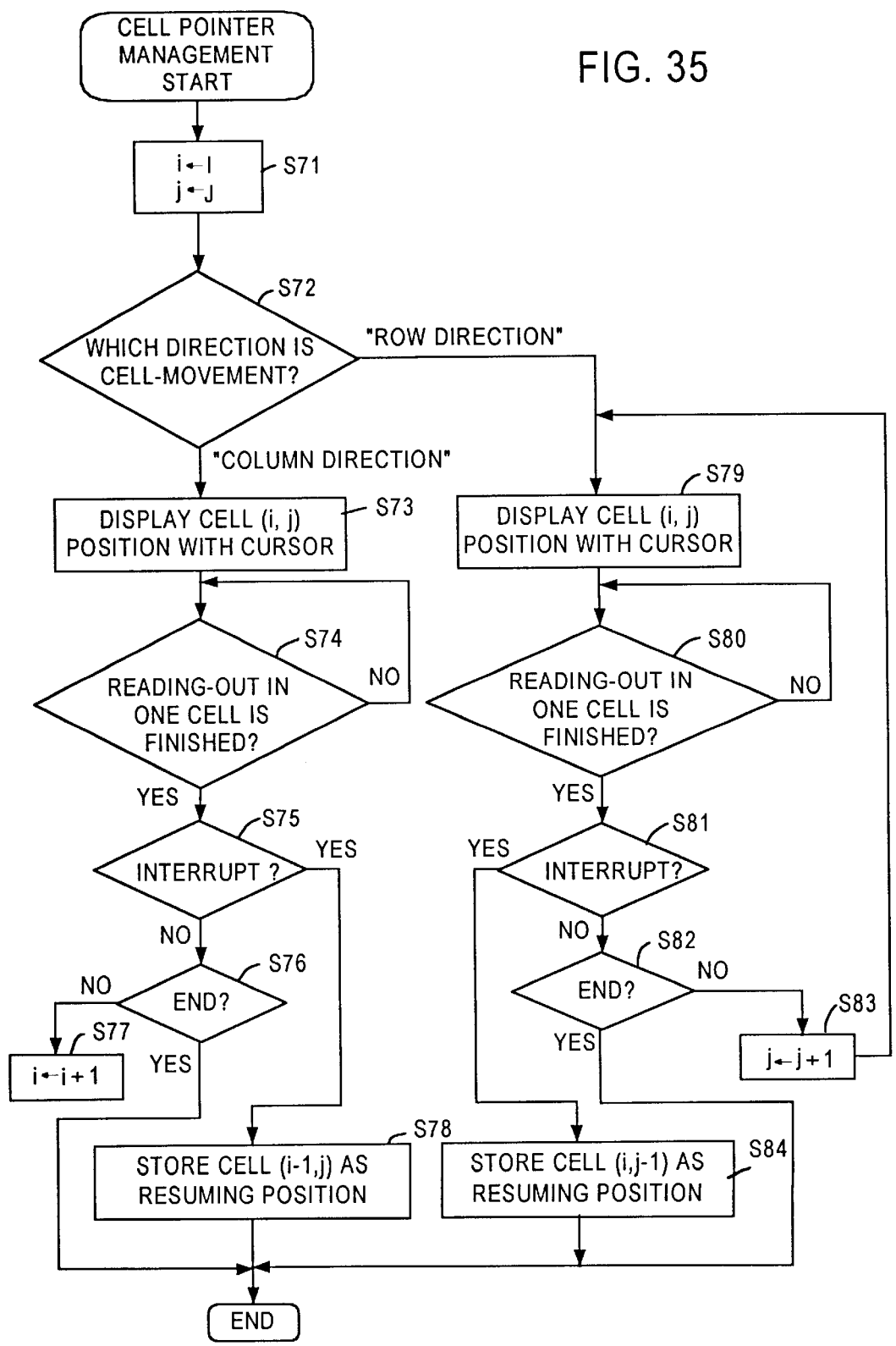

FIG.36A

| (1,A) | (1,B) | (1,C) | (1,D) |
|---|---|---|---|
| (2,A) | (2,B) | (2,C) | (2,D) |
| (3,A) | (3,B) | (3,C) | (3,D) |
| (4,A) | (4,B) | (4,C) | (4,D) |

FIG.36B

| | | | |
|---|---|---|---|
| | | | |
| | | (2,C) | |
| | | | |
| | | | |

FIG.36C

| | | | |
|---|---|---|---|
| | | | |
| | (2,B) | | |
| | | | |
| | | | |

FIG.40A
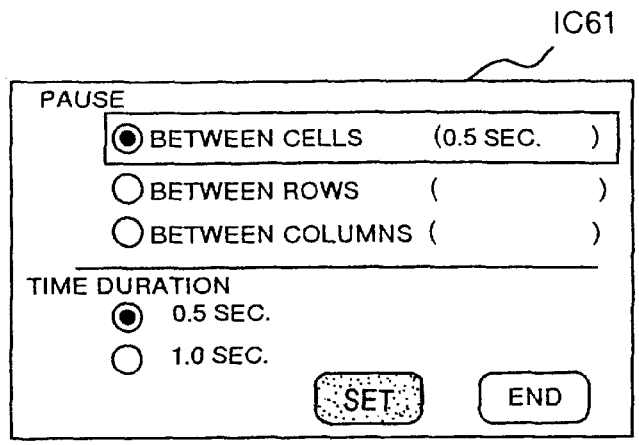
FIG.40B
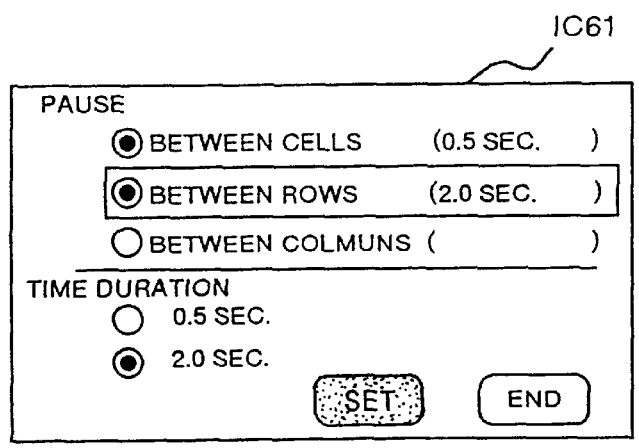
FIG.41
| OBJECT FOR BEING PAUSED | BETWEEN CELLS | BETWEEN ROWS | BETWEEN COLUMNS |
|---|---|---|---|
| PAUSE TIME DURATION | 0.5 SEC. | 2.0 SEC. | — |

```
EFFECT SOUND
    ⦿ BETWEEN CELLS    ( SOUND  )
    ○ BETWEEN ROWS     (        )
    ○ BETWEEN COLUMNS (        )
TYPE    ⦿ SOUND
        ○ MESSAGE
                    [SET]  [END]
```

```
EFFECT SOUND
    ⦿ BTWEEN CELLS     ( SOUND   )
    ⦿ BETWEEN ROWS     ( MESSAGE )
    ○ BETWEEN COLUMNS (         )
TYPE    ○ SOUND
        ⦿ MESSAGE
                    [SET]  [END]
```

| OBJECT FOR EFFECT SOUND | BETWEEN CELLS | BETWEEN ROWS | BETWEEN COLUMNS |
|---|---|---|---|
| TYPE OF EFFECT SOUND | SOUND | MESSAGE | — |

FIG.50A

| (1,A) | (1,B) | (1,C) | (1,D) |
| (2,A) | (2,B) | (2,C) | (2,D) |
| (3,A) | (3,B) | (3,C) | (3,D) |

FIG.50B

| (1,A) | (1,B) | (1,C) | (1,D) |
| (2,A) | (2,B) | (2,C) | (2,D) |
| (3,A) | (3,B) | (3,C) | (3,D) |

FIG.50C

| (1,A) | (1,B) | (1,C) | (1,D) |
| (2,A) | (2,B) | (2,C) | (2,D) |
| (3,A) | (3,B) | (3,C) | (3,D) |

FIG.52A

| BRANCH OFFICE NAME | SALES IN PREVIOUS YEAR | TARGET SALES IN CURRENT YEAR |
|---|---|---|
| TOKYO BRANCH | 50,000,000 | |
| OSAKA BRANCH | 60,000,000 | |

READING-OUT (IC91)

IN THE PROCESS OF READING-OUT (STOP) — IC92

| 支店名 | 前年度売上げ | 本年度目標 |
|---|---|---|
| 東京支店 | 50,000,000 | |
| 大阪支店 | 60,000,000 | |

SS9, 105

TOKYO BRANCH, FIFTY MILLION, PEEE.
OSAKA BRANCH, SIXTY MILLION, PEEE.

106

| FILE NAME | FILEA |
|---|---|
| CELL AS OBJECT | (2,C) ~ (4,C) |
| DISPLAY ATTRIBUTE | DATE : dd-mm-yy |

403

1

METHOD AND APPARATUS FOR READING-OUT/COLLATING A TABLE DOCUMENT, AND COMPUTER-READABLE RECORDING MEDIUM WITH PROGRAM MAKING COMPUTER EXECUTE METHOD STORED THEREIN

FIELD OF THE INVENTION

The present invention relates to a method and apparatus for reading-out/collating a table document obtained through processing such as spread-sheet processing phonetically and a computer-readable recording medium with a program stored therein for making a computer executed the method.

BACKGROUND OF THE INVENTION

In association with remarkable development in the field of computer software, it has become possible to generate on a computer a table document in which a plurality of cells are arrayed in row and column directions and obtain a desired result of spreadsheet computing by giving data such as a computing formula or a numerical value to each cell constituting the table document.

Also in recent years, it has become possible to realize a text-voice synthesizing technology for reading out a text phonetically using a software, and by combining this software for synthesizing voices for a text with the software for spreadsheet computing described above, it is possible to read out a table document on a computer for the purpose of checking or correcting the input data.

To read out the table document, as shown in FIG. 60, a combination of three functions, namely a spreadsheet computing module 90 (spreadsheet computing software), a buffer module 91 (for temporally storing character information), and a text-voice synthesizing module 92 (software for synthesizing voice for a text) are required.

With the spreadsheet computing module 90, which is a first function, by operating the keys a table document is prepared and displayed on the screen. To read a table document, the table document prepared by the spreadsheet computing module 90 is temporally stored as character information for display in the buffer module 91 which is a second function. The table document prepared with the spreadsheet computing module 90 is sent via the buffer module 91 to the text-voice synthesizing module 92. In the text-voice synthesizing module 92, voice synthesis is executed according to the received table document, namely the character information for display. As a result, the table document is read out.

Generally, as only minimum required information is inputted into a cell, additional information such as, for instance, a unit is not appended to the numerical value displayed in each cell, although, on a display screen, it is possible to understand the hidden information such as a unit from a title (item name) of a row or a column.

However, when a table document is phonetically outputted, data in each cell of the table document is sent to the text-voice synthesizing module 92 in a form of character information for display, so that a character string displayed in each cell is read out as it is. For this reason, if a character string is a numerical value, it is difficult to determined whether it is an amount of money, a date, or any other value with a unit, and if checking is executed without understanding the relation between an item and each numerical value, finding out an error becomes more difficult as compared to a case where output on the display screen is checked.

2

As an analogous technology, the inventions disclosed in Japanese Patent Laid-Open Publication No. HEI 4-20996, Japanese Patent Laid-Open Publication No. HEI 4-24715, and Japanese Patent Laid-Open Publication No. HEI 5-46607 that teaches a better way of understanding the words or numerical values when read out. These publications disclose a technology for phonetically outputting the format information additionally such as an item name or a unit corresponding to a character string such as a word or a numerical value.

In the technology as disclosed in the publications above, when a character string displayed in a cell is read out, an item name or a unit corresponding to the character string is additionally read out, it becomes easier for listeners to understand a item name or a unit (such as a measure) to which a character string belongs, however, as far as an item name is concerned, it becomes odd information when only collation by reading out is required, and this odd information gives the listener an unnecessary load while phonetically understanding the information, and when the character string is a numerical value, the arrangement of figures in the character string or the number of figures can be understood, but if a position, where a unit is inserted into a character is not correct, the numerical value becomes information having a completely different meaning, which makes it difficult to correctly collate a table document by reading out.

SUMMARY OF THE INVENTION

It is an object of the present invention to obtain a method and apparatus for reading-out/collating a table document which can realize correct collation of a table document by reading out the table document with simple operations, and a computer-readable recording medium with a program for making a computer execute the method recorded therein.

With the present invention, data in each cell in a table document is correlated to each other in a pre-specified reading-out direction, and phonetic output is obtained according to the correlated data, so that only the minimum information required for collation by reading it out is read out and redundant information is prevented from being read out; whereby it is possible to realize flexible collation of a table document by reading it out intended by user with simple operations.

With the present invention, if two or more items are same, then, a voice-generating data based on item information indicating that the items are same is selectively inserted at the head of the voice-generating data in these items, so that the voice-generating data is read out in combination with an item and contents of the item; whereby it is possible to additionally output item data in collation of a table document by reading it out.

With the present invention, a reading-out attribute restriction on how a character string in a cell is to be read out is set, and a table document is phonetically outputted by generating voice-generating data according to a way of reading out a character string restricted by the reading-out attribute, so that a character string is not read out in the order of the characters as it is, but is read out with a style suited to required collation by reading out; whereby it is possible to realize efficient collation of a table document by reading it out with simple operations.

With the present invention, a unique unit is attributed to the voice-generating data in each cell, so that not only a style suited to collation by reading out can be obtained, but also addition of only minimum elements required for better understanding by a listener is necessary; whereby it is possible to realize efficient collation of a table document by reading out with simple operations.

With the present invention, one or a plurality of places for phonetically reading out a displayed table document are specified, and phonetic output of the table document is executed within the specified places, so that only cells requiring collation are read out; whereby it is possible to realize flexible collation of a table document by reading out intended by a user with simple operations.

With the present invention, a way of reading out each character is specified according to a type of the character and phonetic output of the character is obtained according to the specified way of reading out, so that the way of reading the characters can be customized for each user; whereby it is possible to make more flexible collation of a table document by reading out.

With the present invention, the position of a cursor for indicating the place where the data is to be inputted is moved to a cell position for which the data is currently being phonetically outputted in association with phonetic output, and if phonetic output is interrupted, then the cursor is returned to a cell which is at least one cell before the current cell position, so that it is possible to account for the time lag between the timing for recognizing an error in inputted data and timing for interrupting the operation of reading out for correcting the error; whereby it is possible to reduce the burden on the user for placing the cursor to a position for correction after interruption of a reading-out operation.

With the present invention, during phonetic output, a pause state can be inserted in between either cells, between rows, and between columns, or in between a combination of two or more of the cells, rows and columns, so that it can clearly be understood whether a pause is inserted between cells, between rows, or between columns, and also it is possible to accurately assist grasping change of a position for phonetic output.

With the present invention, duration of the pause in the phonetic output can freely be specified, so that, from the duration of the pause the cells, the rows and the columns can be differentiated, and it is possible to accurately assist in recognizing whether the current position for phonetic output is between cells, between rows, or between columns.

With the present invention, during phonetic output, an effect sound can be inserted, in between either cells, between rows, and between columns, or in a combination of two or more of the cells, rows and columns, so that it is possible to accurately assist in recognizing whether the current position for phonetic output is between cells, between rows, or between columns.

With the present invention, any one type of effect sound out of the many types of effect sounds prepared beforehand can freely be selected, so that, by differentiating the effect sounds for pauses between cells, between rows, and between columns from each other, it is possible to accurately assist recognizing whether the current position for phonetic output is between cells, between rows, or between columns.

With the present invention, a sound, a message indicating a pause, or the like is inserted, so that it is possible to give variations to the effect sounds.

With the present invention, during phonetic output, a cell position to be read out is displayed differently from other cell positions, so that it is possible to visually track a position for phonetic output.

With the present invention, during phonetic output, the cell positions to be read out arrayed in a column direction or a row direction are displayed differently from other cell positions, so that it is easier to visually recognize the reading-out direction.

With the present invention, cursor display is provided for a cell to be read out for different display, so that it is easier to visually recognize a reading-out direction with a cursor.

With the present invention, a display color for a cell to be read out is changed to a color different from the color of the other cells, so that it is easier to visually recognize the reading-out direction from the display color.

With the present invention, the position of a cursor is moved to a cell position for which the data is currently being phonetically outputted, and if phonetic output is interrupted, cursor movement is stopped, and then if phonetic output is resumed, cursor movement is started from the cell position in which the cursor present, and phonetic output is restarted from that cell position, so that a work load involved in resetting the reading-out position after an interruption can be saved, and the burden on the user can be reduced.

With the present invention, an effect sound is generated for blank cell positions, so that it is possible to prevent the blanks from being overlooked.

With the present invention, in a case where identical data is arrayed in the reading-out direction, a voice-generating data indicating the number of times of repetition of the identical data is generated for the identical data portion, so that inefficient processing such as reading out identical data repeatedly can be saved, and it is possible to efficiently read out a table document as a whole.

With the present invention, a display attribute restricting a way of displaying a character string in a cell is set, and phonetic output of a table document is executed by generating voice-generating data according to the way of displaying the character string specified by the display attribute, so that a document data is read out with a style suited to required collation by reading out from a display format set when a table document can be prepared even without setting a specific attribute dedicated to phonetic output; whereby it is possible to realize efficient collation of a table document with simple operations.

A program for executing the method for reading-out/collating mentioned above is stored in the computer-readable recording medium according to the present invention, so that a computer can easily read and execute the program realizing the method.

Other objects and features of this invention will become clear from the following description with reference to the accompanying drawings.

BRIEF DESCRIPTION OF THE DRAWINGS

FIGS. 5A and 5B are the views for explaining a flag state of an item reading-out flag according to the Embodiment 1;

FIG. 6 is a view for explanation of a relation between a cell to be read out and the way of reading it out according to the Embodiment 1;

FIG. 9 is a view for explaining a storage structure of away of reading-out storing section according to the Embodiment 2;

FIG. 10 is a view for explaining a storage structure of an item unit storing section according to the Embodiment 2;

FIG. 13 is a view for explanation of contents stored in the way of reading out storing section according to the Embodiment 2;

FIG. 14 is a view for explanation of a relation between a cell to be read out and the way of reading it out according to the Embodiment 2;

FIGS. 23A to 23C are views for explaining transitions of the display screen when data is read out according to the Embodiment 3;

FIG. 28 is a view for explaining internal configuration of a reading-conversion dictionary section according to the Embodiment 4;

FIG. 35 is a flow chart for explaining operations of the cell pointer management according to the Embodiment 5;

FIGS. 36A to 36C are views for explaining transitions of a cell cursor when data is read out according to the Embodiment 5;

FIGS. 40A and 40B are views for explaining transitions of the display screen when the duration of the pause is set according to the Embodiment 6;

FIG. 41 is a view for explanation of contents stored in a set-pause duration storing section according to the Embodiment 6;

FIGS. 46A and 46B are views for explaining transitions of the display screen when an effect sound is set according to the Embodiment 7;

FIG. 47 is a view for explanation of the contents stored in a set effect sound storing section according to the Embodiment 7;

FIGS. 50A to 50C are views for explaining a cursor display when data is read out according to the Embodiment 8;

FIGS. 52A and 52B are views for explaining a read-out state according to the Embodiment 9;

DESCRIPTION OF THE PREFERRED EMBODIMENTS

Detailed description is made hereinafter for preferred the embodiments of the present invention with reference to the related drawings.

Figure 1:
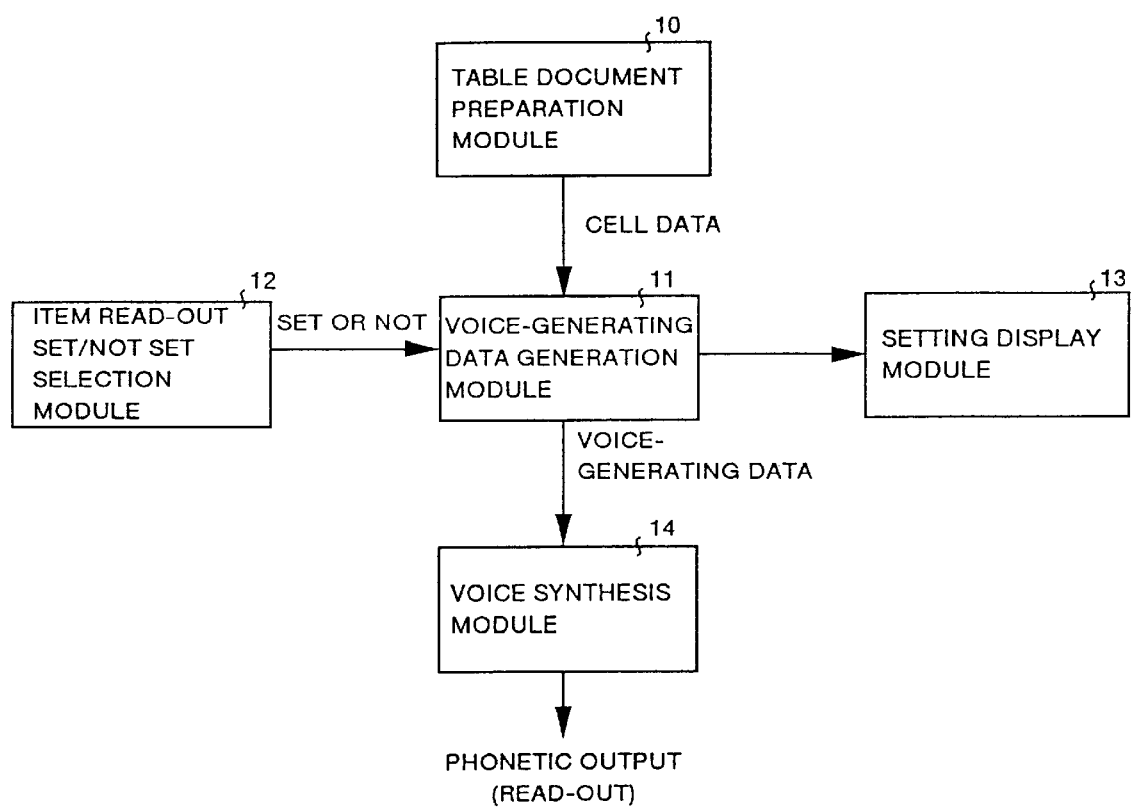
FIG. 1 is a functional block diagram for explaining the internal functions of an apparatus for table document reading-out/collating according to the Embodiment 1 of the present invention.

At first, description is made for the module configuration according to the Embodiment 1 of the present invention. FIG. 1 is a functional block diagram for explaining the internal functions of the apparatus for reading-out/collating of table document according to the Embodiment 1 of the present invention. Herein, a table document indicates a sheet for spreadsheet computing (generally described as a spreadsheet or a work sheet) comprising item names, words, dates, numerical values, and numerical formulae with a plurality of cells arrayed in rows and columns each for inputting therein data indicating a character string.

The module configuration shown in FIG. 1 comprises a table document preparation module 10, a voice-generating data generation module 11, an item read-out set/not-set selection module 12, a setting display module 13, and a voice synthesis module 14. The table document preparation module 10 prepares a table document using known spreadsheet software and outputs cell data including item names and character information in the prepared table document to the voice-generating data generation module 11. It should be noted that item names indicate information expressed by item information, and character information indicates information expressed by input data such as a character string or numerical values or the like inputted in each cell.

The voice-generating data generation module 11 prepares voice-generating data comprising a text with Chinese character(s) and Japanese character(s) mixed therein for outputting voices for item names, words, dates, numerical values, or numerical formulae or the like by inputting the item names and character information prepared by the table document preparation module 10. This voice-generating data indicates the voice-generating data given to each cell for outputting voices for item names and contents of the items in the table document. The voice-generating data generation module 11 also generates voice-generating data with or without item names according to setting or not setting therein reading-out of items instructed from the item read-out set/not-set selection module 12.

The item read-out set/not-set selection module 12 selects whether item names are to be read out or not while a table document is read out and outputs a result of the selection to the voice-generating data generation module 11. The setting display module 13 forms a setting display screen, such as a selection screen for the item read-out set/not-set selection module 12, when voice-generating data is generated by the voice-generating data generation module 11.

The voice synthesis module 14 synthesizes voices based on voice-generating data comprising a text with Chinese character(s) and Japanese character(s) mixed therein inputted from the voice-generating data generation module 11 and outputs voices obtained by the voice synthesis. Namely, the voice synthesis module 14 phonetically reads out the outputting information such as item names, words, dates, numerical values, and numerical formulae or the like each constituting a table document.

With the functional block having the configuration as described above, the table document preparation module 10 prepares a table document correlating cell data indicating item names allocated to each cell with cell data indicating words, dates, numerical values, and numerical formulae or the like each corresponding to the item name, and the voice-generating data generation module 11 correlates words, dates, numerical values, and numerical formulae or the like between cells, for the table document comprising cell data, according to a preset reading-out direction, and generates a series of voice-generating data based on the correlated words, dates, numerical values, and expressions or the like. When the data is to be generated, in a case where "reading-out of items is set" is selected in the item read-out set/not-set selection module 12, the voice-generating data generation module 11 inserts item names corresponding to words, dates, numerical values, or expressions or the like immediately in the beginning respectively to generate a series of voice-generating data.

Also, in a case where "with or without reading-out of item names is selected by the item read-out set/not-set selection module 12, a setting screen for the selection is displayed by the setting display module 13, and the item read-out set/not-set selection module 12 makes decision as to whether items are to be read out or not according to the selecting operation on the setting screen.

As described above, when voice-generating data is generated by the voice-generating data generation module 11, the voice-generating data is outputted to the voice synthesis module 14, and the voice synthesis module 14 executes phonetic output based on the voice-generating data. At that time, in a case where item names are inserted in the voice-generating data, a combination of item names and words (or expressions or the like) is successively read out according to a preset reading-out direction thereof, on the other hand, in a case where item names are not inserted therein, then, the words correlated to a preset reading-out direction are successively read out according to the reading-out direction thereof.

Figure 2:
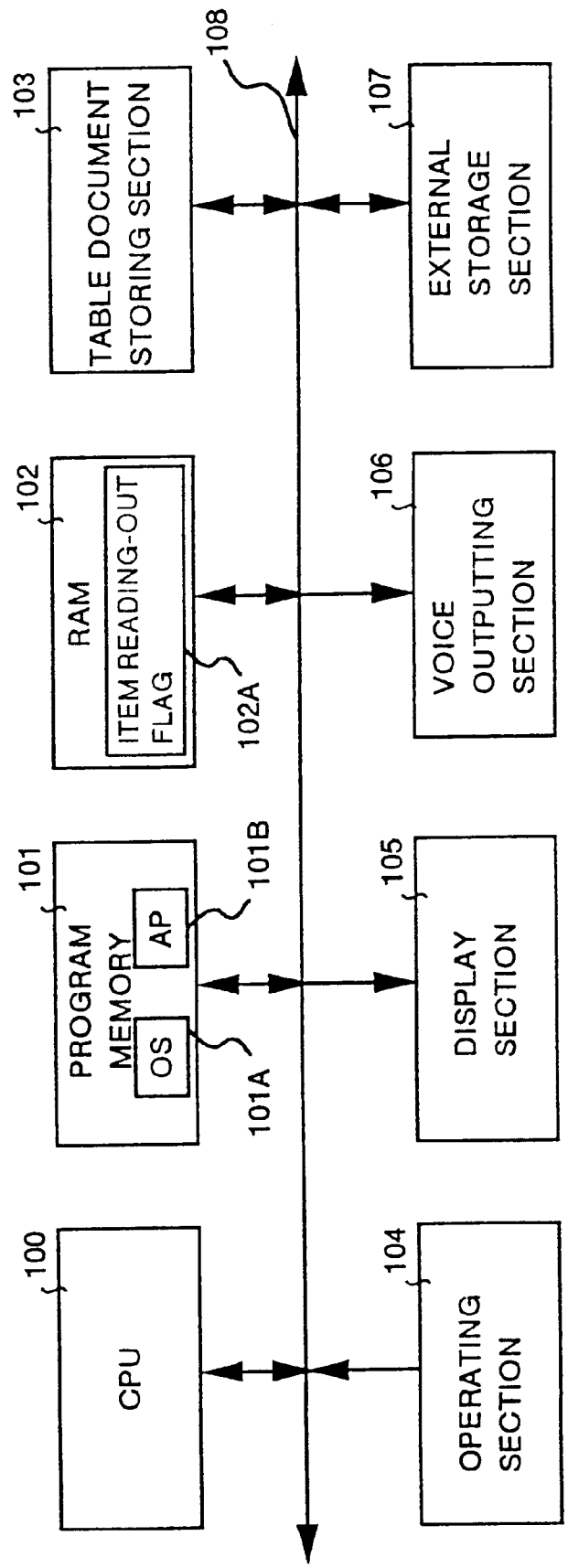
FIG. 2 is a block diagram showing internal configuration of the apparatus for table document reading-out/collating according to the Embodiment 1.

In the next description is made for concrete configuration of the apparatus as an example. FIG. 2 is a block diagram showing internal configuration of the apparatus for reading-out/collating of table document according to the Embodiment 1. The apparatus for reading-out/collating of table document according to the Embodiment 1 comprises, as shown in FIG. 2, units such as a CPU 100, a program memory 101 connected to the CPU 100 by an internal bus 108, a RAM 102, a table document storing section 103, an operating section 104, a display section 105, a voice outputting section 106, and an external storage section 107. It should be noted that the internal bus 108 is a transmission line for transmitting control signals, data, and address signals or the like.

The CPU 100 is a unit for controlling operations of the entire apparatus according to various types of programs stored on the program memory 101. Namely, the CPU 100 controls operations such as execution of the various types of programs stored on the program memory 101, read/write of data from/in the RAM 102, read/write of a table document from/in the table document storing section 103, reception of key-entry from the operating section 104, display on the display section 105, voice output to the voice outputting section 106, and read/write of data from/in the external storage section 107 or the like.

The program memory 101 stores thereon an operating system OS 101A, application programs AP 101B, and various parameters required for operations of the CPU 100. Included in the application programs are programs for realizing functions of the table document preparation module 10, voice-generating data generation module 11, item read-out set/not-set selection module 12, setting display module 13, and voice synthesis module 14. The RAM 102 is used as a work area at the time of execution of the CPU 100 and also provides therein an item reading-out flag 102A to store therein data either with or without reading-out of items selected by the item read-out set/not-set selection module 12.

The table document storing section 103 is a memory for storing thereon cell data constituting a table document prepared by the table document preparation module 10. The operating section 104 provides therein keys and switches for instructing operations such as table document preparation and voice output or the like through key-entry. It should be noted that the operations of the operating section 104 includes a selecting operation by the item read-out set/not-set selection module 12. The display section 105 displays a table document in preparation by the table document preparation module 10 and a selection screen or the like for the item read-out set/not-set selection module 12 by the setting display module 13 according to the control by the CPU 100.

The voice outputting section 106 is a unit comprising an amplifier and a speaker or the like for outputting voice according to the control by the CPU 100. In this voice outputting section 106, a table document voice-synthesized by the voice synthesis module 14 is read out with voices. The external storage section 107 mounts thereon an external storage medium such as a floppy disk or the like to read/write data such as a table document therefrom/therein.

Figure 3:
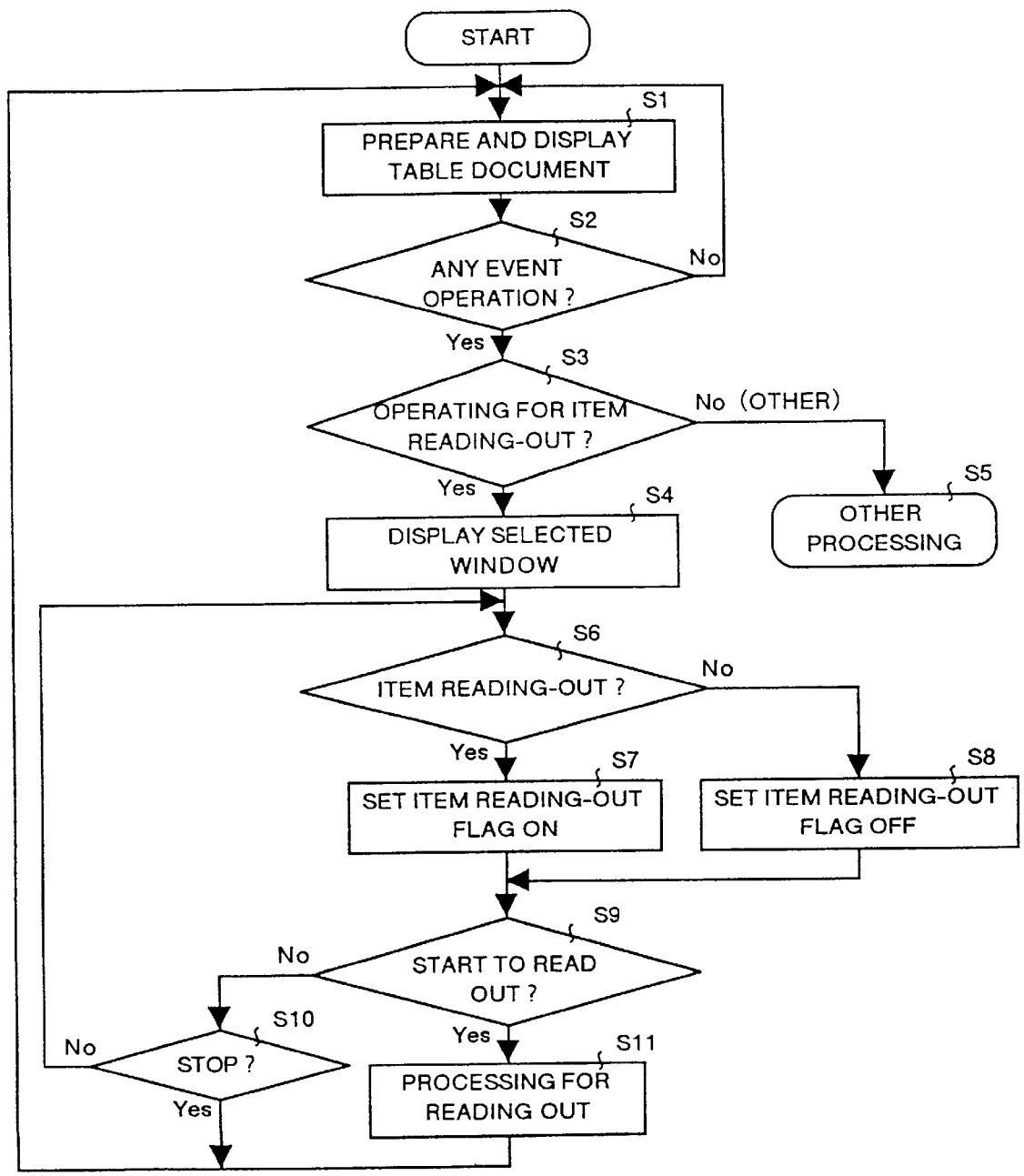
FIG. 3 is a flow chart for explanation of operations according to the Embodiment 1.
Figure 4A:
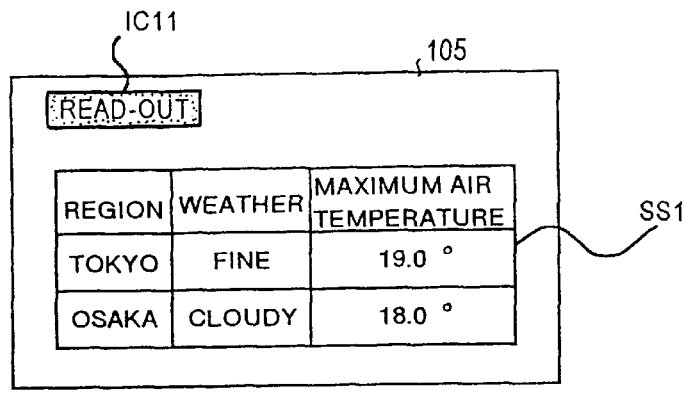
FIGS. 4A to 4C are the views for explaining transitions of the display screen when data is read out according to the Embodiment 1.
Figure 4B:
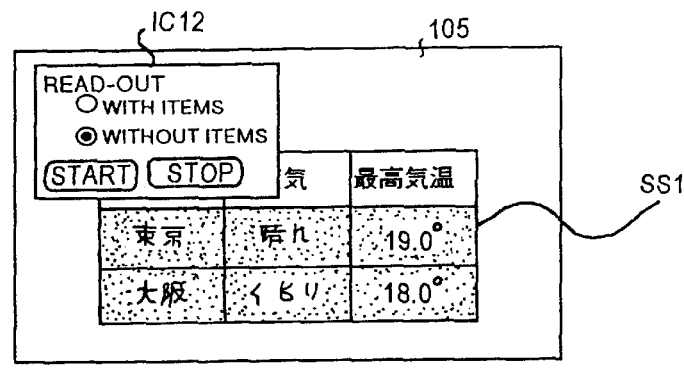
Figure 4C:
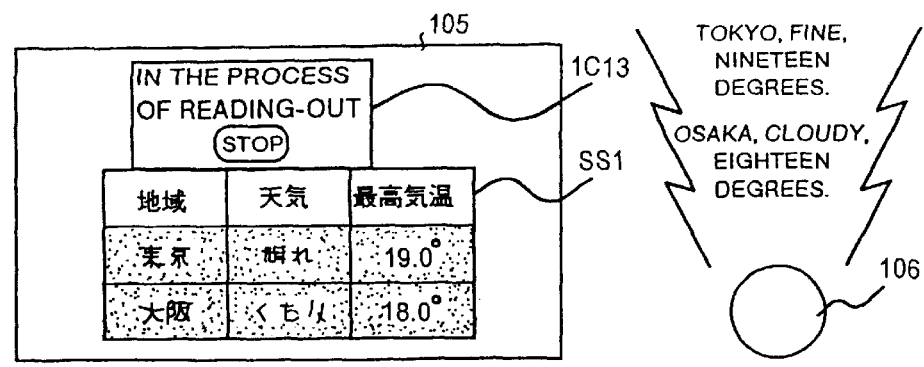

In the next description is made for operations. FIG. 3 is a flow chart for explanation of operations according to the Embodiment 1, FIGS. 4A to 4C are views for explaining transitions of display screen when data is read out, FIGS. 5A and 5B are views for explaining a flag state of an item reading-out flag, and FIG. 6 is a view for explanation of a relation between a cell to be read out and a way of reading it out. It should be noted that description hereinafter is made for operations in the entire modules linked to each other shown in FIG. 1.

During preparation of a table document, an icon IC11 for reading-out for instructing reading-aloud of the table document SS1 is displayed, as shown in FIG. 4A, on the display section 105 together with the table document SS1 being prepared thereon (step S1). The table document SS1 shown in FIG. 4A has items having item names of "Region", "Weather", and "Maximum air temperature". Correlated to a cell indicating "Tokyo" in the item name "Region" are cells indicating "fine" (item name "Weather") and "19.0°" (item name "Maximum air temperature") between the items.

Also, correlated to a cell indicating "Osaka" in the item name "Region" are cells indicating "cloudy" (item name "Weather") and "18.0°" (item name "Maximum air temperature") between the items. "Tokyo" and "Osaka" are contents of the item name "Region", and "fine" and "cloudy" are contents of the item name "Weather". Also, "19.0°" and "18.0°" are contents of the item name "Maximum air temperature".

It should be noted that, in the table document SS1, a cell position for each cell is specified by one of addresses 1, 2, 3 in the column direction as well as by one of addresses A, B, C in the row direction. An address for the cell indicating the item name "Region", for instance, is specified by (1, A). Similarly, an address of the cell indicating contents of the item "18.0°" is specified by (3, C). Cell data as information for each cell originally comprises binary data, however, display of the data is variable according to a display format such as a character string, currencies, or dates or the like given by a user.

Now, in a case where any event operation is detected during preparation of a table document, it is determined whether the event operation is an operation to the icon IC11 for reading-out or some other operation such as an end of preparing the table document (step S2, step S3). As a result, if it is determined that the operation is the operation to the reading-out icon IC11, as shown in FIG. 4B, a window IC12 for reading-out is displayed (step S4). On the other hand, if it is determined that the operation is some other operation such as an end of operation, the processing shifts to step S5 and the determined other processing is executed therein.

Displayed on the window IC12 for reading-out are a click box (both of "with items" and "without items") having buttons for selecting the reading to be "with items" or "without items" when data is read out, a starting button for instructing a start to be read out, and a stop button to stop reading-out. When "with items" is selected in the click box (step S6) after the window IC12 for reading-out is displayed in step S4, the item reading-out flag 102A is set to an ON-state (with reading-out) as shown in FIG. 5A (step S7). Further, when the start button is selected in the above state (step S9), a table document is read out with a combination of item names and words (and some other data as numerical formulae or the like) corresponding to each item (step S11).

On the other hand, when "without items" is selected in the click box (step S6), the item reading-out flag 102A is reset to an OFF-state (without reading-out) as shown in FIG. 5B (step S8). Further, when the start button is selected in the above state (step S9), a table document is read out only with words (and some other data as numerical formulae or the like) (step S11).

When starting operation for reading-out is not detected in step S9 and, on the contrary if a stop button is operated (step S10), the window IC12 for reading-out is closed, the processing returns again to step S1, and the preparation of the table document is continued.

As shown in FIG. 4B, for instance, in a state where "without items" is selected on the window IC12 for reading-out, and in a case where a reading-out direction is a direction of rows, as shown in FIG. 6, two rows of addresses (2, A) to (2, C) and addresses (3, A) to (3, C) are object cells for being read out. A sequence of reading out voice-generating data namely a character string for the addresses (2, A) to (2, C) is "東京 (Tokyo), 晴れ (fine), 19.0°", and a sequence of reading out voice-generating data namely a character string for the addresses (3, A) to (3, C) is "大阪 (Osaka), くもり (cloudy), 18.0°".

When starting of reading out in the above state is instructed, as shown in FIG. 4C, the window IC13 including a message indicating "in reading-out" and the button for stopping the message is displayed, and at first "Tokyo, hare (fine), ju-ku-do (nineteen degrees)." is read out from the voice outputting section 106, then reading-out is executed by being pronounced as "Osaka, kumori (meaning:cloudy), ju-hachi-do (meaning:eighteen degrees).".

It should be noted that, if "without items" is set as a default of the click box from the beginning, the operation shifts to a reading out the items by only selecting the starting button.

As described above, with the Embodiment 1, data between cells of the prepared document is correlated to each other according to a preset reading-out direction and voices are outputted based on the correlated data, so that only minimum information, required for collation between documents and data on a display screen executed by reading it out, is read out, which can prevent redundant reading-out, and with this operation, it is possible to realize reading-out/ collation of table documents with a simple operation, namely collation of documents (a hand-written document or the like) for preparing a table document with the table document on a display screen by being flexibly read out by the apparatus, which is intended by the user, performed in a state in which a user hardly looks at the display.

Especially, in a case where a table document is prepared from documents such as a hand-written account book or the like, and if the operator checks alternately the document and data on the screen for collating the two by reading out the data with voices by an apparatus and also looking at the document, then there is no point in reading the data out with voice by the apparatus and efficiency is also worse due to a loss in time, so that, if the number of objects for collation are made smaller as required like in this the Embodiment 1, the operator can collate inputted contents read out by voice by the apparatus with the documents while concentrating only on the documents.

Also, voice-generating data based on item information indicating the same item is selectively inserted at the head of the voice-generating data of these items, so that reading out is executed in combination of the items and the contents of each item, because of which, it is possible to add items as required when collating the document by reading-out.

In the Embodiment 1, redundant reading-out is prevented by making reading-out simpler, but as explained in the Embodiment 2 below, a table document may be read out in a way that suits for collation by reading-out.

Figure 7:
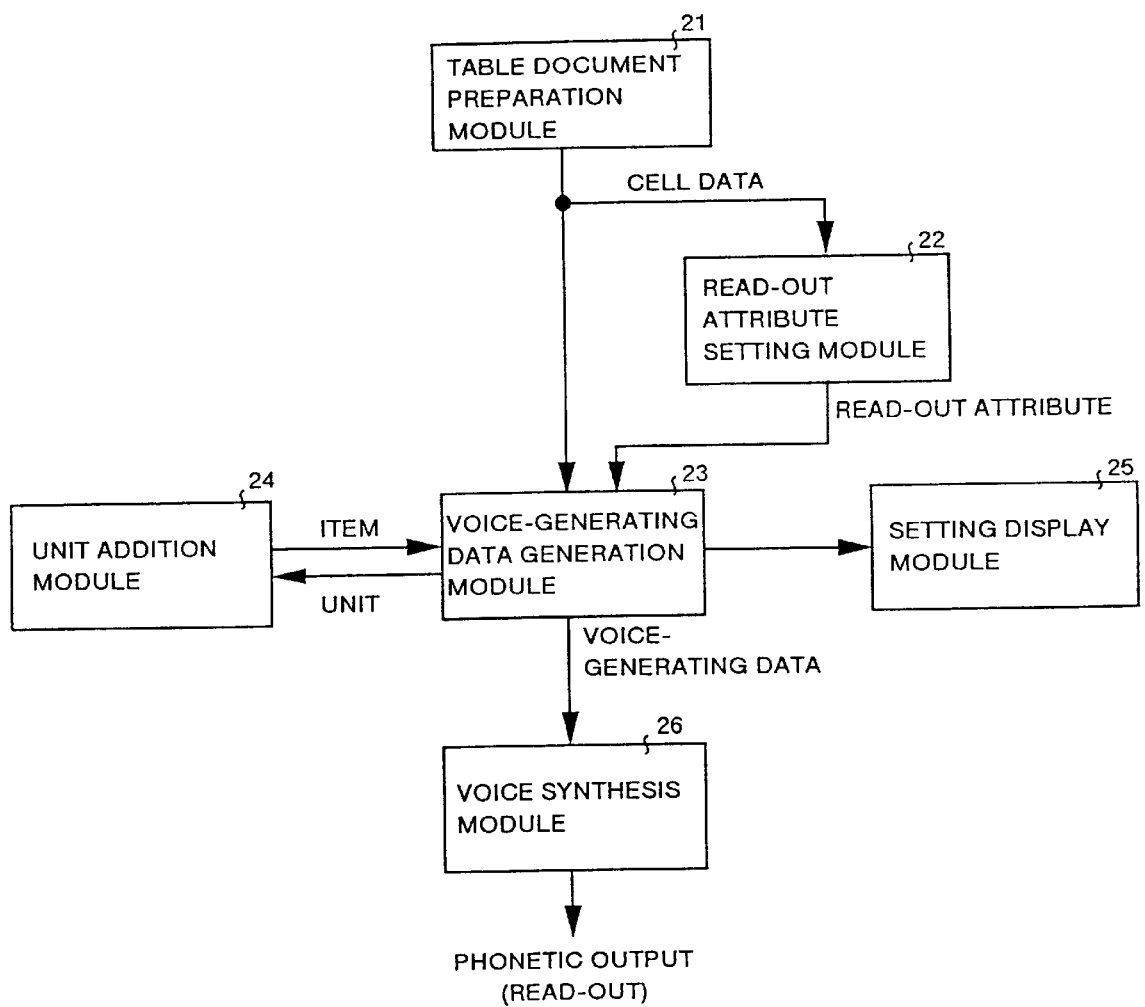
FIG. 7 is a functional block diagram for explaining an internal function of a table document reading-out/collating apparatus according to the Embodiment 2 of the present invention.

At first description is made for module configuration according to the Embodiment 2. FIG. 7 is a functional block diagram for explaining the internal functions of the apparatus for reading-out/collating of table document according to the Embodiment 1 of the present invention. The module configuration shown in FIG. 2 comprises a table document preparation module 21, read-out attribute setting module 22, a voice-generating data generation module 23, a unit addition module 24, a setting display module 25, and a voice synthesis module 26. The table document preparation module 21 prepares a table document using a known spreadsheet software, outputs item names and character information or the like in the prepared table document to the voice-generating data generation module 23, and also outputs the item names and character information to the read-out attribute setting module 22. In this Embodiment 2 also, item names indicate information expressed by item information, and character information indicates information expressed by input data such as a character string or a numerical value or the like inputted in each cell.

The read-out attribute setting module 22 specifies a way of reading out a character string such as words, dates, numerical values, and numerical formulae or the like in cell data such as the item names and character information received from the table document preparation module 21 as attributes. The attributes specified by this read-out attribute setting module 22 are supplied to the voice-generating data generation module 23 as read-out attributes.

The voice-generating data generation module 23 generates voice-generating data comprising a text with Chinese character(s) and Japanese character(s) mixed therein by specifying a way of reading out data such as item names, words, dates, numerical values, and numerical formulae or the like set by the read-out attribute setting module 22 in the cell data such as item names and character information prepared by the table document preparation module 21. The voice-generating data generation module 23 generates voice-generating data without adding a unit specific to an item according to the item instructed from the unit addition module 24.

The unit addition module 24 requests an item name (a type of item) as an object for adding thereto a unit to the voice-generating data generation module 23 and finds out a unit specific to each item, and responds this unit to the voice-generating data generation module 23. In The Embodiment 2, the unit addition module 24 adds a unit specific to an item to a character string in which read-out attributes are set by the read-out attribute setting module 22, however, addition of the unit thereto may arbitrarily be executed as a discrete function from setting of read-out attributes.

The item setting display module 25 forms a display screen, when voice-generating data is generated by the voice-generating data generation module 23, such as a setting screen for the read-out attribute setting module 22 and a setting screen for the unit addition module 24.

The voice synthesis module 26 voice-synthesizes based on the voice-generating data comprising a text with Chinese character(s) and Japanese character(s) mixed therein inputted by the voice-generating data generation module 23 to output the voices. Namely, the voice synthesis module 26 reads out a table document by outputting voices based on the voice-generating data (item names, words, dates, numerical values, and numerical formulae or the like) generated according to the read-out attributes in the voice-generating data generation module 23.

With the functional blocks configured as described above, the table document preparation module 21 prepares a table document correlating item names allocated to each cell with cell data indicating words, dates, numerical values, and numerical formulae or the like each corresponding to the item name, and the voice-generating data generation module 23 correlates, in the prepared table document, words, dates, numerical values, and numerical formulae or the like between cells according to a preset reading-out direction and generates a series of voice-generating data based on the correlated words, dates, numerical values, and numerical formulae or the like.

When the data is to be generated, the setting display module 25 supports the read-out attribute setting module 22 by displaying a setting screen by, and sets read-out attributes for specifying a way of reading out character information, namely a character string corresponding to an item name supplied from the table document preparation module 21 through the setting screen. It should be noted that it does not matter whether this item name really exists as a cell or not, and the item name plays only a roll of indicating a read-out format (whether it is a word, a data, a numerical value, or expression or the like) when character information (cell data) is to be read-out. Also, each read-out format is further subdivided. For instance, in a cell of "date", there are formats such as dd (day)—mm (month)—yy (year), and mm-dd-yy or the like.

The read-out attributes set as described above are outputted together with cell data to the voice-generating data generation module 23, and voice-generating data in each cell is generated according to the way of reading out the cell data specified in the read-out attributes.

When this voice-generating data is to be generated, the unit addition module 24 supplies, in a case where unit addition is requested from the voice-generating data generation module 23, a unit specific to an item to be added to the corresponding cell data. With this operation, the voice-generating data generation module 23 generates voice-generating data to which a unit specific to an item suited to words, dates, numerical values, and expressions or the like is added.

As described above, when voice-generating data is generated by the voice-generating data generation module 23, the voice-generating data is outputted to the voice synthesis module 26, and the voice synthesis module 26 outputs voices according to voice-generating data based on the way of reading it out specified in the read-out attributes. During the above operation, in a case where units have been added to the voice-generating data, character information in each item is read out with a unit specific to each item, on the other hand, in a case where units have not been added thereto, character information in each item is read out without a unit specific to each item.

Figure 8:
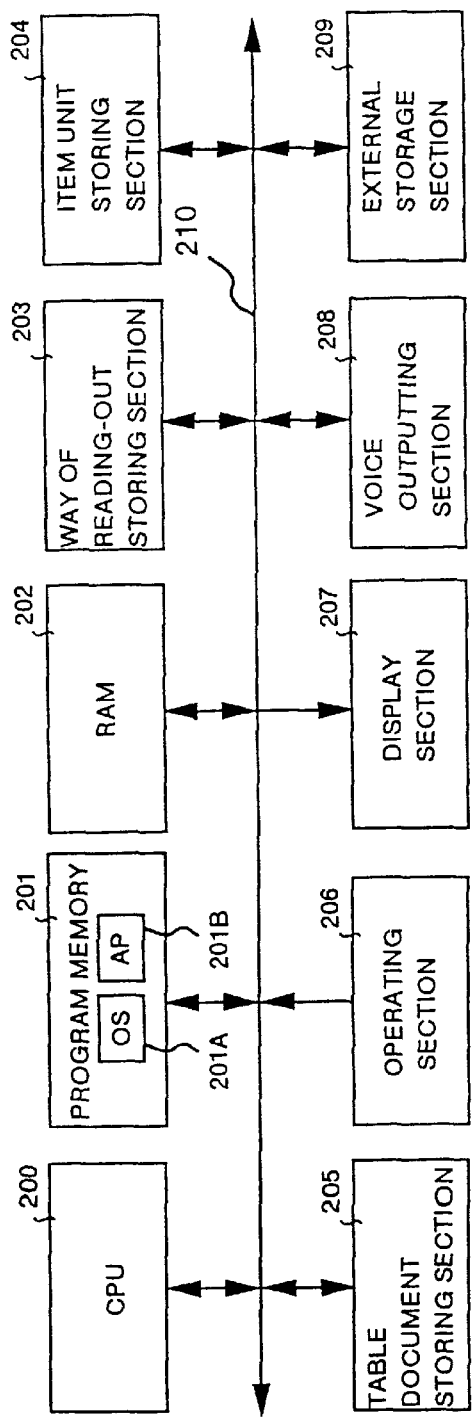
FIG. 8 is a block diagram showing internal configuration of the apparatus for reading-out/collating a table document according to the Embodiment 2.

In the next description is made for the configuration. FIG. 8 is a block diagram showing the internal configurations of the apparatus for reading-out/collating of table document according to the Embodiment 2. The apparatus for reading-out/collating of table document according to the Embodiment 2 comprises, as shown in FIG. 8, units such as a CPU 200, a program memory 201 connected to the CPU 200 by an internal bus 210, a RAM 202, a way of reading-out storing section 203, an item unit storing section 204, a table document storing section 105, an operating section 206, a display section 207, a voice outputting section 208 and an external storage section 209. It should be noted that the internal bus 210 is a transmission line for transmitting control signals, data, and address signals or the like.

The CPU 200 is a unit for controlling operations of the entire apparatus according to various types of programs stored on the program memory 201. Namely, the CPU 200 controls operations such as execution of the various types of programs stored on the program memory 201, reading/writing of data from/in the RAM 102, a way of reading/writing(the read-out attributes as described above) from/in the way of read-out storing section 203, reference of item units when the units are added to the item unit storing section 204, reading/writing of a table data from/in the table document storing section 205, reception of key-entry from the operating section 206, display on the display section 207, voice output to the voice outputting section 208, and reading/writing of data from/in the external storage section 209 or the like.

The program memory 201 stores thereon an operating system OS 201A, application programs AP 201B, and various parameters required for operations of the CPU 200. Included in the application programs are programs for realizing functions of the table document preparation module 21, a read-out attribute setting module 22, a voice-generating data generation module 23, a unit addition module 24, setting display module 25, and voice synthesis module 26. The RAM 202 is used as a work area at the time of execution of the CPU 200.

The way of reading-out storing section 203 is a memory for storing and maintaining thereon read-out attributes set by the read-out attribute setting module 22 according to control by the CPU 200 for each table document file. The item unit storing section 204 is a unit dictionary storing therein units each specific to an item correlated to each type of item, and is referred to when a unit is to be set by the unit addition module 24.

The table document storing section 205 is a memory for storing thereon a table document prepared by the table document preparation module 21. The operating section 206 provides therein keys and switches for instructing operations such as table document preparation and voice output or the like through key-entry. It should be noted that the operations of the operating section 206 includes a setting operation by the read-out attribute setting module 22 or the unit addition module 24. The display section 207 displays a table document in preparation by the table document preparation module 21 and various types of setting screens or the like generated by the setting display module 25 according to the control by the CPU 200.

The voice outputting section 208 is a unit comprising an amplifier and a speaker or the like for outputting voice according to the control by the CPU 200. In this voice outputting section 208, a table document voice-synthesized by the voice synthesis module 26 is read out with voices. The external storage section 209 mounts thereon an external storage medium such as a floppy disk or the like to read/write data such as a table document therefrom/therein.

In the next detailed description is made for the way of reading-out storing section 203. FIG. 9 is a view for explaining a storage structure of the way of reading-out storing section 203. As shown in FIG. 9, the way of reading-out storing section 203 is a memory for storing thereon a cell (cell address in this case) as an object for setting a read-out attribute by correlating a file name to a cell as a minimum unit therefor as well as for storing thereon the read-out attribute for the cell.

This read-out attribute is one for specifying a way of reading out each item, and more specifically, for specifying a sequence of reading characters in a character string in each item. In a case, for instance, where a character string inputted into a cell is a date, there exist a plurality of sequence patterns of dd (day), mm (month), and yy (year). In a case where data for the date of "01-05-96" is inputted in a cell, the date can not correctly be read out, except in a case of coincidence, so far as a sequence of reading day/month/year is not restricted to one format because it might be read out as "96, January, 5th", or as "96, May, 1st", or in some other.

For this reason, by restricting a structure of a character string by read-out attributes to one of sequences of dd-mm-yy, mm-dd-yy, yy-mm-dd, or to some other sequence, it is possible to correctly read out an item of a date.

In the next detailed description is made for the item unit storing section 204. FIG. 10 is a view for explaining a storage structure of the item unit storing section 204. The item unit storing section 204 is, as shown in FIG. 10, a memory storing thereon units correlated to types of items and ways of reading out the units respectively in a dictionary format.

If a type of an item is, for instance, a date, the data is further subdivided into three types of day, month, and year. For this reason, in the case of a date, 日 (pronounced: hi, meaning: a day), 月 (pronounced: gatsu, meaning: a month), 年 (pronounced: nen, meaning: an year) are correlated to "nichi", gatsu", "nen" as phonetic reading respectively. The phonetic reading for the above words is only a basic form, which means there are exceptional readings, for instance, "96 年 (pronounced: kyuju-roku-nen, meaning: year 96) 1 月 (pronounced: ichi-gatsu, meaning: January) 8 日 (pronounced: yoka, meaning: 8th day)" is not pronounced as "kyuju-roku-nen, ichi-gatu, hachi-nichi)", but can be adjusted so that it is correctly pronounced as "kyuju-roku-nen, ichi-gatu, yoka".

If a type of an item is a time, then it is subdivided into three type of second, minute, and hour. Therefore, in the case of the time, as phonetic reading, "byo (meaning: a second)", "fun (meaning: a minute)", and "ji (meaning: o'clock)" are correlated to 秒 (pronounced: byo, meaning: a second), 分 (pronounced: fun, meaning: a minute), and 時 (pronounced: ji, meaning: an hour) respectively. The above phonetic readings are basic forms, so that it is possible to adjust so as to pronounce "1 時 10 分 5 秒 (10 minutes and 5 seconds past 1)" as "ichiji (meaning: one o'clock), juppun (meaning: 10 minutes), gobyo (meanin: 5 seconds)", but not pronounced as "ichiji (meaning: 1 o'clock), ju-fun (meaning: 10 minutes), gobyo (meaning: 5 seconds)".

Figure 11:
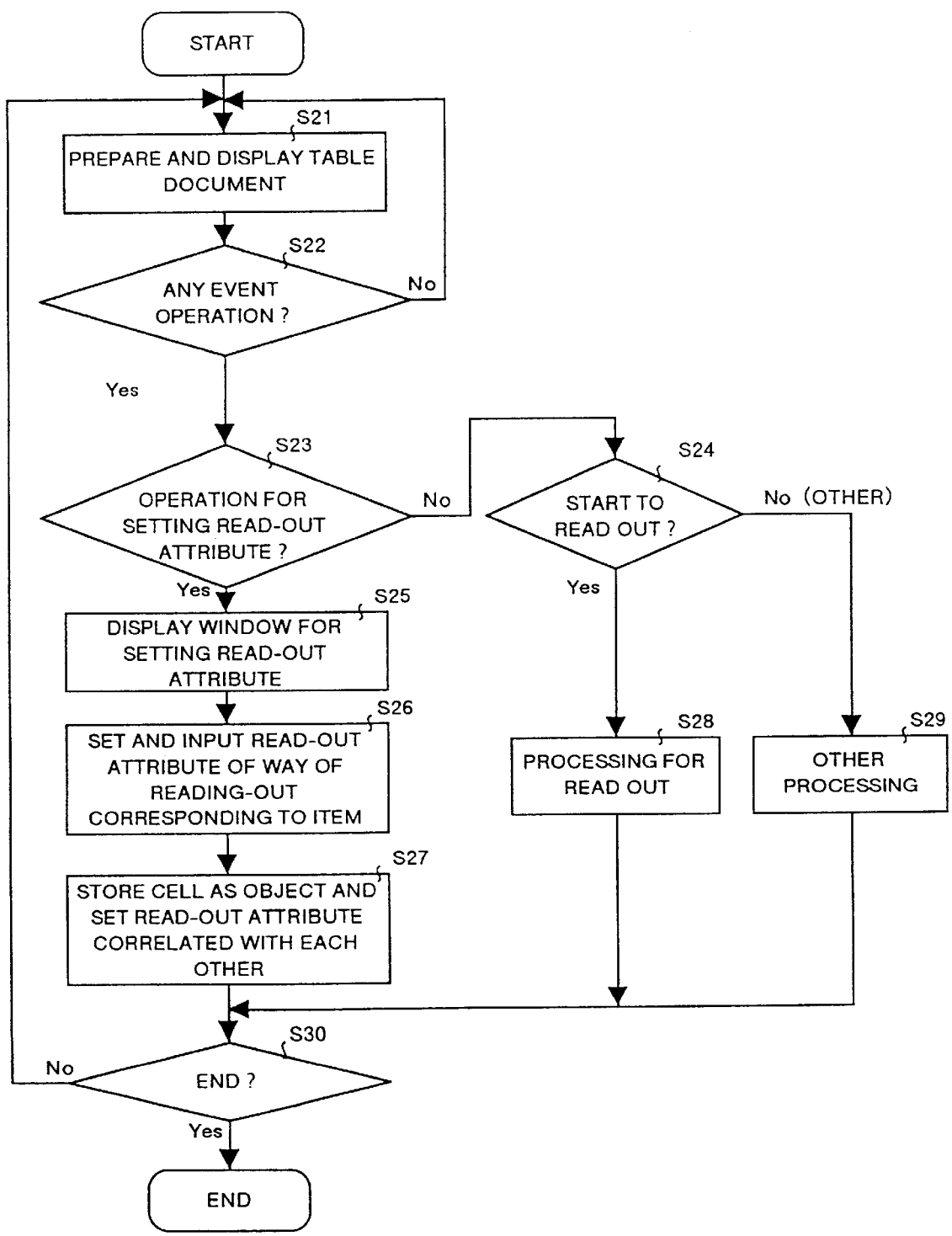
FIG. 11 is a flow chart for explanation of operations according to the Embodiment 2.

In the next description is made for operations. FIG. 11 is a flow chart for explanation of operations according to the Embodiment 2, FIGS. 12A and to 12C are views for explaining transitions of the display screen according to the Embodiment 2 when data is read out, FIG. 13 is a view for explaining contents stored in the way of reading-out storing section 203, and FIG. 14 is a view for explanation of a relation between a cell to be read out and a way of reading it out according to the Embodiment 2. It should be noted that description hereinafter is made for operations in the entire modules linked to each other shown in FIG. 7.

During preparation of a table document, an icon IC21 for reading-out for instructing reading-aloud of the table document SS2 and an attribute icon IC22 for setting the read-out attribute described above are displayed, as shown in FIG. 12A, on the display section 207 together with the table document SS2 being prepared thereon (step S21). The table document SS2 shown in FIG. 12A has item names of "Member No.", "Name of person", and "Date of birth" each of which is set to each item therein. Correlated to a cell indicating "1" in the item name "Member No." are cells indicating "N1" (item name "Name of person") and "01-04-60" (item name "Date of birth") between the items.

Also, correlated to a cell indicating "2" in the item name "Member No." are cells indicating "N2" (item name "Name of person") and "05-10-70" (item name "Date of birth") between the items. Correlated to a cell indicating "3" in the item name "Member No." are cells indicating "N3" (item name "Name of person") and "10-08-50" (item name "Date of birth") between the items. "1", "2", and "3" are item contents of the item name "Member No.", and "N1", "N2", and "N3" are item contents of the item name "Name of person". Also, "01-04-60", "05-10-70", and "10-08-50" are item contents of the item name "Date of birth".

It should be noted that, in the table document SS2, a cell position for each cell is specified by one of addresses 1, 2, 3, 4 in the column direction as well as by one of addresses A, B, C in the row direction. The address of the cell indicating the item name "Member No.", for instance, is specified by (1, A). Similarly, the address of the cell indicating the item contents "10-08-50" is specified by (4, C).

Figure 12A:
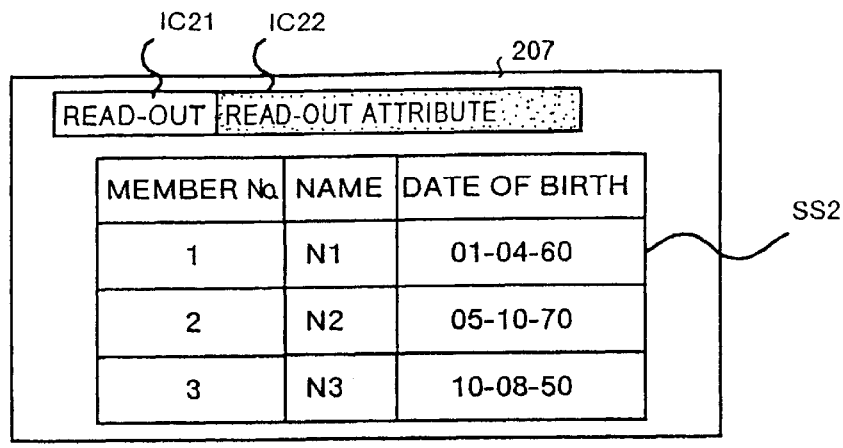
FIGS. 12A to 12C are views for explaining transitions of the display screen when data is read out according to the Embodiment 2.

Now, in a case where any event operation is detected during preparation of a table document (step S22), determination is made as to whether the event operation is an operation to the attribute icon IC22 (step S23), the event operation is an operation to the icon IC21 for reading-out (step S24), or the event operation is some other operation such as an end of preparing the table document. As a result, if it is the operation to the attribute icon IC22, as shown in FIG. 12A, the attribute icon IC22 is displayed, for instance, in a reverse mode (indicated by dots in the figure), and as shown in FIG. 12B, a window IC23 for setting read-out attributes is displayed thereon (step S25).

Displayed on the window IC23 for setting read-out attributes are a click box ("date", "numerical value", "time", and "others") having buttons for setting one or plurality of items as objects for setting read-out attributes, a set button to instruct decision of setting, and a stop button to stop the setting. When "date" is selected in the click box after the window IC23 for setting read-out attributes is displayed in step S25, a click box IC231 for setting a reading sequence on the type of the item "date" is displayed. Displayed on this click box IC231 is, as described above, a reading sequence of characters for the date in a plurality of sequence patterns of dd, mm, yy. In the example shown in FIG. 12B, as a sequence pattern thereof, the first pattern of "dd-mm-yy" is selected.

Figure 12B:
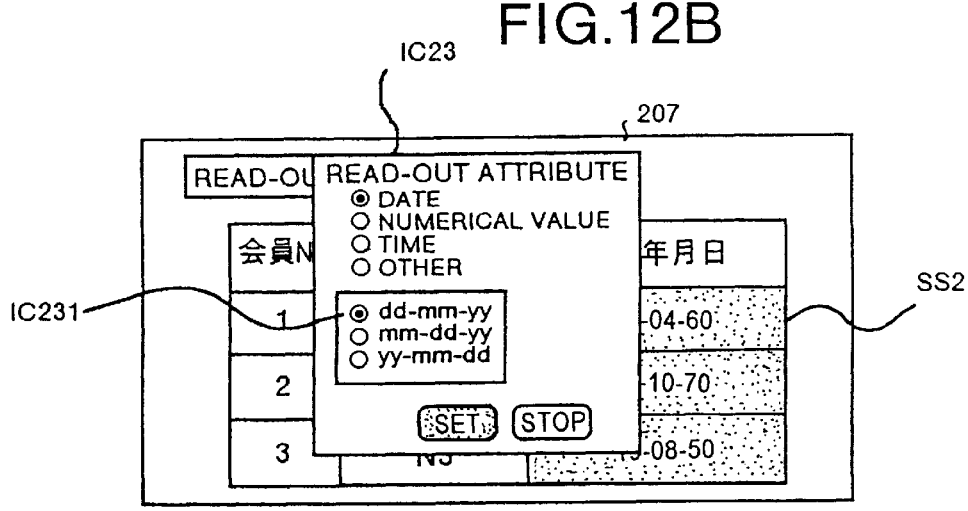

When the set button in the window IC23 for setting read-out attributes is operated in the state shown in FIG. 12B (step S26), the set button is displayed in a reverse mode (indicated by dots in the figure) as shown in FIG. 12B, then a file name "FILE-A", if a table document currently being processed is FILE-A, is stored, as shown in FIG. 13, correlated with cell addresses of cells as objects (2, C), (3, C), (4, C) and read-out attributes "Date: dd-mm-yy" in the way of reading-out storing section 203 (step S27).

It should be noted that cells as objects for setting read-out attributes are previously specified by an input device (included in the operating section 206) such as a mouse or the like (displayed in a reverse mode (indicated by dots in the figure) in FIG. 12B). Also, when the stop button in the window IC23 for setting read-out attributes is operated during setting of read-out attributes in step S26, the window IC23 for setting read-out attributes is closed, and the processing returns again to step S21.

When the reading-out icon IC22 is further operated in the state (step S24), and voice-generating data for a character string corresponding to the cell addresses (2, C), (3, C), (4, C) is generated according to the way of reading out stored in the way of reading-out storing section 203 namely the way of reading out specified in the read-out attributes. When the data is generated, the cell addresses (2, C), (3, C), (4, C)

correspond to a character string of the item "Date" so that the way of reading out the Date in the item unit storing section 204 is automatically referred to, and voice-generating data with reading-out of units is finally generated. Then, the table document is read out (step S28).

In reading-out according to the set read-out attributes shown in FIG. 12B, as shown in FIG. 14, the voice-generating data for the address (2, C) namely the way of reading out the character string thereof is "'60, April, 1st", and the voice-generating data for the address (3, C) namely the way of reading out the character string thereof is "'70, October, 5th", and the voice-generating data for the address (4, C) namely the way of reading out the character string thereof is "'50, August, 10th".

Figure 12C:
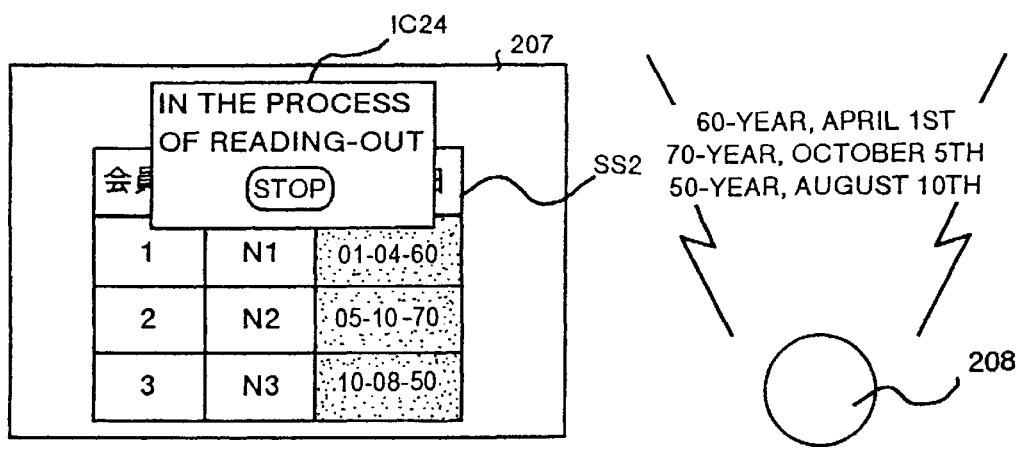

When starting of reading-out is instructed in this state, as shown in FIG. 12C, the window IC24 including a message of "in the process of reading out" and a stop button to stop the message is displayed, and reading-out is executed by the voice outputting section 106 by being pronounced as "Rokuju-nen (meaning: year 60), shi-gatu (meaning: April), tsuitachi (meaning: the 1st). Nanaju-nen (meaning: year 70), ju-gatu (meaning: October), itsuka (meaning: 5th day). Goju-nen (meaning: year 50), hachi-gatu (meaning: August), toka (mesning: the 10th day)".

It should be noted that, in a case where some other operation is detected in step S24, the processing shifts to step S29 and the determined other processing is executed therein to return to step S21 again, but in a case where the determined other processing indicates end of processing, then the processing ends in the step S30.

Figure 15:
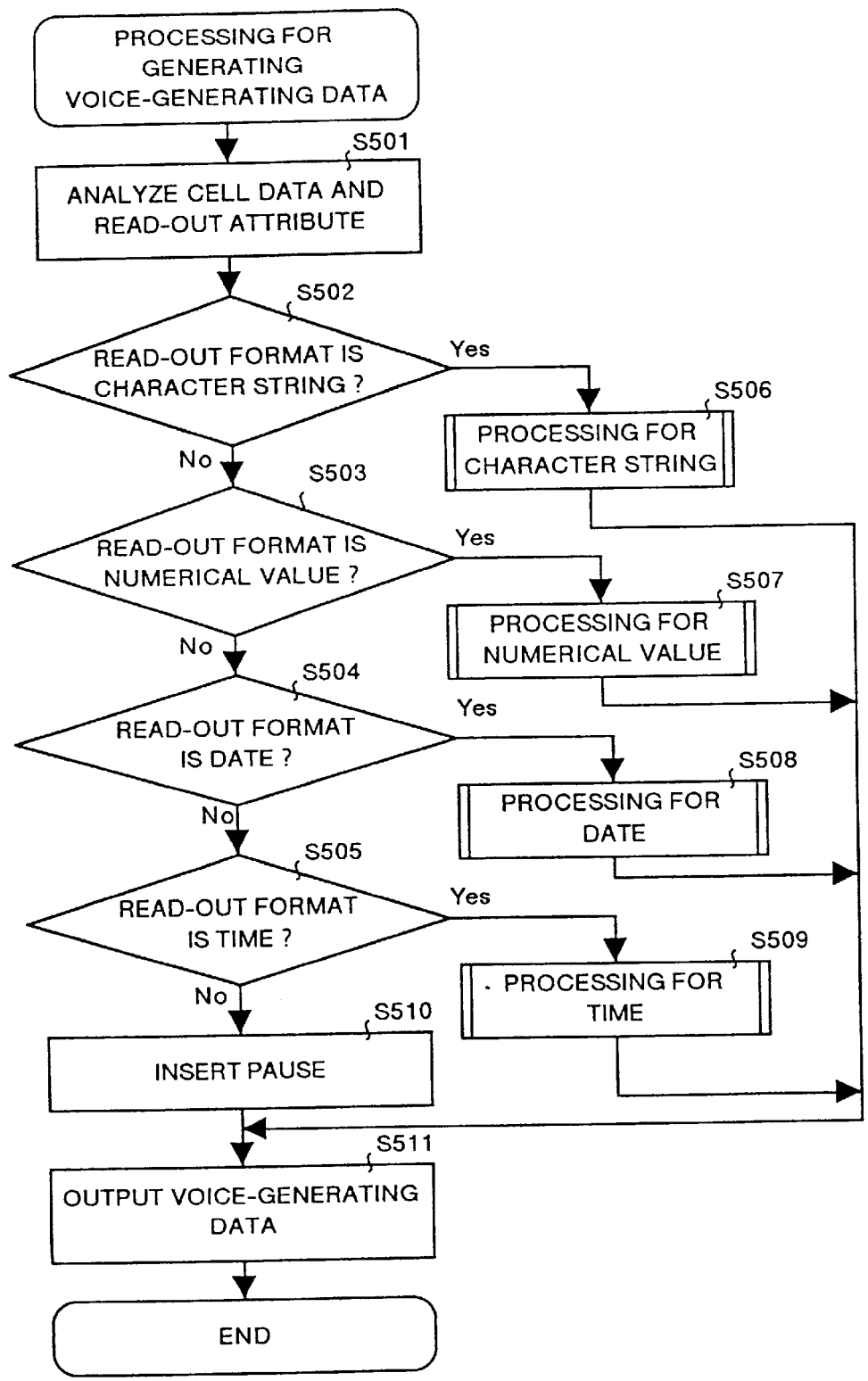
FIG. 15 is a flow chart for explaining generation of voice-generating data according to the Embodiment 2.
Figure 16:
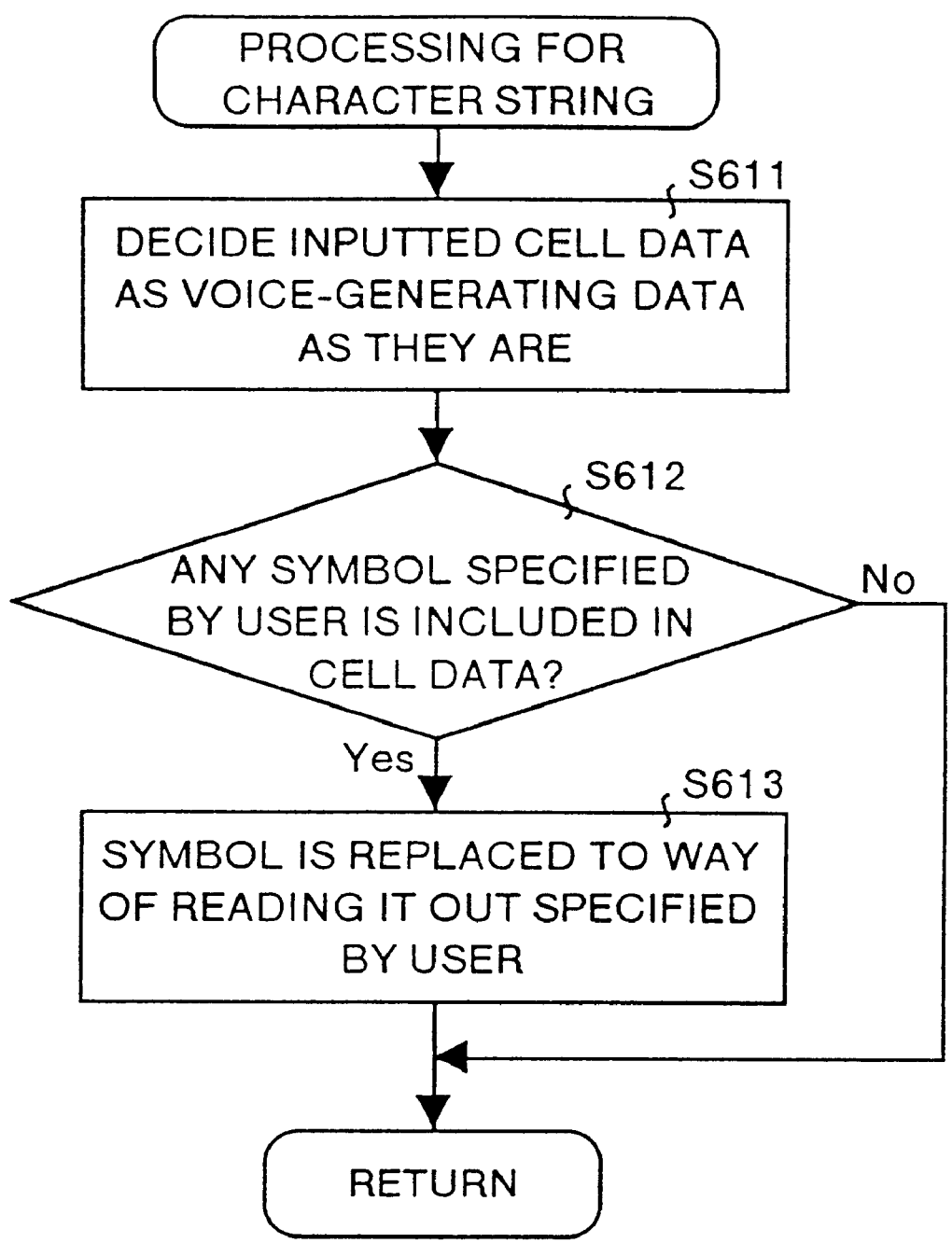
FIG. 16 is a flow chart for explaining the processing of a character string in the generation of voice-generating data.
Figure 17:
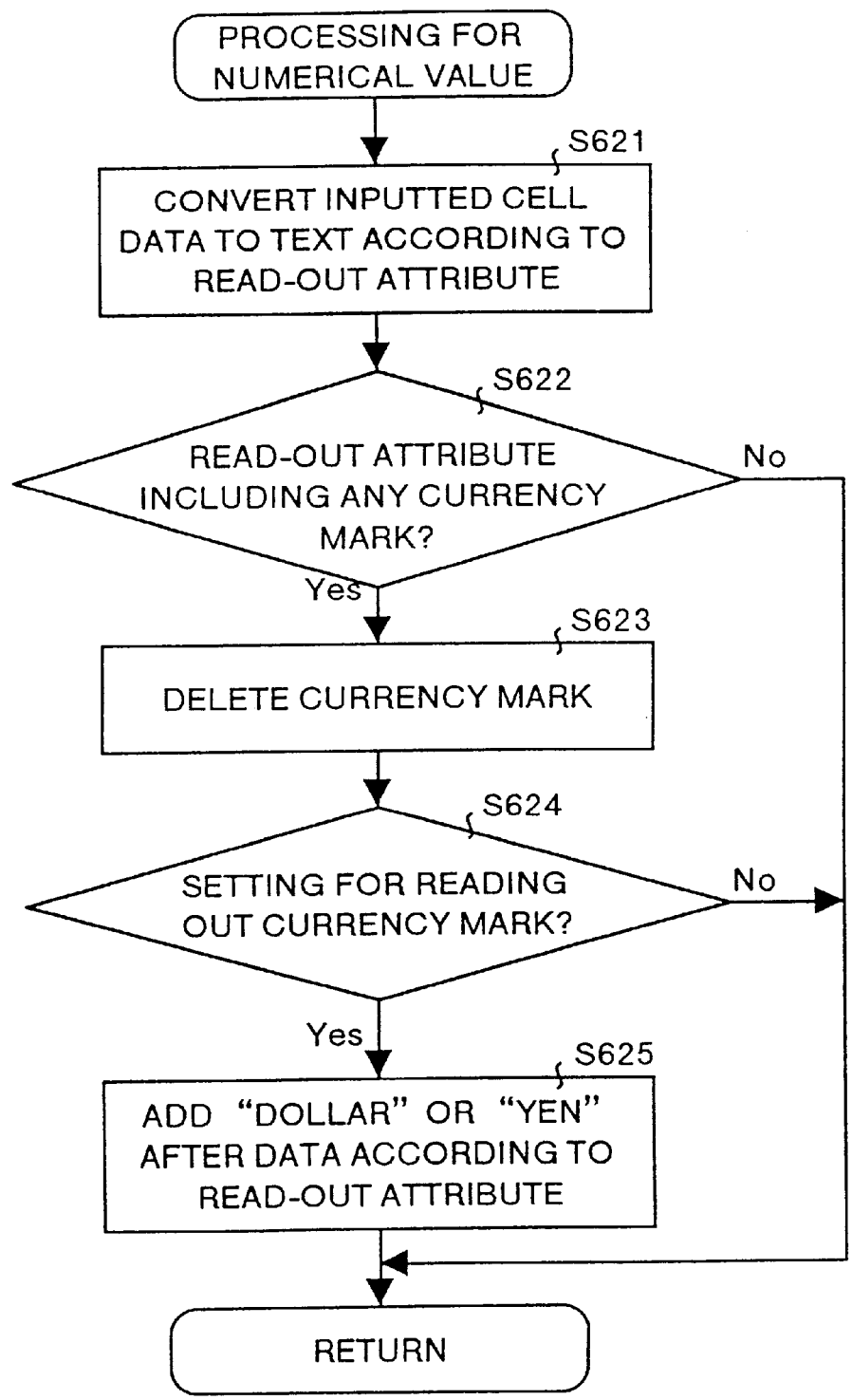
FIG. 17 is a flow chart for explaining processing of numerical values in the generation of voice-generating data.
Figure 18:
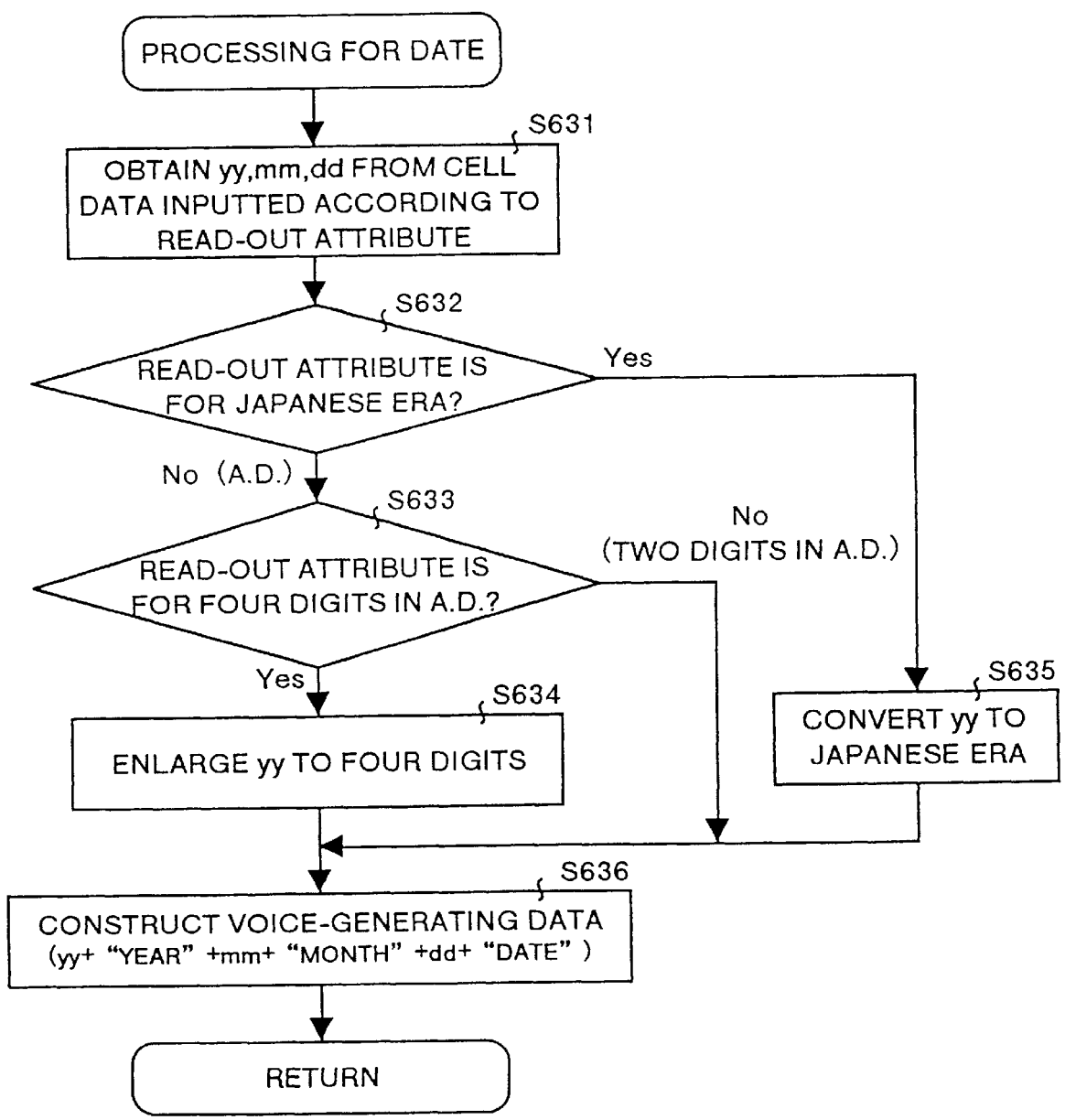
FIG. 18 is a flow chart for explaining processing of dates in the generation of voice-generating data.
Figure 19:
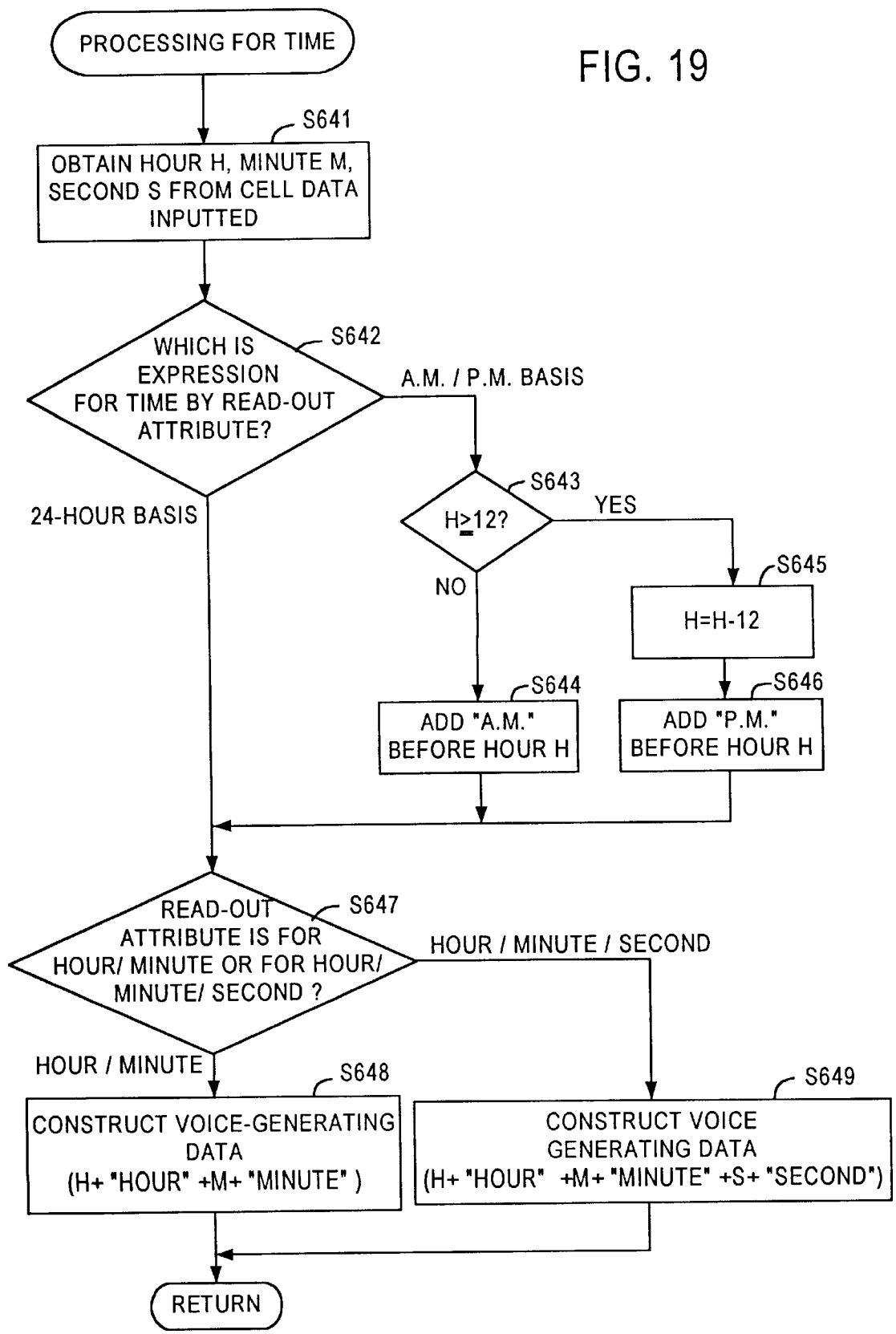
FIG. 19 is a flow chart for explaining processing of time in the generation of voice-generating data.

Herein, detailed description is made for processing of generating voice-generating data corresponding to the voice-generating data generation module 23. FIG. 15 is a flow chart for explaining generation of voice-generating data, FIG. 16 is a flow chart for explaining processing of a character string in the generation of voice-generating data, FIG. 17 is a flow chart for explaining processing of numerical values in the generation of voice-generating data, FIG. 18 is a flow chart for explaining processing of a date in the generation of voice-generating data, and FIG. 19 is a flow chart for explaining processing of a time in the generation of voice-generating data.

In this generation of voice-generating data, cell data for a cell as an object for being read out and the read-out attribute are analyzed according to the read-out operation (step S501). Namely, in a case where it is decided by this analysis that a read-out format is a character string (step S502), the cell data is subjected to processing for a character string (step S506). Also, in a case where it is decided by the analysis that a read-out format is a numerical value (step S503), the cell data is subjected to processing for a numerical value (step S507). In a case where it is decided by the analysis that a read-out format is a date (step S504), the cell data is subjected to processing for a date (step S508). Also in a case where it is decided by the analysis that a read-out format is a time (step S505), the cell data is subjected to processing for a time (step S509).

In a case where it is decide by the analysis that the cell data does not correspond to any of the read-out formats (step S505), a pause is inserted at a read-out timing for the current cell data (step S510). In this case, in the following step S511, pause processing is subjected thereto in place of outputting of the voice-generating data.

In a case where the read-out format is a character string, the inputted cell data is decided as voice-generating data for outputting voices according to the sequence of the characters as they are (step S611), and if any symbol specified by a user is not included in the cell data, the control returns straight to the step S511 for the next processing, but in a case where a symbol is included in the cell data (step S612), voice-generating data in which the symbol is replaced to the way of reading it out specified by the user is generated (step S613). The symbol described herein indicates a symbol such as for making "-" pronounced as hyphen or the like. This symbol can be included in read-out attributes when the user is preparing a table document. The voice-generating data is generated as described above to be outputted to the processing corresponding to the voice synthesis module 26 in step S511.

In a case where the read-out format is a numerical value, the inputted cell data is converted to a text according to the read-out attributes (step S621). At that time, in a case where any currency mark (e.g. ¥) is included in the text (step S622), at first the currency mark is deleted (step S623), and it is decided whether it is set that the currency mark is or not to be read out (step S624). This setting can freely be executed in the read-out attributes by the user.

In a case where it is set that currency mark is not to be read out, the processing returns to the step S511, while, in a case where it is set that the currency mark is to be read out, and if the currency is a dollar, the voice-generating data for a dollar is added after the voice-generating data for a numerical value according to the read-out attributes (step S624). The voice-generating data is generated as described above, and to be outputted to the processing corresponding to the voice synthesis module 26 in step S511.

In a case where the read-out format is a date, data for yy (year), mm (month), and dd (day) are obtained from the cell data inputted according to the read-out attributes (step S631). Further a calendar restricted by the read-out attributes is determined (step S632), and in a case where it is determined that the calendar is a Japanese one, yy is not read out with only numbers therefor but is converted to a format adding, for instance, "Heisei" (the current Japanese era) and added before a year thereto (step S635). On the other hand, in a case of A. D., the number of digits is determined (step S633), and if it is determined that the number thereof is basic two digits (the last two digits), the processing shifts straight onto step S636, but if it is determined that the number thereof is four digits, the number of digits is enlarged and converted to four digits in total by adding the first two digits to the basic two digits (step S634). If yy indicates the last two digits of "97", for instance, the entire four digits become "1997" by adding "19" as the first two digits thereto.

With the operation as described above, when yy is decided according to A. D. or the Japanese era, voice-generating data is constructed in step S636. Namely, if the read-out format is yy-mm-dd, according to the order of yy, mm, dd, the voice-generating data of "Year" is added to the yy indicating the number of year (in a case of the Japanese era, "Heisei" or the like is added before the numbers), the voice-generating data of "Month" is added to the mm, and the voice-generating data of "Day" is added to the dd. The voice-generating data is generated as described above to be outputted to the processing corresponding to the voice synthesis module 26 in step S511.

In generation of voice-generating data of the date, a day of the week can further be added thereto. In this case, data indicating a day of the week is included in cell data in step S631, attributes including a day of the week is also included in the read-out format. Accordingly, a day of the week is added to the last part in the structure of the voice-generating data in step S636, and phonetic reading for the data may be correlated to any language such as Japanese or English or the like according to the specification by the user.

In a case where the read-out format is a time, data for hour H, minute M, and second S are obtained from the cell data inputted according to the read-out attributes (step S641). Then an expression for the time restricted by the read-out attributes is determined (step S642). If it is determined that the time expression is 24-hour basis, the processing shifts straight to the step S647, however, if it is determined that the time is a.m./p.m. basis, determination is made as to whether it is a.m. or p.m. (step S643).

Namely, in a case where the value of time H is greater that or equal to 12 (step S643), the time period thereof belongs to the afternoon hours, so that 12 hours are subtracted from the hours H (step S645). Then, a result of subtraction becomes a new time H, and voice-generating data for outputting voices for p.m. is added before the time H (step S646). After the above processing, the processing shifts to step S647. On the other hand, in a case where the value of time H is less than 12 (step S643), then voice-generating data for outputting voices for a.m. is added before the time H (step S644). After the above processing, the processing shifts to step S647.

In step S647, determination is made according to the read-out attributes as to whether the unit of time is to be read out as hour/minute or as the whole of time/minute/second in both of the 24-hour basis and a.m./p.m. basis. As a result, if it is determined that data for hour and minute is read out, voice-generating data is generated in a sequence of the hour and the minute. Namely, the voice-generating data "ji (meaning: o'clock)" is added after H indicating the hour, then the voice-generating data "fun (meaning: a minute)" is added after M indicating the minute (step S648). The voice-generating data is generated as described above, and then outputted to the processing corresponding to the voice synthesis module 26 in step S511.

Also, if it is determined that data for hour/minute/second is read out, voice-generating data is generated in a sequence of the hour, minute, and second. Namely, the voice-generating data "ji (meaning: o'clock)" is added after H indicating hour, the voice-generating data "fun (meaning: minute)" is added after M indicating minute, and then the voice-generating data "byo (meaning: second)" is added after S indicating second (step S649). The voice-generating data is generated as described above, and then to be outputted to the processing corresponding to the voice synthesis module 26 in step S511.

As described above, with the Embodiment 2, read-out attributes for restricting the way of reading out a character string in cells are set, and a table document is phonetically outputted according to the way of reading out the character string restricted by the read-out attributes, so that the character string is not read out as the sequence as it is, but read out in a style suitable for the reading-out for collation. With the processes, it is possible to realize efficient collation of the documents with simple operations, namely, like in the Embodiment 1, to realize collation between documents (a hand-written document or the like) for preparing a table document and the table document on the display screen in a state where the operator hardly looks at the display while the table document thereon is read out by the apparatus. It should be noted that, for each of click boxes, the default thereof may be set to a state of selection from the beginning of the processing.

Also, a specific unit is added to voice-generating data in each cell, so that not only a style suitable for reading it out for collation is obtained but also elements required for aiding a listener in understanding can be reduced to the minimum to be added thereto.

In the Embodiment 2 as described above, the phonetic reading for units such as a year, a month, a day or the like may be added to data according to a generation rule in the voice-generating data generation module 23 without an item unit storing section 204 particularly provided therein.

In the Embodiments 1 and 2, a reading range has not been described, however, a reading range is set and data may be read out within the range thereof like in the Embodiment 3 described below. It should be noted that the Embodiment 3 is applicable to the Embodiment 1 as well as to the Embodiment 2.

Figure 20:
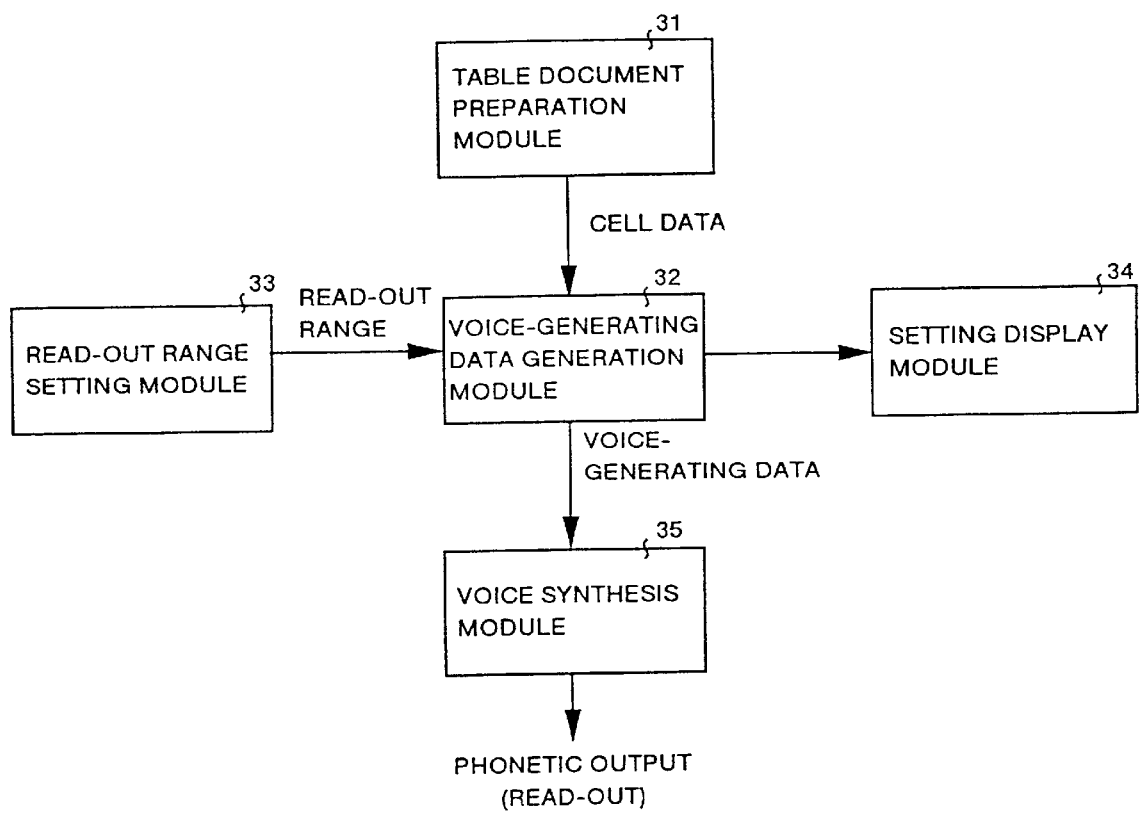
FIG. 20 is a functional block diagram for explaining an internal functions of the apparatus for reading-out/collating table documents according to the Embodiment 3 of the present invention.

At first, description is made for module configuration according to the Embodiment 3 of the present invention. FIG. 20 is a functional block diagram for explaining the internal functions of the apparatus for reading-out/collating of table document according to the Embodiment 3 of the present invention. The module configuration shown in FIG. 20 comprises a table document preparation module 31, a voice-generating data generation module 32, a read-out range setting module 33, a setting display module 34, and a voice synthesis module 35. The table document preparation module 31 prepares a table document using a known spreadsheet software and outputs item names and character information in the prepared table document to the voice-generating data generation module 32.

The voice-generating data generation module 32 prepares voice-generating data for outputting voices for item names, words, dates, numerical values, or numerical formulae or the like by inputting the item names and character information prepared by the table document preparation module 31. Also the voice-generating data generation module 32 prepares voice-generating data within the read-out range for each cell unit instructed by the read-out range setting module 33.

The read-out range setting module 33 sets a read-out range in each cell unit when a table document is read out and outputs the read-out range to the voice-generating data generation module 32. The setting display module 34 forms a setting display screen, when voice-generating data is generated by the voice-generating data generation module 32, such as a screen required when a read-out range is to be set.

The voice synthesis module 35 synthesizes voices based on voice-generating data inputted from the voice-generating data generation module 32 and outputs voices. Namely, the voice synthesis module 35 reads out by phonetically outputting information such as item names, words, dates, numerical values, and numerical formulae or the like each constituting a table document.

With the functional block having the configuration as described above, the table document preparation module 31 prepares a table document correlating cell data indicating item names each allocated to each cell with cell data indicating words, dates, numerical values, and numerical formulae or the like each corresponding to the item name, and the voice-generating data generation module 32 correlates words, dates, numerical values, and numerical formulae or the like between cells according to a preset reading-out direction in the prepared table document, and generates a series of voice-generating data based on the correlated words, dates, numerical values, and numerical formulae or the like. When the data is to be generated, in a case where a read-out range is set by the read-out range setting module 33, the voice-generating data generation module 32 generates voice-generating data within the read-out range.

In a case where a read-out range is set by the read-out range setting module 33, a setting screen for the setting is displayed by the setting display module 34, and the read-out range setting module 33 decides a read-out range in each cell according to the setting operation to the setting screen.

As described above, when voice-generating data is generated by the voice-generating data generation module 32, the voice-generating data is outputted to the voice synthesis module 35, and the voice synthesis module 35 outputs voices based on the voice-generating data.

Figure 21:
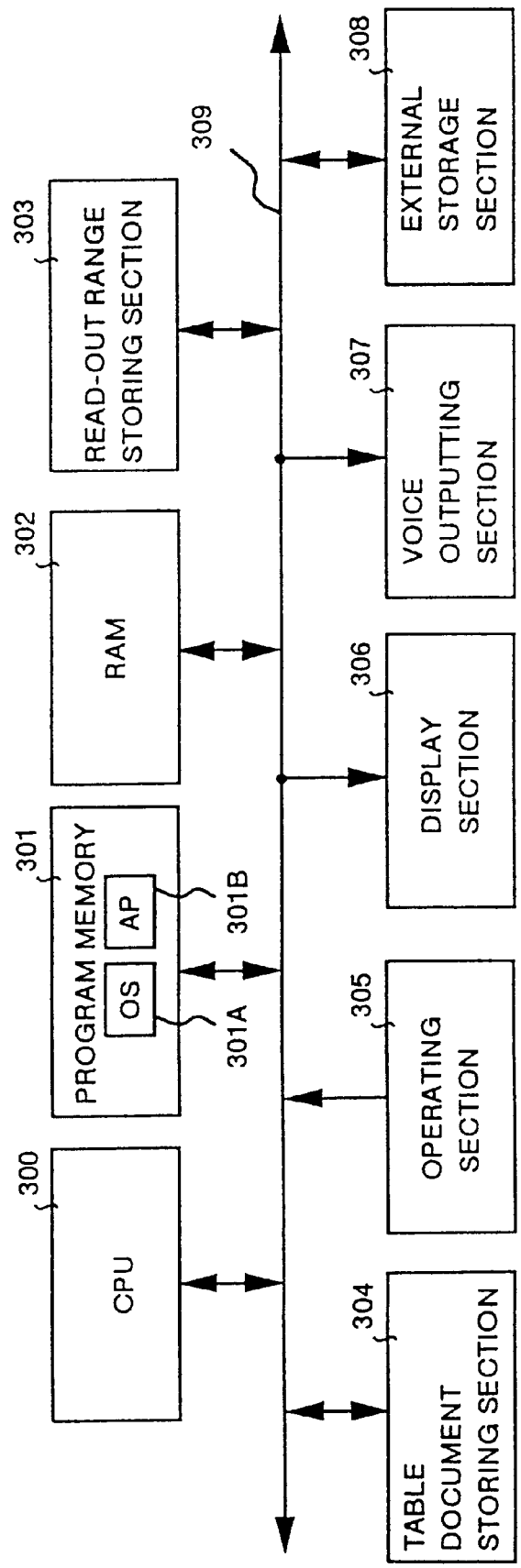
FIG. 21 is a block diagram showing internal configuration of the apparatus for reading-out/collating of a table document according to the Embodiment 3.

In the next description is made for configuration thereof. FIG. 21 is a block diagram showing the internal configuration of the apparatus for reading-out/collating of table document according to the Embodiment 3. The apparatus for reading-out/collating of table document according to the Embodiment 3 comprises, as shown in FIG. 2, units such as a CPU 300, a program memory 301 connected to the CPU 300 by an internal bus 309, a RAM 302, a read-out range storing section 303, a table document storing section 304, an operating section 305, a display section 306, a voice outputting section 307, and an external storage section 308 or the like. It should be noted that the internal bus 309 is a transmission line for transmitting control signals, data, and address signals or the like.

The CPU 300 is a unit for controlling operations of the entire apparatus according to various types of programs stored on the program memory 301. Namely, the CPU 300 controls operations such as execution of the various types of programs stored on the program memory 301, reading/writing of data from/in the RAM 302, reading/writing of a read-out range from/in the read-out range storing section 303, reading/writing of a table document from/in the table document storing section 304, reception of key-entry from the operating section 305, display on the display section 306, voice output to the voice outputting section 307, and reading/writing of data from/in the external storing section 308 or the like.

The program memory 301 stores thereon an operating system OS 301A, an application programs AP 301B, and various parameters required for operations of the CPU 300. Included in the application programs are programs for realizing functions of the table document preparation module 31, voice-generating data generation module 32, read-out range setting module 33, setting display module 34, and voice synthesis module 35. The RAM 302 is used as a work area at the time of execution of the CPU 300.

The read-out range storing section 303 is a memory for storing thereon a read-out range set by the read-out range setting module 33 by correlating a cell address to the read-out direction. The table document storing section 304 is a memory for storing thereon a table document prepared by the table document preparation module 31. The operating section 305 provides therein keys and switches for instructing operations such as table document preparation and voice output or the like through key-entry. It should be noted that the operations of the operating section 305 includes a setting operation by the read-out range setting module 33. The display section 306 displays a table document in preparation by the table document preparation module 31 and a setting screen or the like for the read-out range setting module 33 by the setting display module 34 according to the control by the CPU 300.

The voice outputting section 307 is a unit comprising an amplifier and a speaker or the like for outputting voice according to the control by the CPU 300. In this voice outputting section 307, a table document vice-synthesized by the voice synthesis module 35 is read out with voices. The external storage section 308 mounts thereon an external storage medium such as a floppy disk or the like to read/write data such as a table document therefrom/therein.

Figure 22:
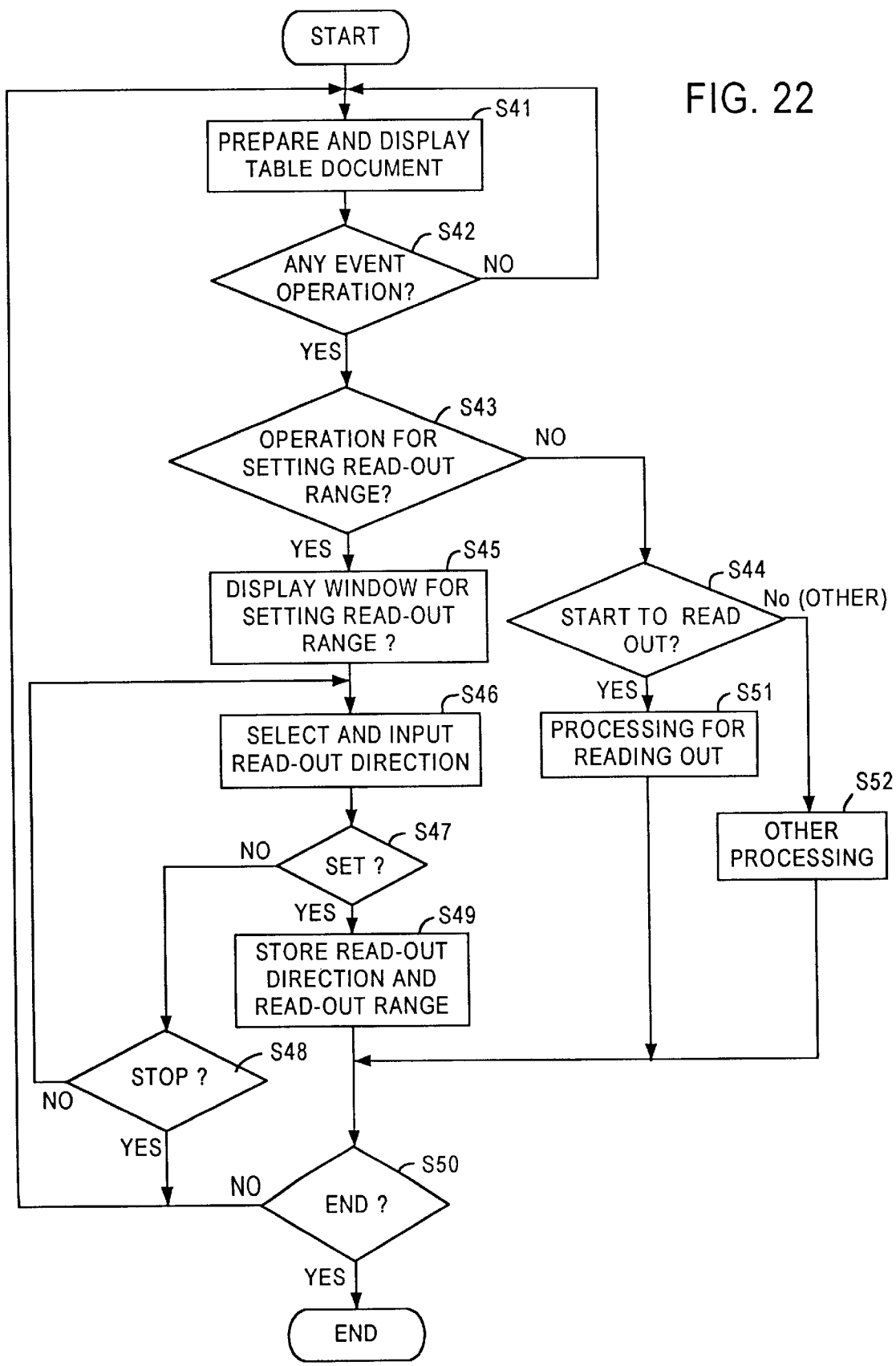
FIG. 22 is a flow chart for explanation of operations according to the Embodiment 3.
Figure 25A:
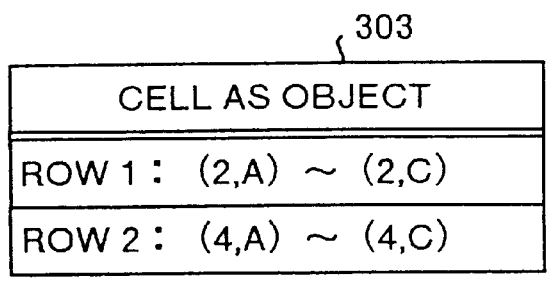
FIGS. 25A and 25B are views for explanation of contents stored in a reading-out range storing section according to the Embodiment 3.
Figure 25B:
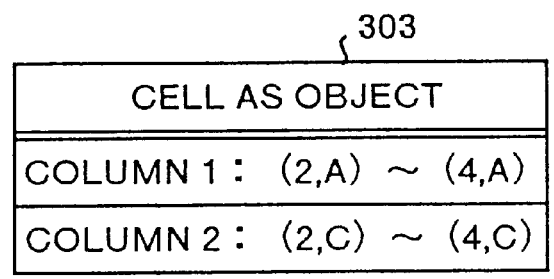
Figures 26A, 26B, 27:
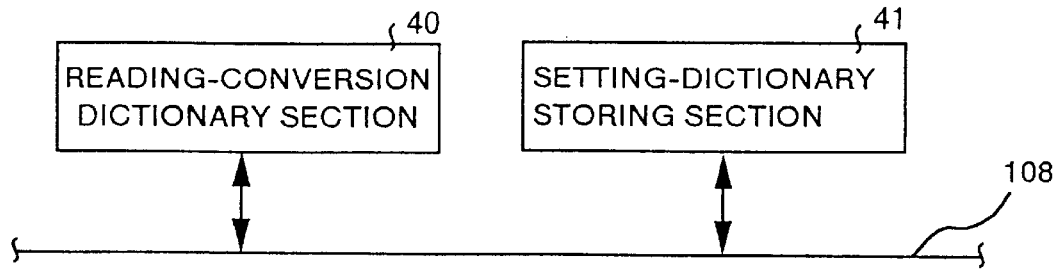
FIGS. 26A and 26B are views for explanation of a relation between a cell as an object for reading out and the way of reading it out according to the Embodiment 3.
FIG. 27 is a block diagram showing the key sections of the internal configuration in the apparatus for reading-out/collating of a table document according to the Embodiment 4 of the present invention.

In the next description is made for operations. FIG. 22 is a flow chart for explanation of operations according to the Embodiment 3, FIGS. 23A to 23C and FIGS. 24A and 24B are views each for explaining transitions of display screen when data is read out according to the Embodiment 3, FIGS. 25A and 25B are views for explaining contents stored in the read-out range storing section 303, and FIGS. 26A and 26B are views for explanation of a relation between a cell as an object for being read out and a way of reading it out. It should be noted that description hereinafter is made for operations in the entire modules linked to each other shown in FIG. 20.

During preparation of a table document, an icon IC31 for reading-out for instructing reading-aloud of the table document SS3 and a range icon IC32 for setting the read-out range are displayed, as shown in FIG. 23A, on the display section 306 together with the table document SS3 being prepared thereon (step S31). The table document SS3 shown in FIG. 23A has the same relation between items in the first row to the third row and character information as that in the table document SS1 described as an example in the Embodiment 1, and a new fourth item is added thereto. Namely in the fourth item, cells indicating "fine" (item name "Weather") and "19.5°" (item name "Maximum air temperature") are correlated to a cell indicating "Kagoshima" in the item name "Region" between the items.

Now, in a case where any event operation is detected during preparation of the table document (step S42), it is determined whether the event operation is an operation to the range icon IC32 (step S43), the event operation is an operation to the icon IC31 for reading-out (step S44), or it is some other operation such as an end of preparing the table document. As a result, if it is determined that the operation is the operation to the range icon IC32, as shown in FIG. 23A, the range icon IC32 is displayed in a reverse mode (indicated by dots in the figure) and a window IC33 for setting a range is displayed as shown in FIG. 23B (step S45).

Displayed on the window IC33 for setting a range are a click box ("column" direction and "row" direction) having buttons for setting the reading-out direction for the cell as an object for setting a read-out range, a set button for instructing recognition of setting thereof, and a stop button to stop the setting. It should be noted that a read-out range is previously and temporarily decided by the input device (included in the operating section 305) such as a mouse or the like. Accordingly, an operation for finally setting the temporarily decided range as a read-out range is executed by opening the window IC33 for setting a range.

In the example shown in FIG. 23B, two rows of cells having addresses from (2, A) to (2, C) in the row direction and cells having addresses from (4, A) to (4, C) in the same row direction are temporarily decided, and in that case, as an example, those two rows are displayed in a reverse mode (indicated by dots in the figure). In FIG. 23B, "row" is selected as a read-out direction therefor according to the sequential direction of the temporarily decided cells. As for the read-out direction, it is possible to switch it to any other direction freely by changing the temporarily decided range until the set button or the stop button is operated (step S47, step S48).

Then, when the set button in the window IC33 for setting a range is operated in the state shown in FIG. 23B (step S47), the set button is displayed in a reverse mode (indicated by dots in the figure) as shown in FIG. 23B, and the read-out range temporarily decided so far is stored in the read-out range storing section 303, as shown in FIG. 25A, as a normal read-out range (cells as objects) in which cells having addresses of (2, A), (2, B), (2, C) and cells having addresses of (4, A), (4, B), (4, C) are correlated to the row 1 and row 2 each indicating the reading-out direction respectively (step S49).

When the stop button in the window IC33 for setting a range is operated while a read-out direction and a read-out range are temporarily decided in step S46 (step S48), the window IC33 for setting a range is closed, and the processing returns to step S41 again.

When the icon IC31 for reading-out is further operated in the above state (step S44), voice-generating data for character strings corresponding to cells having addresses of (2, A), (2, B), (2, C) in the row 1 and cells having addresses of (4, A), (4, B), (4, C) in the row 2 each stored in the read-out range storing section 303 respectively is generated. As a reading-out direction set therein at that time, a row is set to the reference direction. Then, a table document is read out (step S51).

In reading-out according to the range setting shown in FIG. 23B, the voice-generating data in the row 1, namely the way of reading out the character string is "Tokyo, hare (meaning: fine), ju-ku-do (meaning: 19.0°)", as shown in FIG. 26A, and the voice-generating data in the row 2, namely the way of reading out the character string is "Kagoshima, hare (meaning: fine), ju-ku-ten-go-do (meaning: 19.5°)".

When the start of reading out is instructed in the above state, as shown in FIG. 23(C), a window IC34 including a message indicating "in the process of being read-out" and a stop button for the operation are displayed, and reading-out is executed by being pronounced as "Tokyo, hare (meaning: fine), ju-ku-do (meaning: 19°). Kagoshima, hare (meaning: fine), ju-ku-ten-go-do (meaning: 19.5°)".

In a case where some other operation is detected in step S44, the processing shifts to step S52, the pre-determined other processing is executed, and the processing returns to step S41 again, however if the other operation mentioned above is an end of processing, it is decided as an end in step S50, and the current processing is terminated.

Figure 24A:
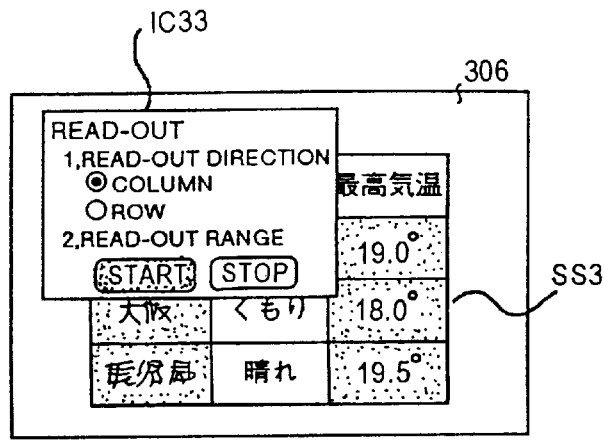
FIGS. 24A and 24B are views for explaining transitions of the display screen when data is read out according to the Embodiment 3.

The read-out range may also be set to a column direction instead of other than the row direction, and in this case, as shown in FIG. 24A, "column" is selected as a reading-out direction and the set button is operated. However, it is required to temporarily decide a desired column as a read-out range beforehand. In FIG. 24A, the first and third columns are temporarily decided as read-out ranges (cells in the item names in the first row are excluded).

Figure 24B:
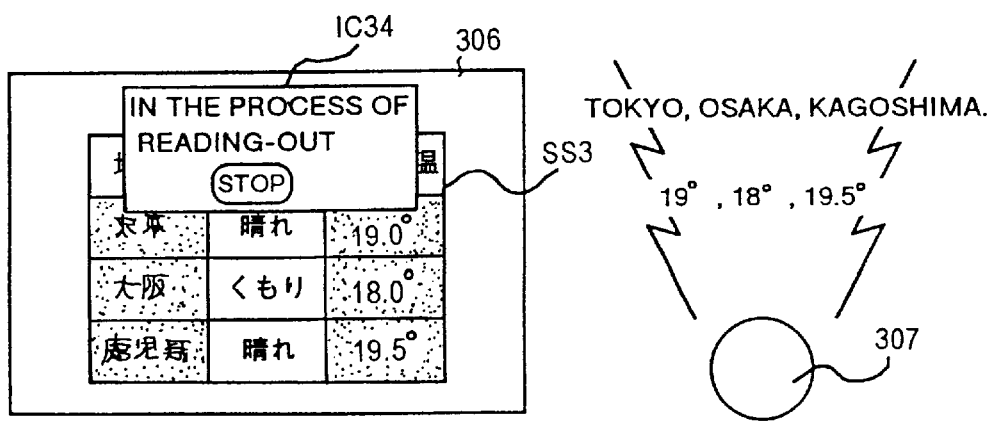

Then, when the set button in the window IC33 for setting a range is operated in the state shown in FIG. 24A (step S47), the set button is displayed in a reverse mode (indicated by dots in the figure) as shown in FIG. 24B, and the read-out range temporarily decided range so far is stored in the read-out storing section 303, as shown in FIG. 25B, as a normal read-out range (cells as objects) in which cells having addresses of (2, A), (3, A), (4, A) and cells having addresses of (2, C), (3, C), (4, C) are correlated to the column 1 and column 2 each indicating the reading-out direction respectively (step S49).

When the stop button in the window IC33 for setting a range is operated while a read-out direction and a read-out range are temporarily decided in step S46 (step S48), the window IC33 for setting a range is closed, and the processing returns to step S41 again.

When the icon IC31 for reading-out is further operated in the above state (step S44), voice-generating data for character strings corresponding to cells having addresses of (2, A), (3, A), (4, A) in the column 1 and cells having addresses of (2, C), (3, C), (4, C) in the column 2 each stored in the read-out range storing section 303 respectively is generated. As a reading-out direction set therein at that time, a column is set to the reference direction. Then, a table document is read out (step S51).

In reading-out according to the range setting shown in FIG. 24A, the voice-generating data in the column 1, namely the way of reading out the character string is "Tokyo, Osaka, Kagoshima", as shown in FIG. 26B, and the voice-generating data in the column 2, namely the way of reading out the character string is "19.0°, 18.0°, 19.5°."

When the start of reading out is instructed in the above state, as shown in FIG. 24B, the window IC34 including a message indicating "in the process of being reading-out" and a button to stop the operation are displayed, and reading-out is executed by being pronounced as "Tokyo, Osaka, Kagoshima. ju-ku-do (meaning: 19°), ju-hachi-do (meaning: 18°), ju-kyu-ten-go-do (meaning: 19.50°)".

As described above, with the Embodiment 3, one or plurality of ranges for phonetically reading-out ranges are set in a displayed table document, and the table document in the set one or plurality of read-out ranges is phonetically outputted, so that only cells required for collation are read out, and because of this, it is possible to realize flexible collation of documents intended by a user with simple operations, namely collation between documents (a hand-written document or the like) for preparing a table document and the table document on the display screen in a state where the user hardly looks at the display while the table document thereon is read out by the apparatus.

In the Embodiments 1, 2, and 3, phonetic reading of characters have not been described, however, like in the Embodiment 4 described below, a way of phonetic reading can be set for each character and the phonetic reading that suits for collation may be realized. It should be noted that the Embodiment 4 is applicable to the Embodiments 1, 2, and 3.

At first, description is made for module configuration according to the Embodiment 4 of the present invention. FIG. 27 is a block diagram showing a key section of internal configuration of the apparatus for reading-out/collating a table document according to the Embodiment 4 of the present invention. The entire configuration is based on the configuration shown in FIG. 2 according to the Embodiment 1.

The apparatus for reading-out/collating a table document according to the Embodiment 4 provides therein, as shown in FIG. 27, a reading-conversion dictionary section 40 and setting-dictionary storing section 41. The reading-conversion dictionary section 40 gives variations suitable for collation by reading-out to reading-out of words, and the setting-dictionary storing section 41 stores therein a dictionary selected in the reading-conversion dictionary section 40 as a dictionary for being used when words are read out.

Detailed description is made herein for the reading-conversion dictionary section 40. FIG. 28 is a view for explaining internal configuration of the reading-conversion dictionary section 40. The reading-conversion dictionary section 40 stores therein, as shown in FIG. 28, types how to phonetically read out words correlated to the conversion rules in accordance with the variations. There are phonetically reading out in types how to read them out such as reading in English, reading for numerals (e.g. reading for numerals 1 and 2), reading for a day of the week (e.g. reading for a day of the week 1, 2), reading for score, reading for telephone numbers and addresses or the like.

In reading in English, for instance, "日 (pronounced: nichi, meaning: Sunday)" is phonetically converted to "Sunday", "10 月 (pronounced: ju-gatu, meaning: October)" to "October", and "/" to "slash" respectively. In a case where the reading of numerals 1, as reading for counting numbers, for instance, "1" is phonetically converted to "hitotsu", "2" to "futatus", and "20" to "futaju" respectively. In a case where the reading of numerals 2, and if "0" exists between successive numbers, the "0" is phonetically converted to "tonde".

In a case where the reading for a day of the week 1, for instance, "日 (pronounced: nichi, meaning: Sunday)" is converted to "nichiyobi (Sunday)" and "月 (pronounced: gatsu, meaning: Monday)" to "getsuyobi (Monday)" respectively. In a case where the reading for a day of the week 2, phonetic reading herein is simpler than that in the reading for a day of the week 1, and, for instance, "日 (pronounced: nichi, meaning: Sunday)" is converted to "nichiyo (Sunday)" and "月 (pronounced: getsu, meaning: Monday)" to "getsuyo (Monday)" respectively. In a case where the reading for score, for instance, "1" is phonetically converted to "itten (one point), "2" to "niten (two points)", and "10" to "jutten (10 points). Also in a case where the reading for telephone numbers and addresses, and if a telephone number is, for instance, "123-456-7890", "-" is converted to "no (of)", and the way of reading it out is "ichi-ni-san, no, shi-go-ryoku, no, nana-hachi-kyu-ju". Then, if an address is 霞ヶ関 (pronounced: kasumigaseki, meaning: the Kasumigaseki district of Tokyo) 1-2-3", "-" is phonetically converted to "no (of)" and the way of reading it out is ". . . ichi 1), no, ni 2), no, san(3)".

Figure 29:
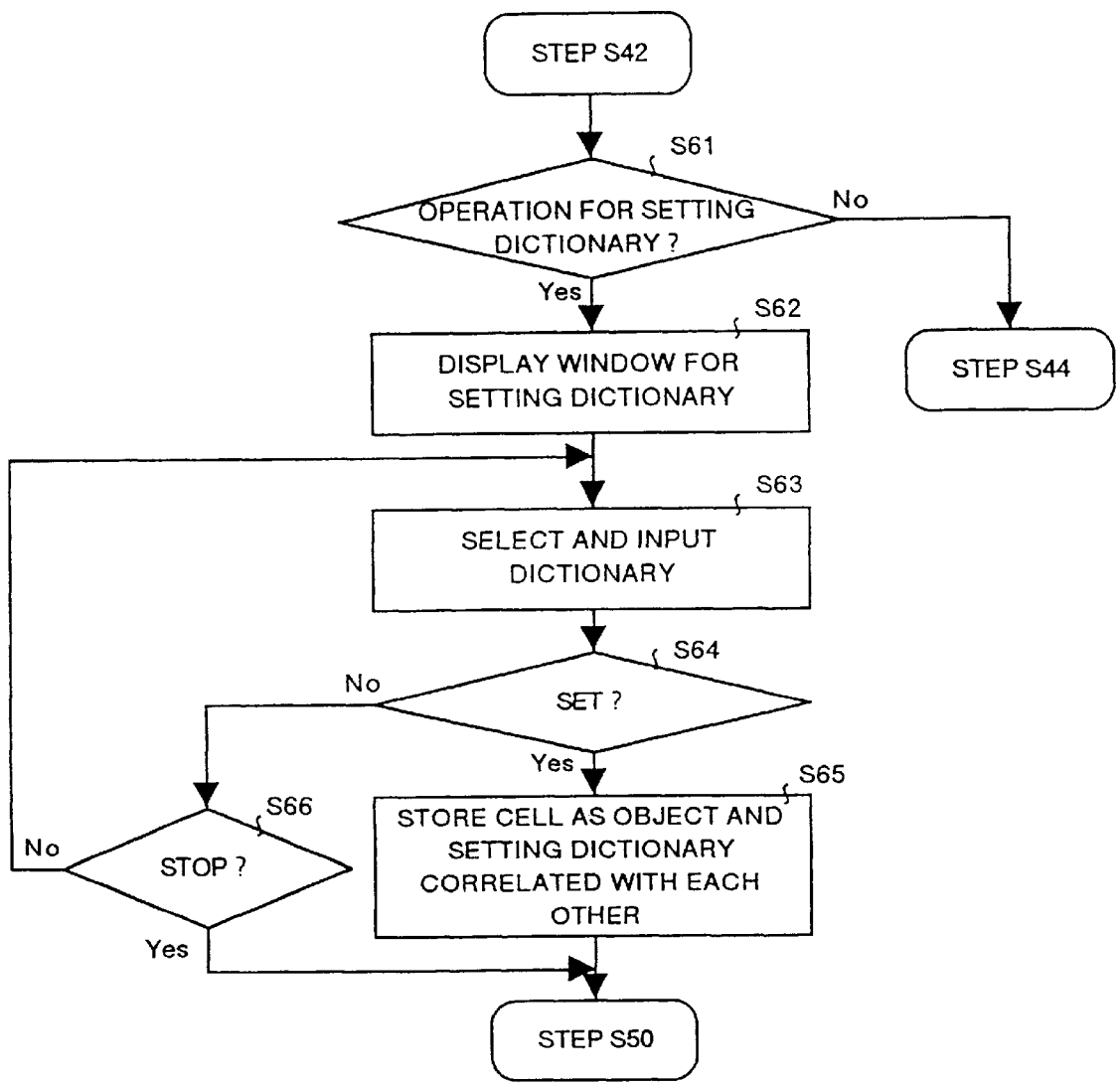
FIG. 29 is a flow chart for explaining operations of the key sections according to the Embodiment 4.
Figure 30A:
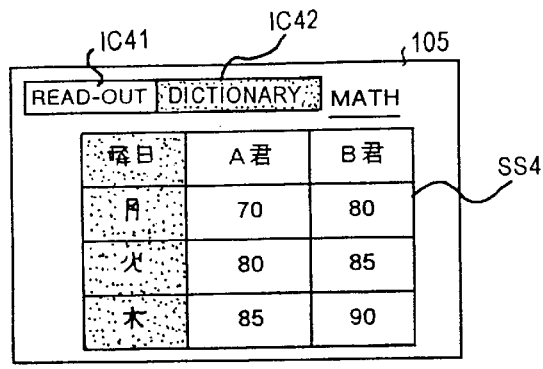
FIGS. 30A to 30C are views for explaining transitions of the display screen when data is read out according to the Embodiment 4.
Figure 30B:
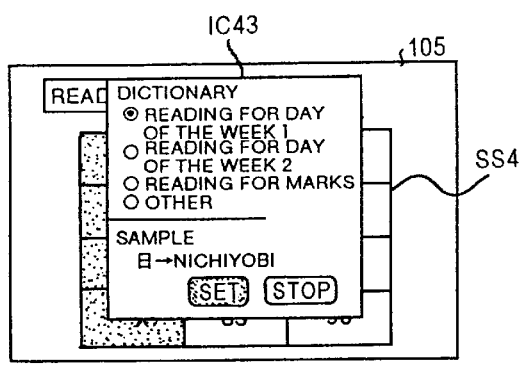
Figure 30C:
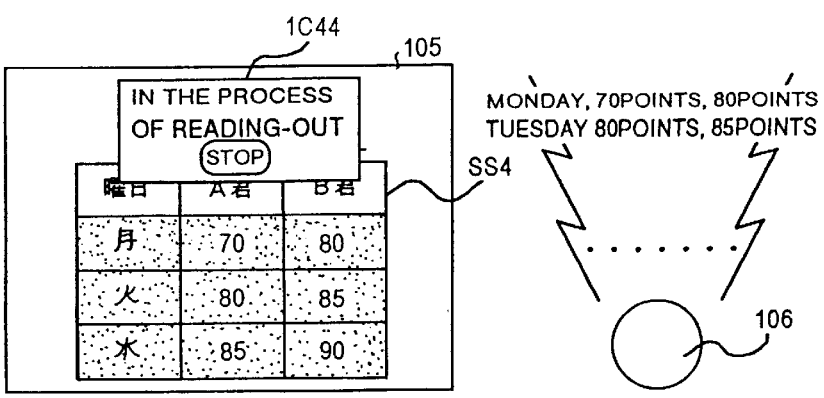
Figures 31, 32:
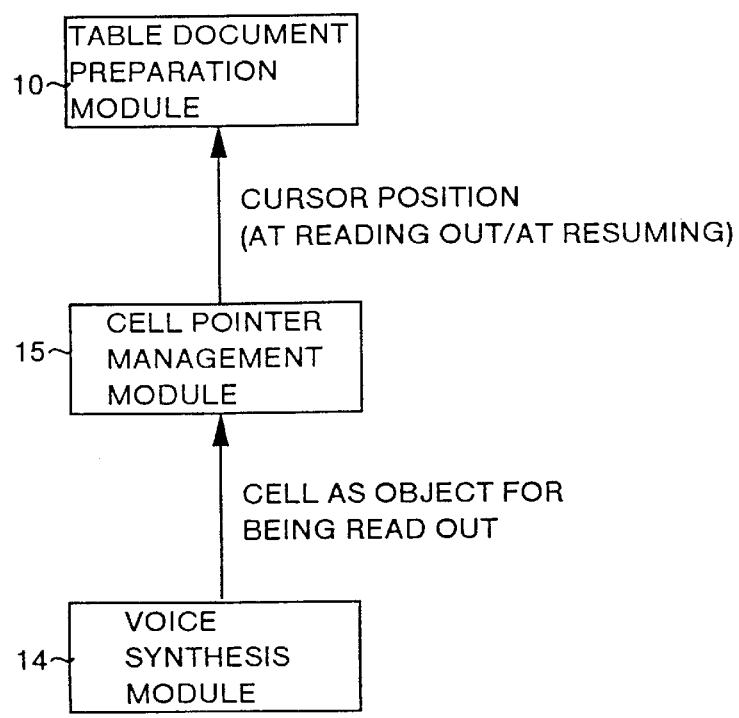
FIG. 31 is a view for explanation of contents stored in a setting-dictionary storing section according to the Embodiment 4.
FIG. 32 is a functional block diagram for explaining the internal functions of the apparatus for reading-out/collating of a table document according to the Embodiment 5 of the present invention.

In the next description is made for main operations. FIG. 29 is a flow chart for explaining operations of the key section according to the Embodiment 4, FIGS. 30A to 30C are views for explaining transition of display screens when data is read out, and FIG. 31 is a view for explaining contents stored in the setting-dictionary storing section 41 when data is read out. It should be noted that, in FIG. 29, only steps which are different or new from the steps in the flow chart shown in FIG. 22 are described in the Embodiment 3.

During preparation of a table document, as shown in FIG. 30A, an icon IC41 for reading-out for instructing reading-aloud of the table document SS4 and a dictionary icon IC42 for setting a dictionary in the reading-conversion dictionary section 40 are displayed on the display section 105 together with the table document SS4 being prepared thereon. The table document SS4 shown in FIG. 30A shows the score inn a test in mathematics which A 君 (pronounced: A-kun, meaning: boy A) and B 君 (pronounced: B-kun, meaning: boy B) taken every day from Monday to Wednesday.

Inputted in a first row of the table document SS4 are, as item names in the row direction, " 曜日 (pronounced: yobi, meaning: a day of the week)", "A 君 (pronounced: A-kun, meaning: boy A)", and "B 君 (pronounced: B-kun, meaning: boy B)", and a character string of "月 (pronounced: gatsu, meaning: Monday)", "火 (pronounced: ka, meaning: Tuesday)", and "水 (pronounced: sui, meaning: Wednesday)" is inputted in the column of the item name "A day of the week" as item names in the column direction.

Inputted in the column of "A 君 (pronounced: A-kun, meaning: boy A)" is a character string of "70", "80", "85" corresponding to cells of "月 (pronounced: gatsu, meaning: Monday)", "火 (pronounced: ka, meaning: Tuesday)", and "水 pronounced: sui, meaning: Wednesday)" respectively as the results of tests in mathematics. Similarly, inputted in the column of "B 君 (pronounced: B-kun, meaning: boy B)" is a character string of "80", "85", "90" corresponding to cells of "月 (pronounced: getsu, meaning: Monday)", "火 (pronounced: ka, meaning: Tuesday)", and "水 (pronounced: sui, meaning: Wednesday)" respectively as the score of the tests in mathematics. It should be noted that, the cell addresses are the same as those in each the Embodiment described above and is expressed by A, B, C in the row direction and 1, 2, 3 in the column direction.

Now, in a case where any event operation is detected during preparation of a table document (step S42), determination is made as to whether the event operation is an operation to the dictionary icon IC42 (step S61), the event operation is an operation to the icon IC31 for reading-out (step S44), or the event operation is some other operation such as an end of preparing the table document. As a result, if it is determined that the operation is the operation to the dictionary icon IC42, as shown in FIG. 30A, the dictionary icon IC42 is displayed, for instance, in a reverse mode (indicated by dots in the figure), and as shown in FIG. 30 (B), a window IC43 for setting a dictionary is displayed thereon (step S62).

Displayed on the window IC43 for setting a dictionary are a click box ("Reading for a day of the week 1", "Reading for a day of the week 2", "Reading for score", and "others" (used for switching a type of displayed dictionary)) for setting a type of the dictionaries, a set button for instructing confirmation of entire setting (a plurality of types can beset), and a stop button to stop the setting. It should be noted that a cell range for setting a dictionary is previously and temporarily decided according to an input device (included in the operating section 104) such as a mouse. Accordingly, an operation for setting the temporarily decided range as a range for finally setting a dictionary is executed by opening the window IC43 for setting a dictionary.

In the example shown in FIG. 30B, a column of cells having addresses from (2, A) to (4, A) in the column direction is temporarily decided as a range, and in that case, for example, this column is displayed in a reverse mode (indicated by dots in the figure). The temporarily decided range can be changed freely to any other range until the set button or the stop button are operated.

Then, when "Reading for a day of the week 1" is selected in the state shown in FIG. 30B (step S63) and the set button in the window IC43 for setting a dictionary is operated (step S64), the set button is displayed in a reverse mode (indicated by dots in the figure) as shown in FIG. 30B, and the range temporarily decided so far is stored in the setting-dictionary storing section 41, as shown in FIG. 31, as a normal range for setting a dictionary (cells as objects) in which cells having addresses of (2, A), (3, A), (4, A) in the column 1 are correlated to the type of dictionary "Reading for a day of the week 1" (step S65).

Similarly, if dictionaries of "Reading for score" are selected in the columns of "A 君 pronounced: A-kun, meaning: boy A)", and "B 君 (pronounced: B-kun, meaning: boy B)" respectively and the set button in the window IC43 for setting a dictionary is operated, as shown in FIG.

31, the column of "A 君 pronounced: A-kun, meaning: boy A)", namely the cells having addresses of (2, B), (3, B), (4, B) in the column 2, and the column of "B 君 (pronounced: B-kun, meaning: boy B)", namely the cells having addresses of (2, C), (3, C), (4, C) in the column 3 are correlated to the type of dictionary Reading for score" respectively and are stored therein (step S65).

When the stop button in the window IC43 for setting a dictionary is operated while a dictionary is selected or a range is temporarily decided in step S63 (step S66), the window IC43 for setting a dictionary is closed, and the processing returns to step S41 again through step S50.

When the icon IC41 for reading-out is further operated in the above state (step S44; Refer to FIG. 22), voice-generating data for character strings corresponding to cells having addresses of (2, A), (3, A), (4, A) in the column 1, cells having addresses of (2, B), (3, B), (4, B) in the column 2, and cells having addresses of (2, C), (3, C), (4, C) in the column 3 each stored in the setting-dictionary storing section 41 respectively is generated. When the data is generated, the dictionary of "Reading for a day of the week 1" is referred to from the reading-conversion dictionary section 40 for the column 1, and the dictionary of "Reading for score" is referred to from the reading-conversion dictionary section 40 for the column 2 and the column 3. Then, a table document is read out (step S51).

In reading-out according to the range setting shown in FIG. 30B, the item names are not read out, but in a case where the reading-out direction is preset in the row direction, the voice-generating data in the range from the column 1 to column 3 is "Monday, 70 points, 80 points. Tuesday, 80 points, 85 points.". When the start of reading out is instructed in the above state, as shown in FIG. 30C, a window IC44 including a message indicating "in the process of reading-out" and a button to stop the operation are displayed, and reading-out is executed by being pronounced as "Getsuyobi (meaning: Monday), nanajutten (meaning: 70 points), hachijutten (meaning: 80 points). Kayobi (meaning: Tuesday), hachijutten (meaning: 80 points), hachiju-goten (meaning: 85 points)." from the voice outputting section 106.

As described above, with the Embodiment 4, the way of reading out can be set freely according to the type of a character, and the character is phonetically outputted according to the way of reading it out, so that a way of reading out in each character is customized according to a user, and with this feature, collation between table documents, of which the table document on the display is read out by the apparatus, can be made furthermore flexible.

In the Embodiments 1 to 4, control of a cell cursor has not been described, however, like in the Embodiment 5 described below, position of a cursor may be controlled according to a situation when data is read out or when operation is resumed after being suspended or the like. It should be noted that the Embodiment 5 is applicable to each of the embodiments as described above.

At first, description is made for module configuration according to the Embodiment 5 of the present invention. FIG. 32 is a functional block diagram showing a key section of an internal function of the apparatus for reading-out/collating a table document according to the Embodiment 5 of the present invention. In the apparatus for reading-out/collating a table document according to the Embodiment 5, a cell pointer management module 15 is further added to the functional blocks according to the Embodiment 1.

In the Embodiment 5, a table document is read out in the similar way as in the Embodiment 1 and at the same time it is detected by the cell pointer management module 15 at which cell position data is read out from the voice synthesis module 14 during being read out, and the detected cell is reported as a position of the cursor to the table document preparation module 10.

Figures 33, 34:
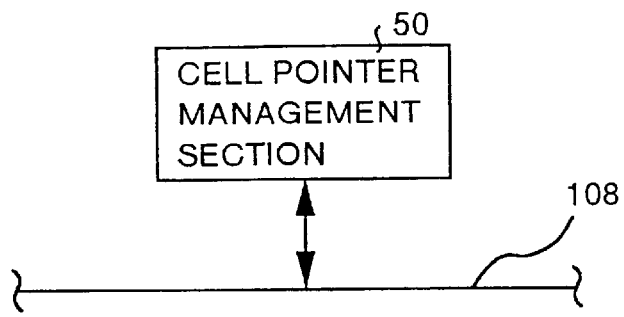
FIG. 33 is a block diagram showing internal configuration of the apparatus for reading-out/collating of a table document according to the Embodiment 5.
FIG. 34 is a view for explaining internal configuration of a cell pointer management section according to the Embodiment 5.

In the next description is made for configuration of the key section thereof. FIG. 33 is a block diagram showing a key section of internal configuration of the table document reading-out/collating apparatus according to the Embodiment 5. The entire configuration thereof is based on the configuration shown in FIG. 2 according to the Embodiment 1. The apparatus for reading-out/collating a table document according to the Embodiment 5 newly provides therein, as shown in FIG. 33, a cell pointer management section 50. It should be noted that an application program for realizing the a cell pointer management module 15 is included in the application program AP101B.

This cell pointer management section 50 is a memory for storing thereon and managing a position of a cell as an object for being read out (in being read out) as a cell address by the cell pointer management module 15.

In the next detailed description is made for the cell pointer management section 50. FIG. 34 is a view for explaining internal configuration of the cell pointer management section 50. This cell pointer management section 50 stores thereon and the items to be managed such as, as shown in FIG. 34, cells as objects for being read out, a position at which cell-movement is stopped, a position at which cell-movement is resumed, and a direction of cell-movement.

In the items to be managed, a cell as an object for being read out indicates a cell in currently being read out and is managed by the cell address (i, j). This cell as an object for being read out also indicates a cursor display position for the cell as an object for being read out. This cursor position indicates a position of a cell to which data can be inputted or in which the data can be corrected. A position at which cell-movement is stopped indicates a cell as an object for being interrupted in the middle of being read out and is stored and managed by the cell address (i, j).

A position at which cell-movement is resumed indicates a cell position to be resumed for being read out after interruption of reading-out, and is set to a cell position by one cell before the position at which cell-movement has been stopped. Namely, in a case where a reading-out direction is the column direction, the position is returned by one row, so that the cell address for resuming the cell movement is (i−1, j), while, in a case where a reading-out direction is the row direction, the position is returned by one column, so that the cell address for resuming the cell movement is (i, j−1).

As described above, as a reason the position at which the cell movement is resumed is returned, in a case where an error is detected in being read out, reading-out more or less proceeds from the point of time when an error is recognized to that when the reading-out is interrupted. By returning the cell position by at least one before the current cell position, the cursor position approaches the cell having an error, so that trouble of moving the cursor position to the cell position as an object to be corrected can be reduced. Even if the reason for the interruption can not be corrected, reading-out can be restarted from the position adjacent to the interrupted cell position.

Then, a final cell-movement direction is a "row" if the reading-out direction is a row direction and is a "column" if it is a column direction each in accordance with the reading-out direction.

In the next description is made for main operations. The entire operations in the Embodiment 5 are the same as those in the Embodiment 1, so that description is made herein only for cell pointer managing operations newly added thereto. FIG. 35 is a flow chart for explanation of cell pointer managing operations.

In management of a cell pointer, at first, an address for a cell as an object for being read out is supplied from the voice synthesis module 14 as "i" in the row direction thereof and as "j" in the column direction thereof. It should be noted that at a start position (I, J) of the cell to be read out, as the default, a value "I" is set to a cell pointer i and a value "J" is set to a cell pointer j (step S71).

Further, the preset reading-out direction is determined (step S72), and if it is determined that the direction is the column direction, the processing shifts to step S73, and a cell position corresponding to the cell address (i, j) is displayed with a cursor. It should be noted that the cell-movement direction of "column" is set to the cell pointer management section 50 after determination of the column direction is made in step S72. While, if it is determined that the direction is the row direction, the processing shifts to step S79, and a cell position corresponding to the cell address (i, j) is displayed with a cursor. It should be noted that the cell-movement direction of "row" is set to the cell pointer management section 50 after determination of the row direction is made in step S72.

When reading-out is started in the column direction, in step S74, it is monitored how reading-out in one cell has ended. In step S74 if it is determined that the end is an interruption (step S75), the processing shifts to step S78, and only the cell pointer i of the present cell having address (i, j) where the interruption has occurred is reduced by one. The cell address (i–1, j) obtained by a result of the decrement is stored in the cell pointer management section 50 as a position from which the cell-movement is to be resumed. Then the processing ends.

In step S74, if it is determined that the end is a normal end of reading-out, the processing shifts to step S77 through step S75 and step S76, and the cell pointer i for the row is incremented by one. As a result, a cursor display position in the cell pointer management section 50 is updated. Then the processing returns to step S73, and the cursor display position indicating a position of the cell in being read out is moved to the position proceeded by one cell in the column direction.

As described above, in reading-out in the column direction, the same processing is executed in steps described below, however, in a case where reading-out for entire cells is to be ended or to forcefully be ended in the middle of the processing (step S76), the processing ends therein.

Also, when reading-out is started in the row direction, in step S80, it is monitored how reading-out in one cell has ended. In step S80, if it is determined that the end is an interruption (step S81), the processing shifts to step S84, and only the cell pointer j of the present cell having address (i, j) where the interruption has occurred is reduced by one. The cell address (i, j–1) obtained by a result of the decrement is stored in the cell pointer management section 50 as a cell position from which the cell-movement is to be resumed. Then the processing ends.

In step S80, if it is determined that the end is a normal end of reading-out, the processing shifts to step S83 through step S81 and step S82, and the cell pointer j for the column is incremented by one. As a result, a cursor display position in the cell pointer management section 50 is updated. Then the processing returns to step S79, and the cursor display position indicating a position of the cell in being read out is moved to the position proceeded by one cell in the row direction.

As described above, in reading-out in the row direction, the same processing is executed in steps described below, however, in a case where reading-out for entire cells is to be ended or to forcefully be ended in the middle of the processing (step S82), the processing ends therein.

Description is made herein for a concrete example thereof. FIGS. 36A to 36C are views for explaining transition of a cell cursor when data is read out according to the Embodiment 5. FIGS. 36A to 36C schematically show table documents respectively. In a case where data for the table document comprising four rows and four columns shown in FIG. 36 is read out in the row direction, a cell having address (1, A) is a starting point, and a cell as an object for being read out, namely a cursor display position is moved to a first row, a second row, a third row, and a fourth row along the direction indicated by the arrow (indicated by a dashed line in the figure). It should be noted that the cursor display position is indicated by dots inside a cell in FIG. 36, and when it is started, a cell with the cell address (1, A) is a cursor position.

Then, as shown in FIG. 36B, for instance, in a case where an interruption in the operation is detected in the middle of reading-out at a cell position (a cursor display position) in a cell having address (2, C), the address (2, C) of the cell is stored and managed in the cell pointer management section 50 as a position at which the cell-movement has stopped, and at the same time the cell pointer j in the column is reduced by one to the cell having address (2, C), then a position (2, B) from which the cell-movement is to be resumed is obtained.

As a result, as shown in FIG. 36C, the cursor display position goes back to the position (2, B) at which the cell-movement is to be resumed, and when the reading-out is resumed after the interruption, the position (2, B) at which the cell-movement is to be resumed becomes a starting point. Namely, the cell having address (2, B) becomes a cell as an object for read-out.

As described above, with the Embodiment 5, a cursor display position indicating a cell position to which data is inputted is moved to the cell position during voice-outputting in accordance with the voice output, and at the same time, in a case where the voice output is interrupted, the cursor display position on a table document is returned to a cell position by at least one before the current cell position, whereby it is possible to complement, during reading-out, a time lag between a timing of recognizing an error in inputted data and a timing of interrupting the reading-out for correcting the error, and with this processing, it is possible to reduce an amount of operations executed by a user to move a cursor to a position to be corrected after interruption.

The cursor display position is moved to the cell position during voice-outputting, and at the same time the cursor movement is stopped in a case where the voice-outputting is interrupted, then, when it is resumed, the cursor movement can be resumed from the cell position at which the cursor is currently stopped and the voice-outputting can also be resumed at the cell position, so that trouble of setting the read-out position again after interruption, which makes it possible to reduce an extra strain on a user.

In the Embodiments 1 to 5, setting of a pause while changing the position in between cells, in between rows, or in between columns in a table document has not been described, however, like in the Embodiment 6 described below, reading-out in accordance with collation may be realized by arbitrarily setting a pause while changing the position in between cells, in between rows, or in between columns therein. It should be noted that the Embodiment 6 is applicable to each of the embodiments described above.

Figure 37:
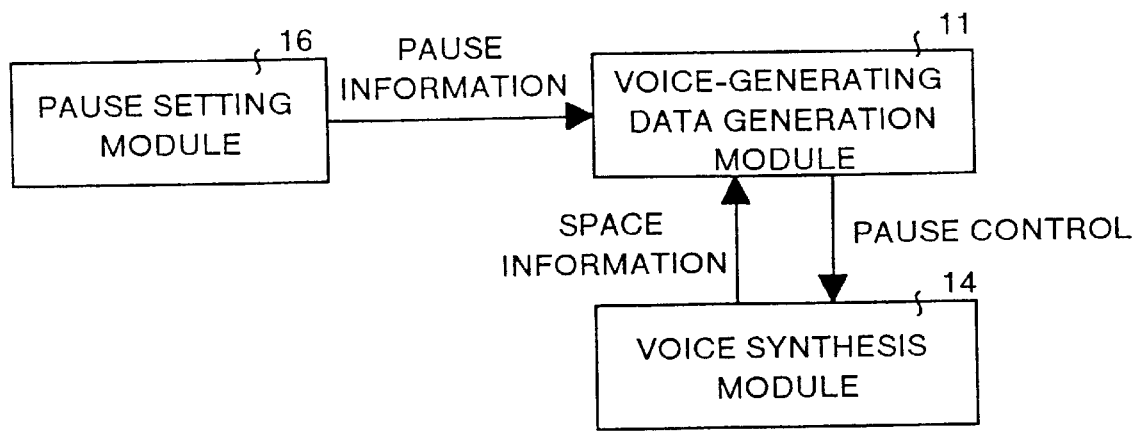
FIG. 37 is a functional block diagram for explaining the key sections of the internal functions in the apparatus for reading-out/collating of a table document according to the Embodiment 6 of the present invention.

At first, description is made for module configuration according to the Embodiment 6 of the present invention. FIG. 37 is a functional block diagram showing the key sections of the internal function of the apparatus for reading-out/collating a table document according to the Embodiment 6 of the present invention. The apparatus for reading-out/collating a table document according to the Embodiment 6 newly provides, in the functional blocks in the Embodiment 1 (Refer to FIG. 1), a pause setting module 16 therein.

In the Embodiment 6, pause information is arbitrarily set to a position in between cells, in between rows, or in between columns by the pause setting module 16, and the pause information is supplied to the voice-generating data generation module 11. Then, a table document is read out in the same way as explained in the Embodiment 1 and at the same time, when the pause information is supplied by the voice-generating data generation module 11 to the voice synthesis module 14, the voice synthesis module 14 pauses for a pre-specified period of time until the next reading-out is started according to the pause control. It should be noted that the voice synthesis module 14 transfers, when a read-out position reaches at a position in between cells, in between rows, or in between columns to which a certain pause is set, the pause information to the voice-generating data generation module 11, and receives pause control.

Figure 38:
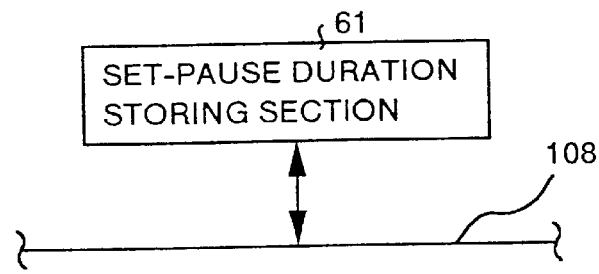
FIG. 38 is a block diagram showing the key sections of the internal configuration in the apparatus for reading-out/collating of a table document according to the Embodiment 6.

In the next description is made for configuration of the key section thereof. FIG. 38 is a block diagram showing a key section of internal configuration of the apparatus for reading-out/collating a table document according to the Embodiment 6. The entire configuration thereof is based on the configuration shown in FIG. 2 according to the Embodiment 1. The apparatus for reading-out/collating a table document according to the Embodiment 6 newly provides therein, as shown in FIG. 38, a set-pause duration storing section 61. The set-pause duration storing section 61 is a memory for storing thereon a pause inserted position or a pause time duration each set by the pause setting module 16.

Figure 39:
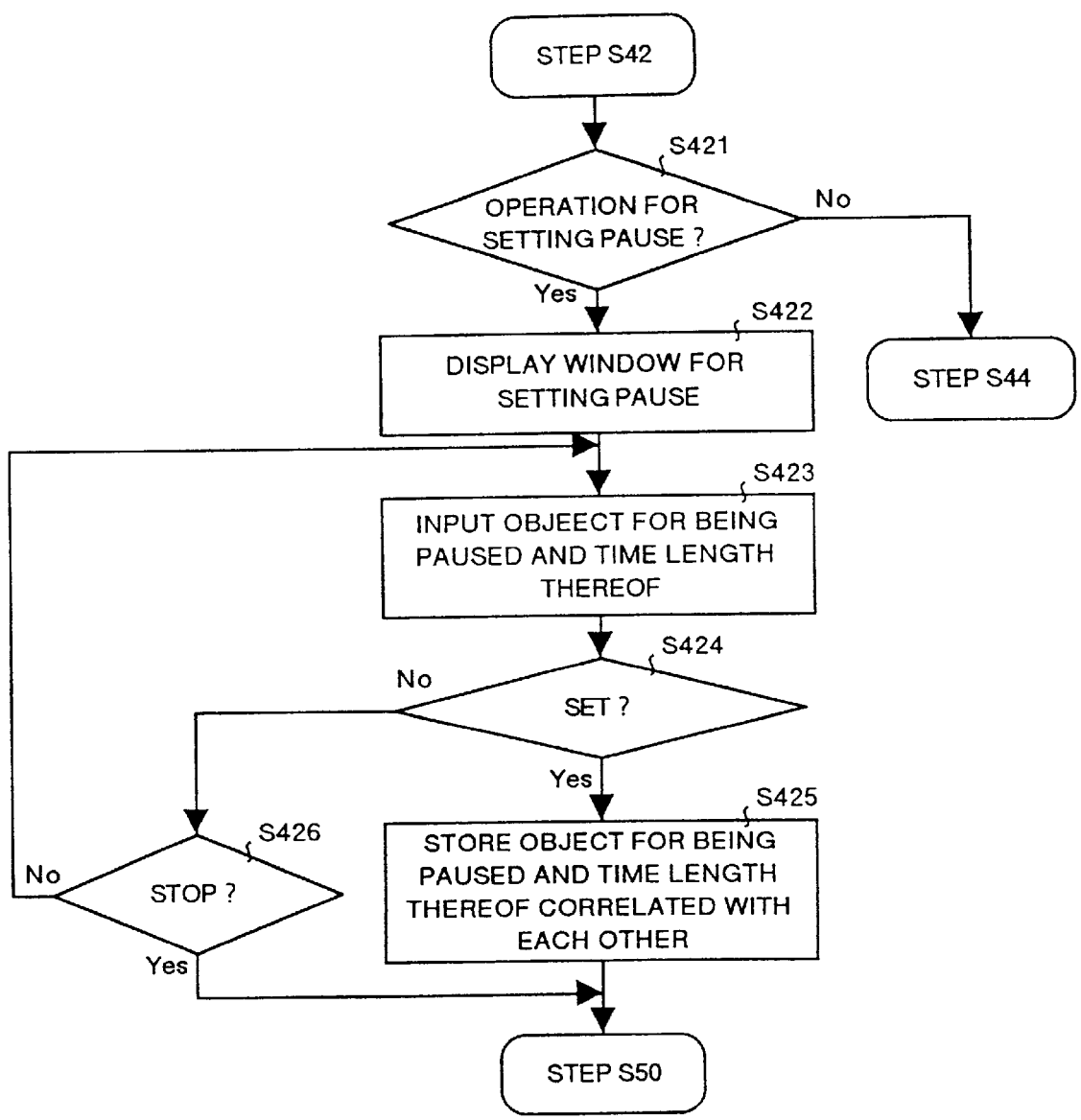
FIG. 39 is a flow chart for explaining operations of the key sections according to the Embodiment 6.
Figure 42:
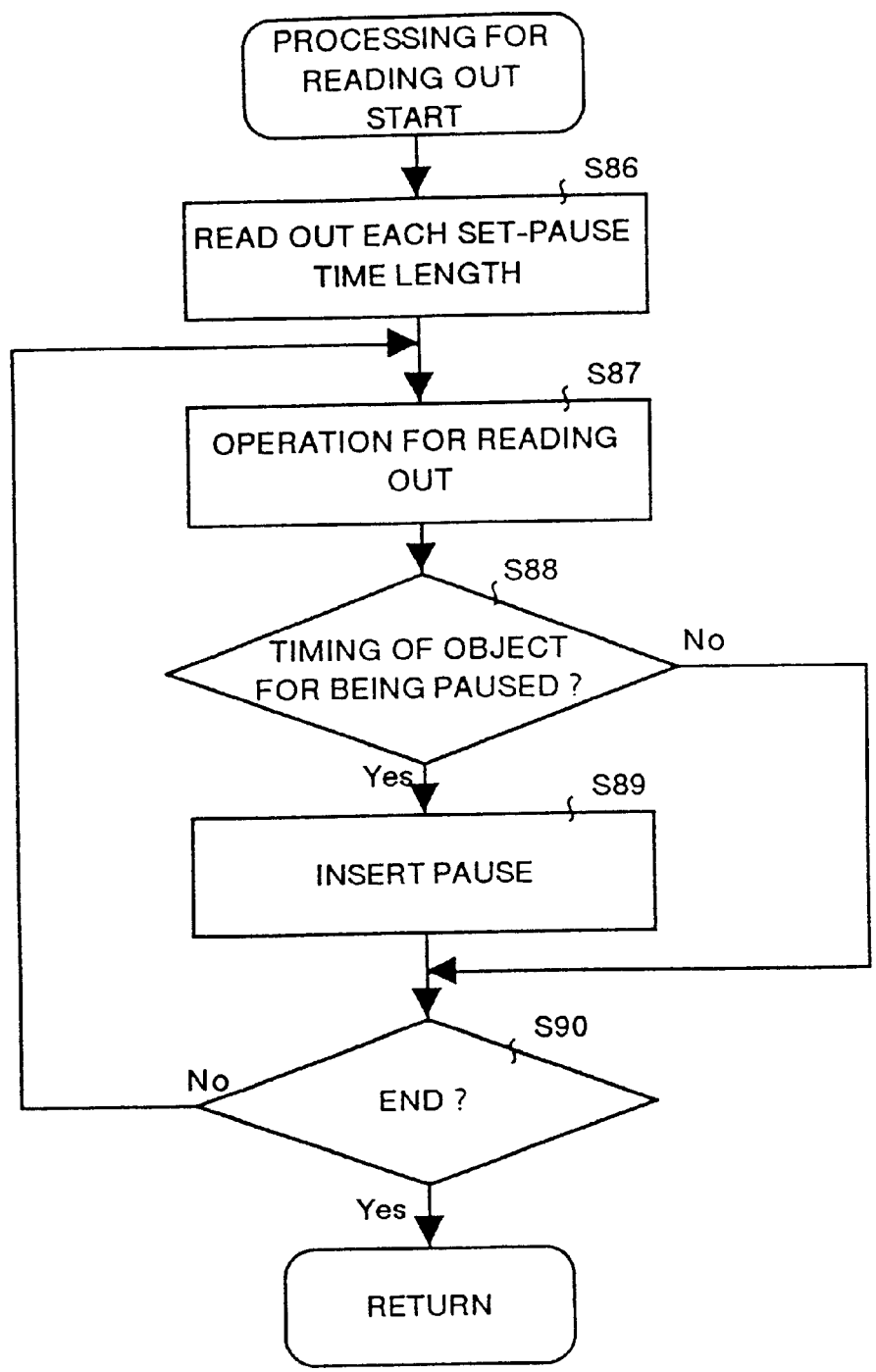
FIG. 42 is a flow chart for explaining operations of reading-out according to the Embodiment 6.

In the next description is made for main operations. FIG. 39 is a flow chart for explaining operations in the key section according to the Embodiment 6, FIGS. 40A and 40B are views for explaining transition of display screens when a pause time duration is set, FIG. 41 is a view for explaining contents stored in the set-pause duration storing section 61 when data is read out, and FIG. 42 is a flow chart for explaining operations in the read-out processing according to the Embodiment 6. It should be noted that, in FIG. 39, description is made herein for different points based on the flow chart shown in FIG. 22 described in The Embodiment 3.

During preparation of a table document, although not shown herein, an icon for reading-out for instructing reading-aloud of a table document (it is the same function as that in the icon for reading-out according to each of the embodiments described above) as well as a pause icon for executing pause setting by the pause setting module 16 are displayed on the display section 105 together with the table document being prepared thereon.

Now, in a case where any event operation is detected during preparation of the table document (step S42), it is determined whether the event operation is an operation to the pause icon (step S421), the event operation is an operation to the icon for reading-out (step S44), or it is some other operation such as an end of preparing the table document. As a result, if it is determined that the operation is the operation to the pause icon, a window IC61 for setting a pause is displayed as shown in FIG. 40A (step S422).

Displayed on the window IC61 for setting a pause are, as shown in FIG. 40A, click boxes (three types of pauses "between cells", "between rows", and "between columns") for setting an object for being paused for specifying a pause-insertion position, a set button for instructing recognition of all setting (a plurality of types of pauses can be set), and an end button to end the setting.

When a type of pause of "between cells" is selected as an object for being paused, as shown in FIG. 40A, a click box for selecting the time duration suitable for pausing in between the cells is further displayed. As far as the time duration of a pause in between cells is concerned, two type of time duration, for instance, 0.5 sec and 1.0 sec are displayed. Out of the two types of time duration, if 0.5 sec is selected, for instance, the time duration of 0.5 sec is displayed in a position corresponding to click box of "between cells" (step S423).

Further, when the set button is operated (step S424), the set button is displayed in a reverse mode (indicated by dots in the figure) as shown in FIG. 40A, and pause time duration of 0.5 sec is stored, as shown in FIG. 41, as a in the set-pause duration storing section 61 corresponding to cells that are object for pausing (step S425).

Then, during the time until the end button is operated (step S426), the processing returns to step S423 again, and the operations are repeated as described above. Further, when "between rows" is selected as an object for being paused, as shown in FIG. 40B, a click box for selecting a time duration suitable for the pausing time between the rows is further displayed. As for a pause between rows, two types of pause, such as 1.0 sec and 2.0 sec are displayed. Out of the two types of time duration, if 2.0 sec is selected, for instance, the time duration of 2.0 sec is displayed corresponding to the "between rows" (step S423).

Further, when the set button is operated (step S424), the set button is displayed in a reverse mode (indicated by dots in the figure) as shown in FIG. 40B, and the pause time duration of 2.0 sec is stored as shown in FIG. 41, In the set-pause duration storing section 61 correlated to "between rows" of an object for being paused (step S425). It should be noted that pause setting in between columns is executed by the same sequence as described above, so that description thereof is omitted herein.

When the end button in the window IC61 for setting pauses is operated while an object for being paused and the time duration are inputted in step S423 (step S426), the window IC61 for setting pauses is closed, and the processing returns to step S41 again through step S50.

When the icon for reading-out is operated in the above state (step S44: Refer to FIG. 22), the reading-out shown in FIG. 42 is started. Namely, at first, each of time duration for a pause in between cells, a pause in between rows, and a pause in between columns already stored in the set-pause duration storing section 61 is read out therefrom, and voice-generating data is generated based on item names and character information in a table document (step S86). Then, the table document is read out (step S87).

With the stored contents of pause setting shown in FIG. 41, for instance, pauses are inserted in between cells as well as in between rows, so that reading-out is started, and when the read-out position reaches the position of in between cells or in between rows, the position is decided as an object for pausing (step S88), and a pause according to the pause time duration is inserted therein (step S89). Namely, if the position is in between cells, a pause of 0.5 sec is inserted there, and if the position is in between rows, a pause of 2.0 sec is inserted there.

The operations from the step S87 to the step S89 are repeated as described above until all the reading-out is ended (S90).

As described above, with the Embodiment 6, during voice output, a pause state can be inserted in any one of in between cells, in between rows, and in between columns, or in between a combination of two or more thereof, so that an intoned difference between cells, between rows, or between columns is made clear, and for this reason it is possible to accurately support a user to grasp a change in the voice-output positions.

An arbitrary time duration of a pause can also be set, so that, if a time duration of each pause between cells, between rows, and between columns is changed from each other, it is possible to support user's unerring recognition as to whether the current read-out position exists in a pause between cells, a pause between rows, or a pause between columns. In the Embodiments 1 to 6, setting of an effect sound while changing the reading position in between cells, in between rows, or in between columns in a table document has not been described, however, like in the Embodiment 7 described below, reading-out in accordance with collation may be realized by arbitrarily setting an effect sound to a position in between cells, in between rows, or in between columns. It should be noted that the Embodiment 7 is applicable to each of the embodiments as described above.

Figure 43:
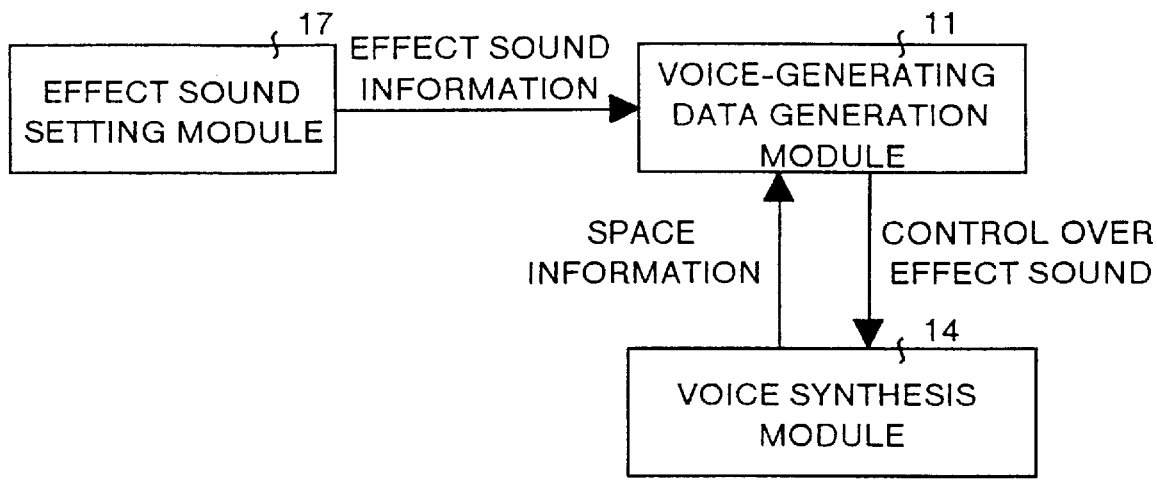
FIG. 43 is a functional block diagram for explaining the key sections of the internal functions in the apparatus for reading-out/collating of a table document according to the Embodiment 7 of the present invention.

At first, description is made for module configuration according to the Embodiment 7 of the present invention. FIG. 43 is a functional block diagram showing a key section of an internal function in the apparatus for reading-out/collating a table document according to the Embodiment 7 of the present invention. The apparatus for reading-out/collating a table document according to the Embodiment 7 newly provides, in the functional blocks in the Embodiment 1 (Refer to FIG. 1), an effect sound setting module 17 therein.

In the Embodiment 7, before reading-out, an arbitrary effect sound information is set to a position in between cells, in between rows, or in between columns by the effect sound setting module 17, and the effect sound information is supplied to the voice-generating data generation module 11. Then, a table document is read out in a similar way as in the Embodiment 1 and at the same time, when an effect sound information is passed from the voice-generating data generation module 11 to the voice synthesis module 14, the voice synthesis module 14 generates an effect sound according to control over the effect sound. It should be noted that the voice synthesis module 14 transfers, when a read-out position reaches at a pause between cells, a pause between rows, or a pause between columns to which an effect sound is set, pause information to the voice-generating data generation module 11, and receives control to an effect sound.

Figure 44:
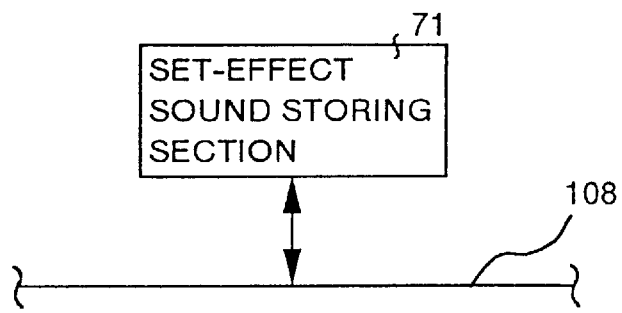
FIG. 44 is a block diagram showing a key sections the internal configuration in the apparatus for reading-out/collating of a table document according to the Embodiment 7.

In the next description is made for main configuration thereof. FIG. 44 is a block diagram showing the key section of internal configuration of the apparatus for reading-out/collating a table document according to the Embodiment 7. The entire configuration is based on the configuration shown in FIG. 2 according to the Embodiment 1. The apparatus for reading-out/collating a table document according to the Embodiment 7 newly provides therein, as shown in FIG. 44, a set-effect sound storing section 71. This set-effect sound storing section 71 is a memory for storing thereon an effect-sound inserted position and types of effect sound each set by the effect sound setting module 17.

Figure 45:
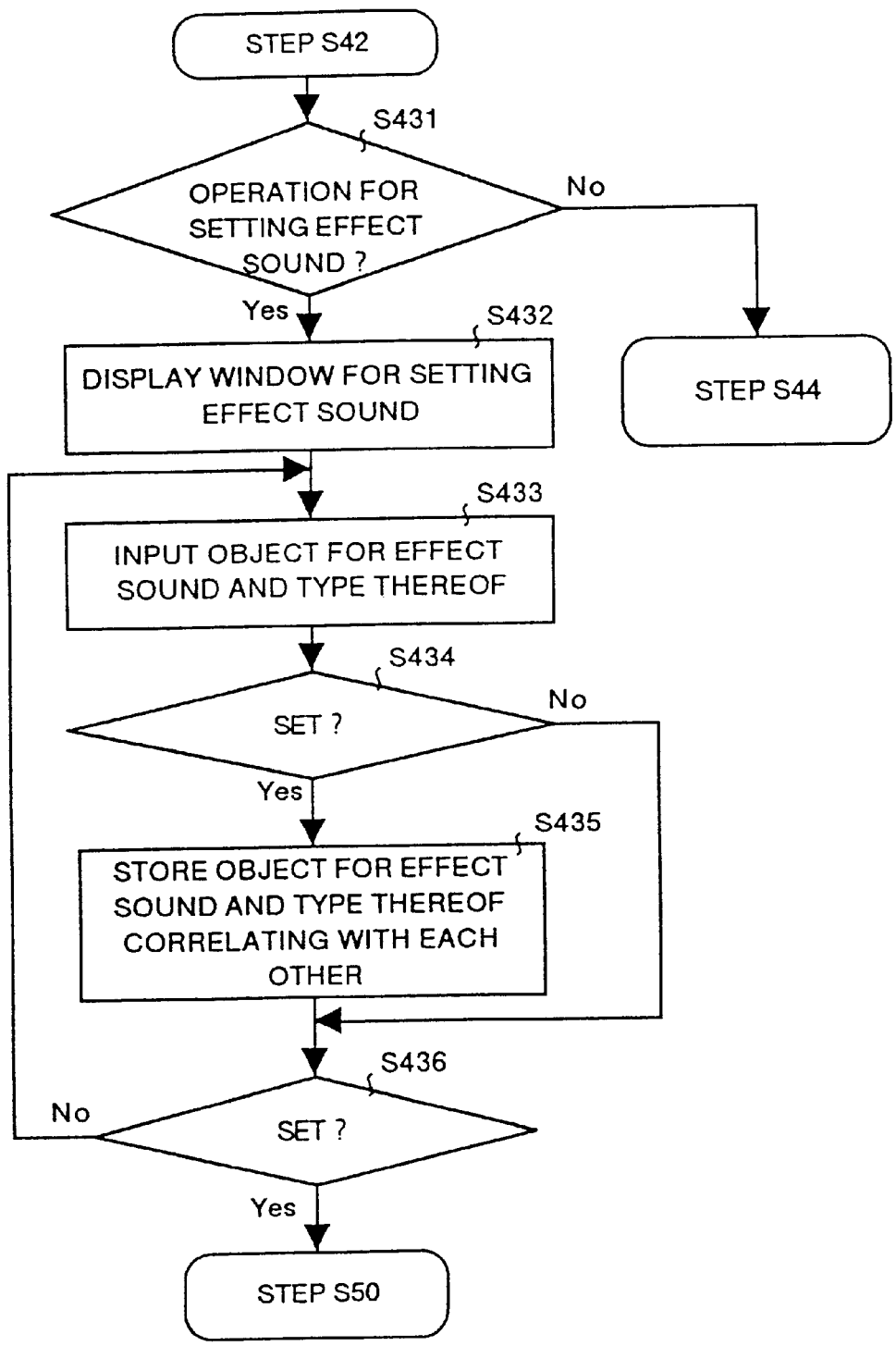
FIG. 45 is a flow chart for explaining operations of the key sections according to the Embodiment 7.
Figure 48:
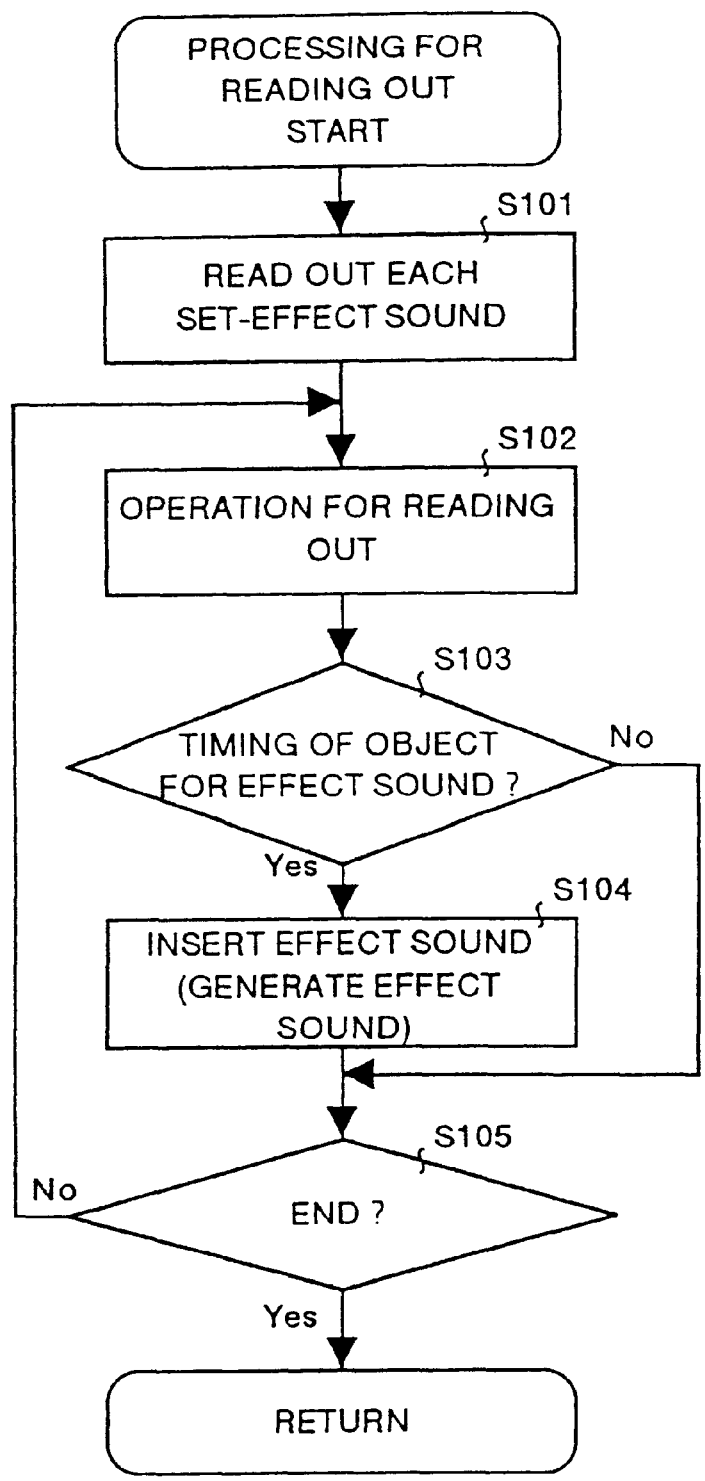
FIG. 48 is a flow chart for explaining operations of reading-out according to the Embodiment 7.

In the next description is made for operations. FIG. 45 is a flow chart for explaining operations of the key section according to the Embodiment 7, FIGS. 46A and 46B are views for explaining transition of display screens according to the Embodiment 7 when an effect sound is set, FIG. 47 is a view for explaining contents stored in the set-effect sound storing section 71 when data is read out, and FIG. 48 is a flow chart for explaining operations of reading-out according to the Embodiment 7.

During preparation of a table document, although not shown herein, an icon for reading-out for instructing reading-aloud of the table document (it is the same function as that in the icon for reading-out according to each of the embodiments mentioned above) as well as an effect sound icon for executing pause setting by the effect-sound setting module 17 are displayed on the display section 105 together with the table document being prepared thereon.

Now, in a case where any event operation is detected during preparation of the table document (step S42), it is determined whether the event operation is an operation to the effect sound icon (step S431), an operation to the icon for reading-out (step S44), or some other operation such as an end of preparing the table document. As a result, if it is determined that the operation is the operation to the effect sound icon, a window IC71 for setting an effect sound is displayed as shown in FIG. 46A (step S432).

Displayed on the window IC71 for setting an effect sound are, as shown in FIG. 46A, click boxes (corresponding to three types of pause of "between cells", "between rows", and "between columns") for setting an object for an effect sound for specifying an effect sound inserted position, a set button for instructing recognition of all setting (a plurality of types can be set), and an end button to end the setting.

Then, when "between cells" is selected as an object for an effect sound, as shown in FIG. 46A, a click box for selecting one out of, for instance, two types of effect sounds (a sound or a message) as a variation for a position between the cells is further displayed. Out of the two types of effect sounds, if a sound is selected, for instance, the sound is displayed in a position corresponding to "between cells" (step S433).

Further, when the set button is operated (step S434), the set button is displayed in a reverse mode (indicated by dots in the figure) as shown in FIG. 46A, and as shown in FIG. 47, "sound" as a type of effect sounds is stored in the set-effect sound storing section 71 correlated to "between cells" of an object for an effect sound (step S435).

Then, during the time until the end button is operated (step S436), the processing returns to step S433 again, and the operations are repeated as described above. Further, when "between rows" is selected as an object for an effect sound, as shown in FIG. 46B, a click box for selecting one out of two types of effect sound (sound, message), the same as that between the cells, as a variation for a position between the rows is further displayed. Out of the two types of effect sound, if a message is selected, for instance, the message is displayed in a position corresponding to "between rows" (step S433). It should be noted that, as far as the message is concerned, if the message is for "between cells", "it is between cells" is preferable, if it is for "between rows", "it is between rows" is preferable, and if it is for "between columns", "it is between columns" is preferable or the like.

Further, when the set button is operated (step S434), the set button is displayed in a reverse mode (indicated by dots in the figure) as shown in FIG. 46B, and as shown in FIG. 47, "message" as a type of effect sound is stored in the set-effect sound storing section 71 correlated to "between rows" of an object for an effect sound (step S435). It should be noted that effect sound setting also to a pause between columns is executed by the same sequence as described above, so that description thereof is omitted herein.

When the end button in the window IC71 for setting effect sounds is operated while an object for an effect sound and types of effect sound are inputted in step S433 (step 436), the window IC71 for setting effect sounds is closed, and the processing returns to step S41 again through step S50.

When the icon for reading-out is operated in the above state (step S44: Refer to FIG. 22), the reading-out shown in FIG. 48 is started. Namely, at first, each type of effect sounds for a position in between cells, in between rows, and in between columns already stored in the set-effect sound storing section 71 is read out therefrom, and voice-generating data is generated based on item names and character information in a table document (step S101). Then, the table document is read out. (step S102).

With the stored contents of setting effect sounds shown in FIG. 47, for instance, effect sounds are inserted in each position in between cells as well as position in between rows, and reading-out is started, and when the read-out position reaches a position in between cells or a position in between rows, the position is decided as a timing of an object for an effect sound (step S104), and an effect sound according to the type of effect sound is inserted therein (step S104). Namely, if the position is in between cells, the effect sound as "sound" is inserted there, and if the position is in between rows, an effect sound as "message" such as "it is between rows." is inserted there.

The operations from the step S102 to the step S104 are repeated as described above until all the reading-out is ended (S105).

As described above, with the Embodiment 7, an effect sound can be inserted in any one of a position in between cells, in between rows, and in between columns, or in position in between a combination of two or more thereof during voice output, so that an intoned difference between cells, between rows, or between columns is made clear, and for this reason it is possible to accurately support a user to grasp a change in voice-output positions.

An arbitrary effect sound is selected from types of previously prepared effect sound, so that, if an effect sound of each pause between cells, between rows, and between columns is changed from each other, it is possible to support user's unerring recognition as to whether the current read-out position exists in between cells, in between rows, or in between columns.

Also, sounds and messages indicating a pause or the like are included in types of effect sound, so that a variation can be given to the effect sounds.

In the description of the Embodiments 1 to 7 above, no comment was made on visual effect for a cell position as an object for reading out, but like in the Embodiment 8 described later, an object for reading out may be emphasized with a display color. The object for reading out as defined herein indicates any of three types; a cell, a row, or a column. It should be noted that this the Embodiment 8 can be applied to each of the embodiments described above.

The apparatus for reading-out/collating a table document according to this Embodiment 8 may have the configuration like that of any of the Embodiments 1 to 7 described above, and herein illustration and description thereof are omitted, and description is made only for the operations.

Figure 49:
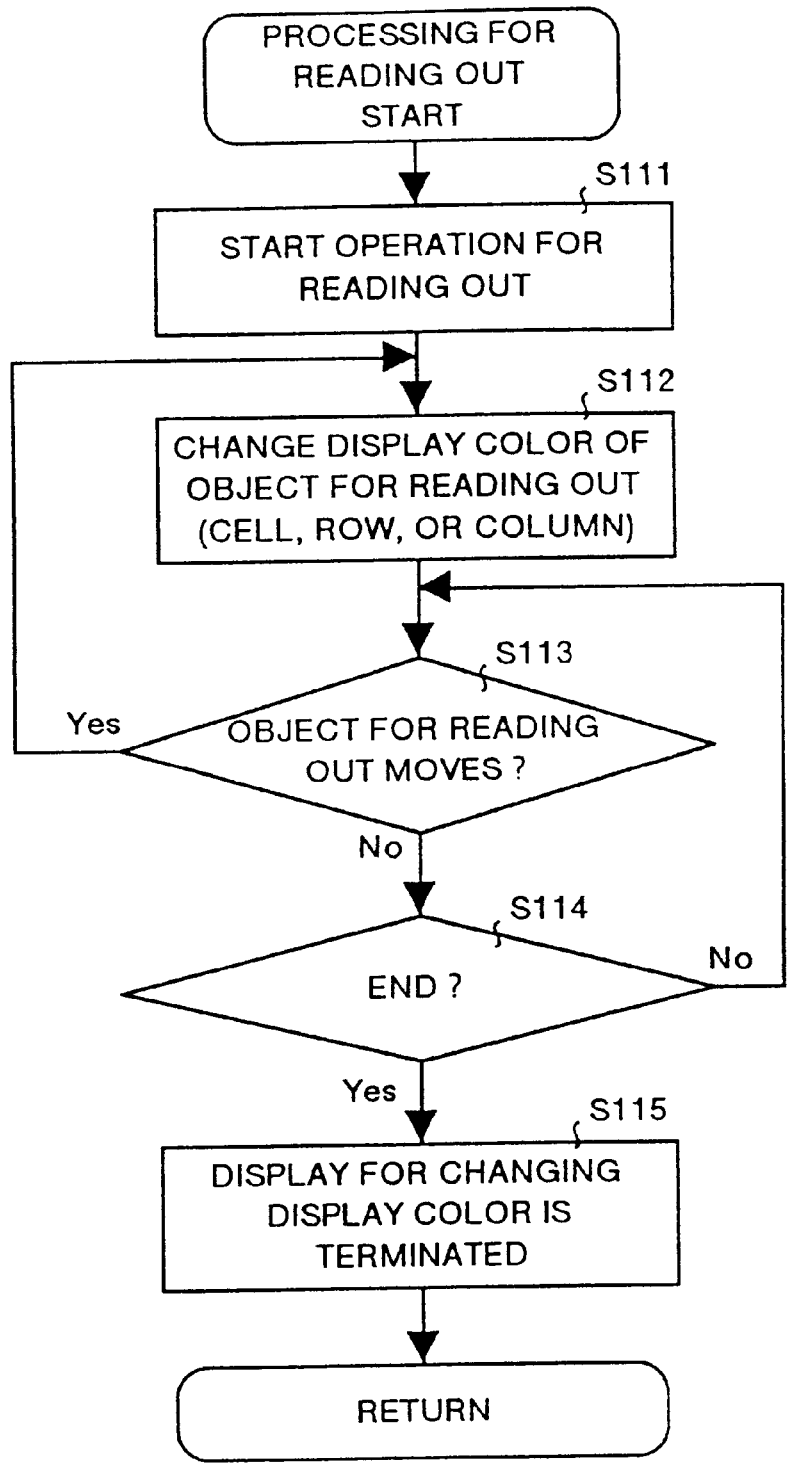
FIG. 49 is a flow chart for explaining operations of reading-out according to the Embodiment 8 according to the present invention.

Now description is made for the operations. FIG. 49 is a flow chart explaining operation in read-out processing in the Embodiment 8, and FIGS. 50A to 50C are views for explaining a cursor display when a table document is read out in the Embodiment 8. It should be noted that FIGS. 50A to 50C show a table document consisting of cells in 3 rows and 4 columns. Like each of the embodiments described above, cell pointers for a row are 1, 2, and 3, while cell pointers for a column are A, B, C, and D. In the Embodiment 8, when read-out processing is started, like in each of the Embodiments described above, an operation for reading out is started after generation of voice-generating data (step S111). Then, to differentiate a display color for an object for reading from that for other cells, the display color is changed to a pre-specified color (step S112). In this step, if an object for reading out is a cell, only color of the cell being read out is changed. For instance, as shown in FIG. 50A, if a cell having address (2, B) is an object for reading out, display color for this cell is changed (indicated by screen dots in the figure) to a display color different from that of the other cells (indicated by diagonal lines in the figures).

If an object for reading out is a row, an object for changing the display color is the whole row that includes the cell being currently read out. For instance, as shown in FIG. 50B, if the second row is an object for reading out, a display color for the second row is changed (indicated by screen dots in the figure) to a display color different from that of the other rows (indicated by diagonal lines in the figure). Also if an object for reading out is a column, an object for changing the display color is the whole column that includes the cell being currently read out. For instance, as shown in FIG. 50C, if a second column is an object for reading out, a display color for the second column is changed (indicates by screen dots in the figure) to a display color different from that of the other columns (indicated by diagonal lines in the figure).

In a case where an object for reading is a row or a column, then the reading-out direction is also matched. Namely, if the data is to be read out in a row direction, then a row can be specified as an object for reading out, and on the other hand if the data is to be read out in a column direction, a column can be specified a an object for reading out.

Returning to description of the read-out processing described above, after a display color for an object for reading out is changed, if an object for reading out moves (step S113), then the object for changing a display color is moved according to a destination for movement (step S112). Namely, if a cell is an object for reading out, when the object for reading out has moved in the reading-out direction, then the display color for a cell at the destination for movement is changed. Also if a row is an object for reading out, when the object has moved in the reading-out direction, now a display color for a row at the destination for movement is changed. Also, if a column is an object for reading out, when the object for reading out has moved in the reading-out direction, a display color for a column at the destination for movement is changed.

Thus, when the display color is changed following to the movement of the object for reading-out and all the reading-out is over (step S114) then, the process for changing the display color is terminated (step S115). Then this processing is ended.

As described above, in the Embodiment 8, a cell position that has become an object for reading out during phonetic output is displayed differently from the display color of the other cells, so that it is easy to visually track the position for phonetic output.

Furthermore, all cell positions arrayed in a column direction or in a row direction that has become the objects for reading out during phonetic output are displayed differently from display for other cell positions, so that it is easy to visually recognize a reading-out direction.

Also to differentiate the display, as cursor display is provided for a cell as an object for reading out, it becomes easy to visually recognize a reading-out direction from the cursor.

Also to differentiate the display, as a display color for a cell as an object for reading out is changed to a display colors different from the other cells, it becomes easy to visually recognize a reading-out direction from the display color.

In the description of the Embodiments 1 to 8 above, no comment was made for a way of reading out a cell in which no data has been inputted, namely a blank cell, but like in the Embodiment 9 described below, phonetic output may be allocated even to a blank cell. It should be noted that this Embodiment 9 can be applied also to any of the embodiments described above.

The apparatus for reading-out/collating a table document according to this Embodiment 9 may have the same configuration as that of any of the Embodiments 1 to 8 described above, and description and illustration thereof are omitted herein, and description is made only for operations thereof. The entire configuration is based on the configuration in the Embodiment 1 shown in FIG. 2.

Figure 51:
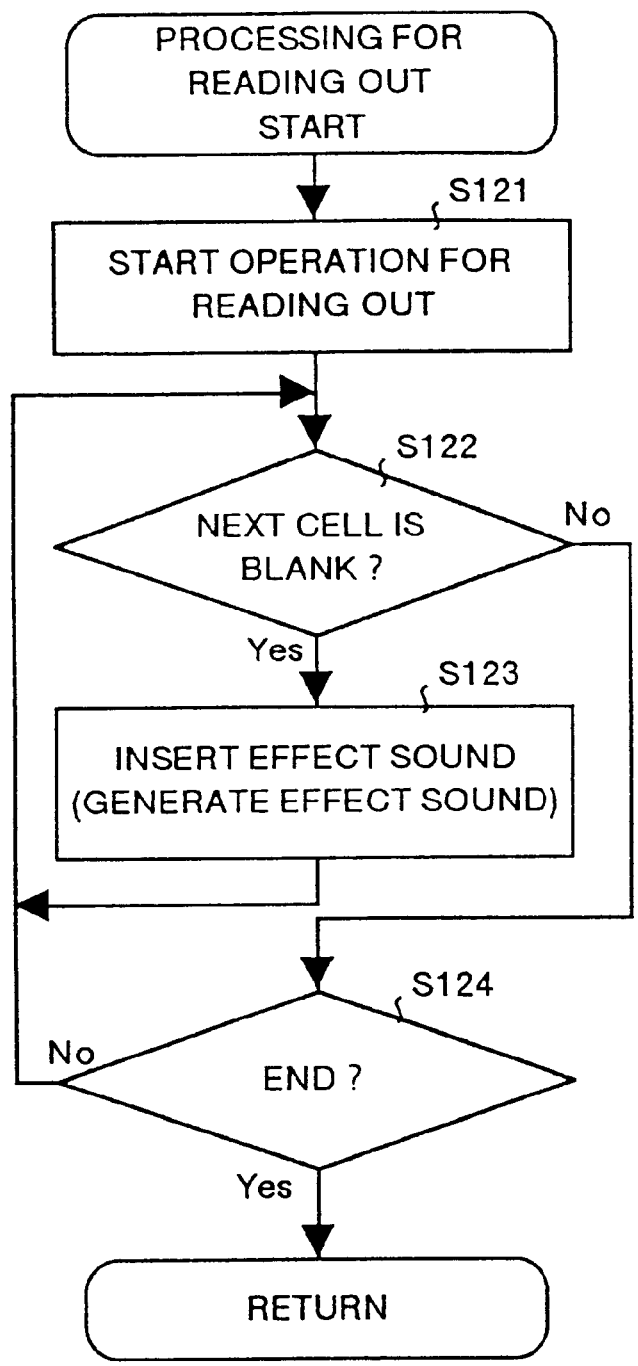
FIG. 51 is a flow chart for explaining operations of reading-out according to the Embodiment 9 of the present invention.

Now description is made for operations thereof. FIG. 51 is a flow chart illustrating operations in the read-out processing in the Embodiment 9, while FIGS. 52A and 52B are the views illustrating a read-out state in the Embodiment 9. It should be noted that FIGS. 52A and 52B show a table document SS9 consisting of cells in 3 rows and 3 columns. Like in each of the embodiments described above, cell pointers for a row are 1, 2, and 3, while cell pointers for a column are A, B, and C.

During preparation of a table document, a read-out icon IC91 for instructing an operation for phonetically reading out the table document SS9 (which functions likely to read-out icons in each of the embodiments described above) is displayed.

During preparation of a table document, if any event operation is detected, determination is made as to whether the event operation is an operation to the read-out icon IC91 or other operation such as terminating preparation of a table document. As a result, if start of reading out is instructed by operating the read-out icon IC91, as shown in FIG. 52B, a window IC92 including a message being currently read out and the stop button for it is displayed, and phonetic output is started from the phonetic output section 106.

Namely, in the table document SS9 shown in FIG. 52A, as "branch office name" which is an item name in the first column, "Tokyo branch office" and "Osaka branch office" are inputted. As the item name of "sales in the previous year", "50,000,000" is displayed in the second column for "Tokyo branch office" and "60,000,000" yen for "Osaka branch office". In the third column, no data for the item name "target sales in the current year" is inputted for "Tokyo branch office", nor for "Osaka branch office", so that the cell addresses (2, C), and (3, C) are blank cells.

So for the table document SS9, reading out the item name is omitted, and in a case where the reading-out direction has been specified to the row direction, as shown in FIG. 52B, at first the first row is phonetically read out with the voice generation of "Tokyo branch office, fifty million". Then, in step S122, it is determined that the next cell is a blank cell, so that, in the subsequent step S123, an effect sound is generated and for instance a sound of "peee" is outputted.

Then, the second row is phonetically read out with the voice generation of "Osaka branch office, sixty million". Then in step S122, it is determined that the next cell is a blank cell, in the subsequent step S123, an effect sound is generated, and for instance, the sound of "beep" is outputted. Thus, when an operation for reading out the two rows (step S124), this read-out processing is terminated.

As described above, with the Embodiment 9, an effect sound is generated for a blank cell, so that it is possible to prevent any blank cell from being overlooked. It should be noted that, as sometimes it is unnecessary to read out a blank cell with an effect sound, this operation may be executed selectively.

In description of the Embodiment 1 to 9 described above, no comment was made to a way of reading out in a case where identical data is present in cells arrayed in the reading-out direction, but like in the Embodiment 10 described later, if identical data is present in successive cells, the operation for reading out data in the cells may be executed efficiently. It should be noted that this Embodiment 10 can be applied to each of the embodiments described above.

The apparatus for reading-out/collating a table document according to this Embodiment 10 may have the configuration of any of the Embodiments 1 to 9 described above, and herein illustration and description thereof are omitted, and description is made only for operations in this Embodiment. The entire configuration is based on the configuration according to the Embodiment 1 shown in FIG. 2.

Figure 53:
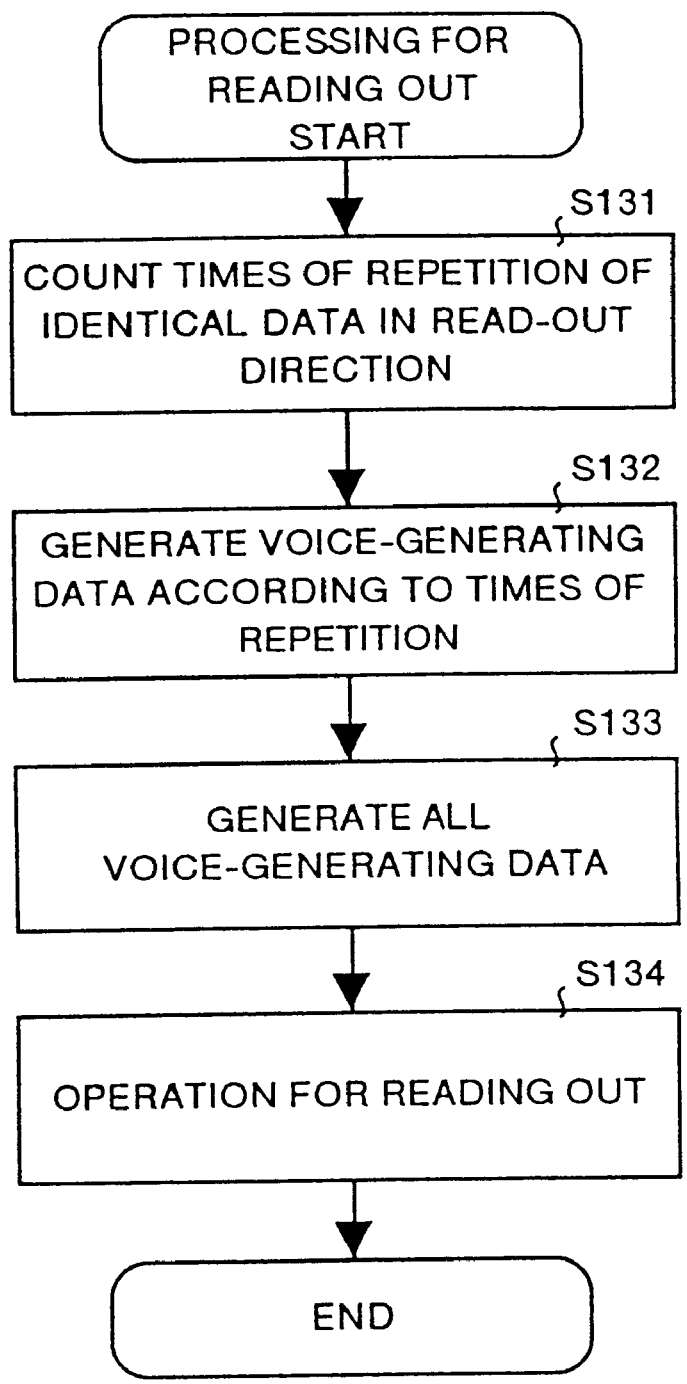
FIG. 53 is a flow chart for explaining operations of reading-out according to the Embodiment 10 of the present invention.
Figure 54A:
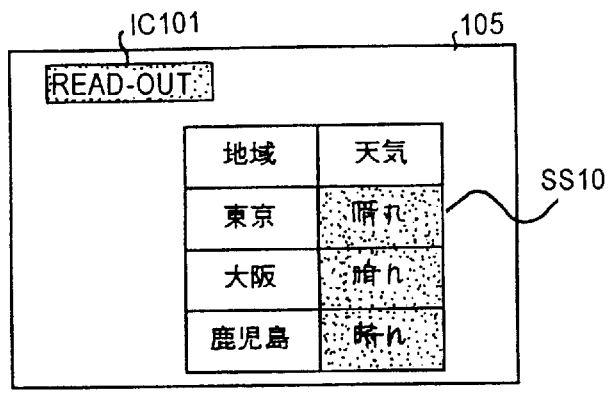
FIGS. 54A and 54B are views for explaining a read-out state according to the Embodiment 10.
Figure 54B:
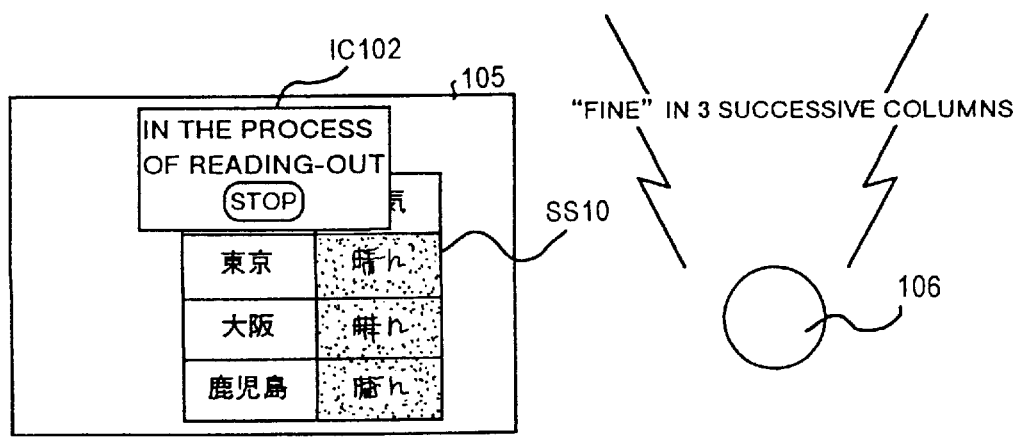

Hereafter description is made for operations in this embodiment. FIG. 53 is a flow chart for explaining operations in the read-out processing in the Embodiment 10, and FIGS. 54A and 54B are the views explaining the read-out state in the Embodiment 10. It should be noted that FIG. 54A and 54B show a table document consisting of cells in 4 rows and 2 columns. Like each of the embodiments described above, cell pointers for a row are 1, 2, 3, and 4, while cell pointers for a column are A, and B.

During preparation of a table document, in the display section 105, in addition to the table document SS10 being prepared, a read-out icon (which functions like a read-out icon in each of the embodiments above) IC101 for instructing it for the table document SS10 to be phonetically read out is displayed.

During preparation of a table document, if any event operation is detected, determination is made as to whether the event operation is an operation to the read-out icon IC101 or other operation such as terminating preparation of the table document. As a result, if start of reading out is instructed by operating the read-out icon IC101, as shown in FIG. 54B, a window IC102 including the message being read out now and the stop button is displayed, and phonetic output is started from the phonetic output section 106. Namely, in the table document SS9, as shown in FIG. 54A, as data corresponding to the item name of "Area", "Tokyo", "Osaka" and "Kagoshima" are inputted in the first column. As data for the item name of "Weather" in the second column, "Fine" is inputted for all of "Tokyo", "Osaka", and "Kagoshima".

As for the table document SS10, if it has previously been specified to save an operation for reading out data for item name and area name and to read out data in the column direction, in step S131, when voice-generating data is generated, times of repetition of identical data in cells successive in the read-out direction (in the column direction in the second column) is counted, and in the next step S132, voice-generating data is generated according to the times of repetition. In the example described above, as "fine" is present in 3 successive cells in the column direction, the number of the counts is 3 cells. As a result, the voice-generating data of "'Fine' in 3 successive cells" is generated. Thus, all the voice-generating data is generated (step S134). Then, as shown in FIG. 54B, phonetic output of "'Fine' in three successive columns" is outputted.

As described above, with the Embodiment 10, in a case where identical data appears successively in cells successive in the reading-out direction, voice-generating data for reading out the times of repetition of the identical data is generated for the section where the identical data appears successively, so that inefficient operation such as reading out identical data repeatedly can be saved, and the table document can be read out efficiently as a whole. It should be noted that, depending on the type the character string to be read-out there may be a case where it is not good to read only the times of repetitions, the operation above may be executed selectively.

It is possible not only to realize each of the Embodiments 1 to 10 independently, but to realize as a combination of two or more thereof.

In this invention, like in the Embodiment 11 described below, a display attribute of each cell data may be applied as a read-out attribute.

Figure 55:
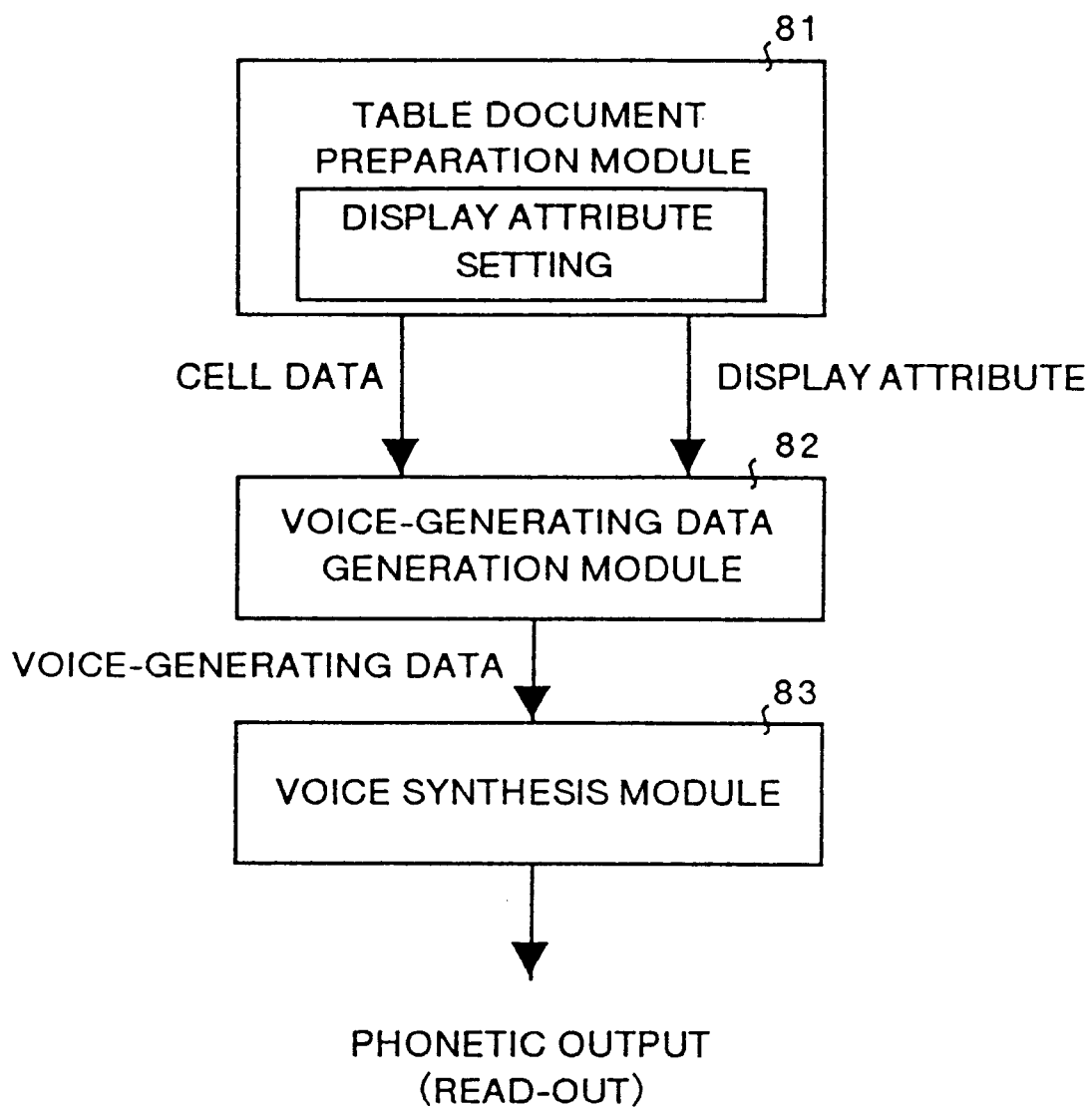
FIG. 55 is a functional block diagram for explaining the internal functions of the apparatus for reading-out/collating of a table document according to the Embodiment 11 of the present invention.

At first description is made for module configuration in the Embodiment 11. FIG. 55 is a functional block diagram for explaining internal functions of the apparatus for reading-out/collating a table document according to the Embodiment 11 of this invention. The module configuration shown in FIG. 55 includes a table document preparation module 81, a voice-generating data generation module 82, and a voice synthesis module 83. The table document preparation module 81 prepares a table document using known spreadsheet computing software, and outputs cell data such as item names and character information in the prepared table document to the voice-generating data generation module 82.

Also this table document preparation module 81 realizes a function equivalent to the read-out attribute setting module 22 described above (Refer to the Embodiment 2) by setting attributes specifying a display format for a character string such as a word, a date, a numerical value, and a numerical formula to cell data such as an item name and character information in a table document in preparation. Namely in this the Embodiment 11, a display attribute specifying a display format given to each cell is used as an attribute for reading out, and the display attribute and cell data are supplied to the voice-generating data generation module 82.

The voice-generating data generation module 82 generates voice-generating data consisting of a text in which Chinese characters and Kana (Japanese characters) coexist by specifying a display format such as an item name, a word, a date, a numerical value, and a numerical formula with a display attribute for cell data such as an item name or character information prepared by the table document preparation module 81.

The voice synthesis module 83 synthesizes voices according to voice-generating data consisting of a text in which Chinese characters and Kana (Japanese characters) inputted from the voice-generating data generation module 82, and voices obtained through voice synthesis are outputted. Namely, the voice synthesis module 83 reads out a table document by providing phonetic output according to voice-generating data (such as an item name, a word, a date, a numerical value, and a numerical formula) generated according to a display attribute in the voice-generating data generation module 82.

With the functional block having the configuration as described above, the table document preparation module 81 prepares a table document correlating an item name allocated to each cell to such data as a word, a date, a numerical value, or a numerical formula corresponding to the item name, while the voice-generating data generation module 82 correlates such data as a word, a date, a numerical value, and a numerical formula in cells in a preset reading-out direction, and generates a series of voice-generating data based on the correlated data such as a word, a date, a numerical value, and a numerical formula.

When generating the voice-generating data, the display format (a word, or a date, or a numerical value, or a numerical formula) specified according to a display attribute is used as it is as information specifying a way of reading out cell data, so that it is not necessary to set any specific attribute. For this reason, in the voice-generating data generation module 82, voice-generating data is generated according to a display format for cell data specified by the display attribute, namely a way of reading out the cell data.

As described above, when voice-generating data is generated in the voice-generating data generation module 82, the voice-generating data is outputted as a text in which Chinese characters and Kana (Japanese characters) coexist to the voice synthesis module 83, and the voice synthesis module 83 provides phonetic output with voice-generating data according to a display format specified by a display attribute, namely a way of reading out the cell data.

Figure 56:
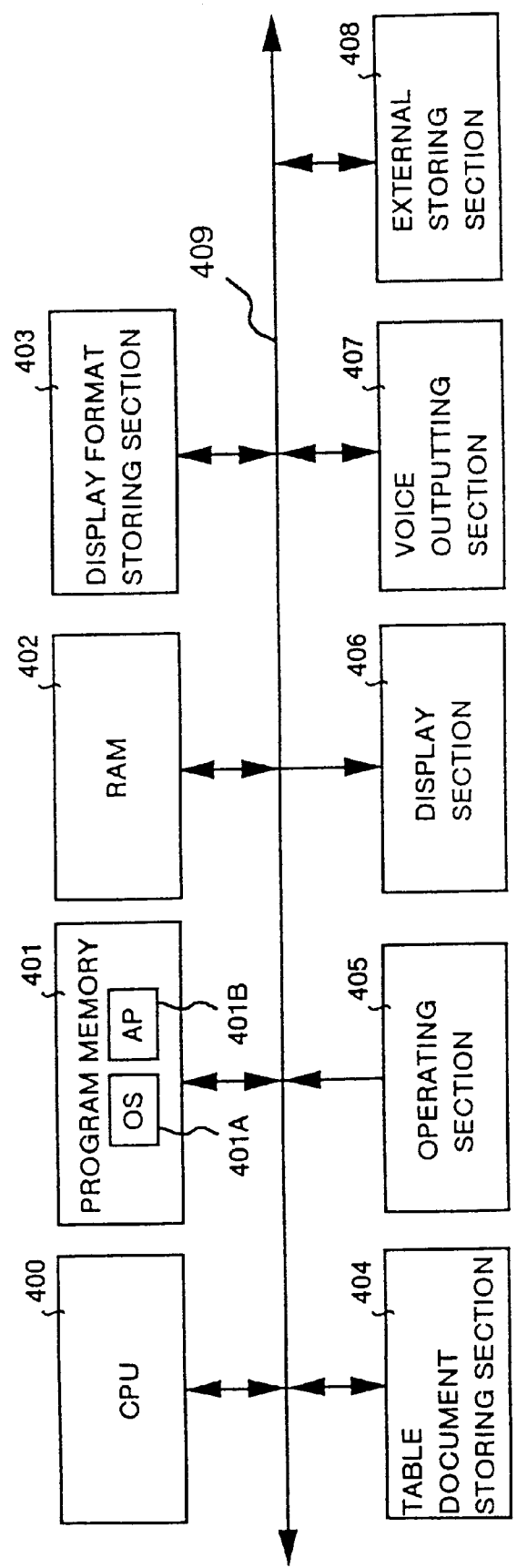
FIG. 56 is a block diagram showing internal configuration in the apparatus for reading-out/collating of a table document according to the Embodiment 11.

In the next description is made for configuration thereof. FIG. 56 is a block diagram showing internal configuration of the apparatus for reading-out/collating a table document according to the Embodiment 11. The table document apparatus for reading-out/collating a table document according to the Embodiment 11 comprises, as shown in FIG. 11, unit such as a CPU 400, a program memory 401 connected to the CPU 400 by an internal bus 409, a RAM 402, a display format storing section 403, a table document storing section 404, an operating section 405, a display section 406, a voice outputting section 407, an external storing section 408. It should be noted that the internal bus 409 is a transfer path through which a control signal, data, an address signal or the like are transmitted.

The CPU 400 is a unit for controlling operations of the entire apparatus according to various types of programs stored in the program memory 401. Namely, the CPU 400 provides controls over execution of various types of program stored in the program memory 401, reading/writing of data to and from the RAM 402, reading/writing of a way of reading out (display attribute) to and from the display format storing section 403, reading/writing of a table document to and from the table document storing section 404, reception of key-entry from the operating section 405, display in the display section 406, phonetic output to the voice outputting section 407, reading/writing of data to and from the external storing section 408, or the like.

The program memory 401 stores therein an operating system OS401A, application programs AP401B, and various parameters required for operations of the CPU 400. The application programs AP401B include programs for realizing various functions of the table document preparation module 81, voice-generating data generation module 82, and voice-synthesis module 83. The RAM 402 is used as a work area when the CPU 400 is running.

The display format storing section 403 is a memory for storing therein display attributes specified by the table document preparation module 81 for each table document file according to controls by the CPU 400. The table document storing section 404 is a memory for storing thereon a table document prepared by the table document preparation module 81. The operating section 405 has keys and switches for instructing operations such as preparation of table document or phonetic output through key entry. The display section 406 displays a table document or the like when prepared by the table document preparation module 81 according to controls by the CPU 400.

The voice outputting section 407 is a unit comprising an amplifier for outputting voices according to controls by the CPU 400, and a speaker. In this voice outputting section 407, a table document for which voice synthesis was executed by the voice synthesis module 83 is phonetically read out. The external storing section 408 reads/writes data to and from data such as a table document with an external memory media such as a floppy disk set thereon.

Figure 57:
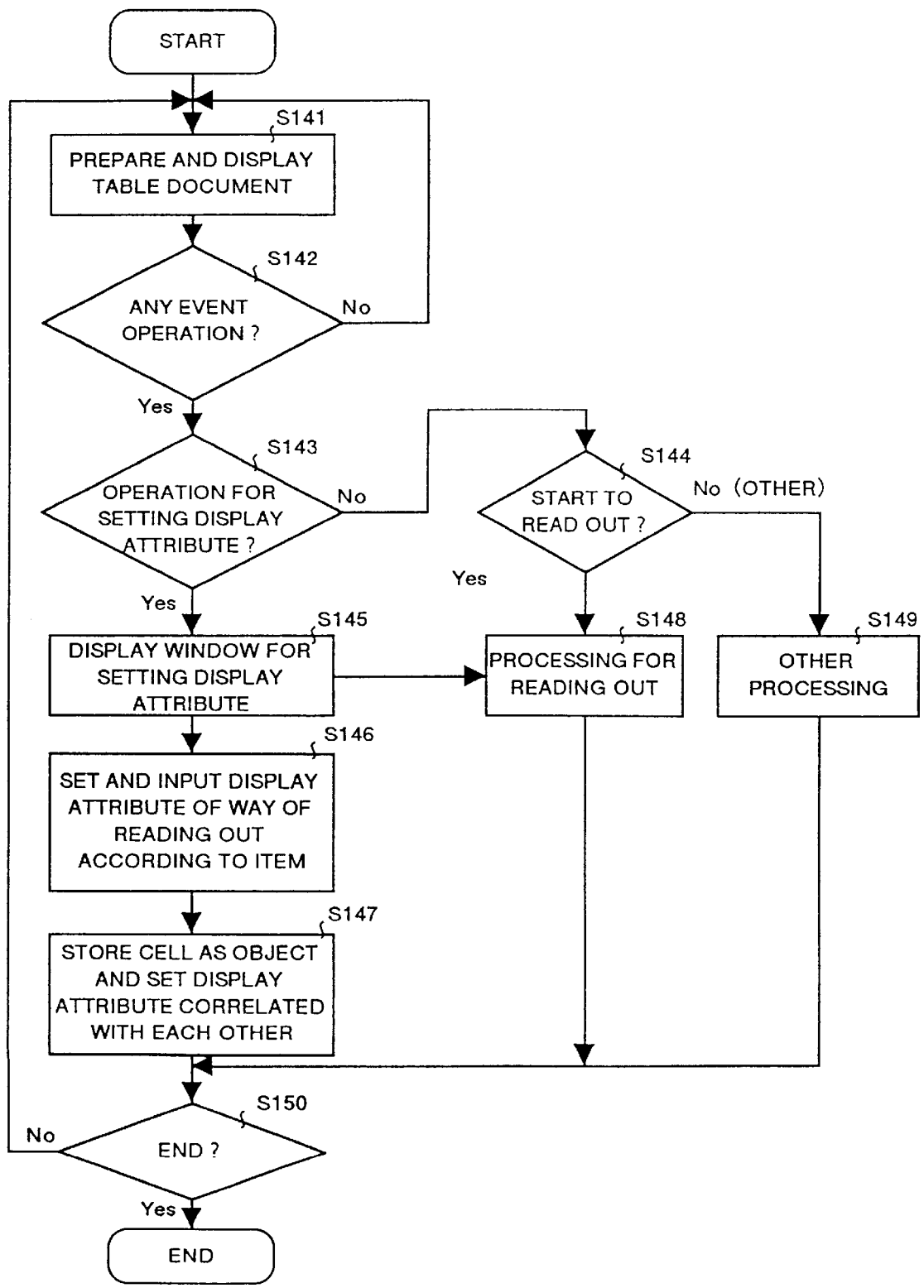
FIG. 57 is a flow chart for explaining operations according to the Embodiment 11.
Figure 58A:
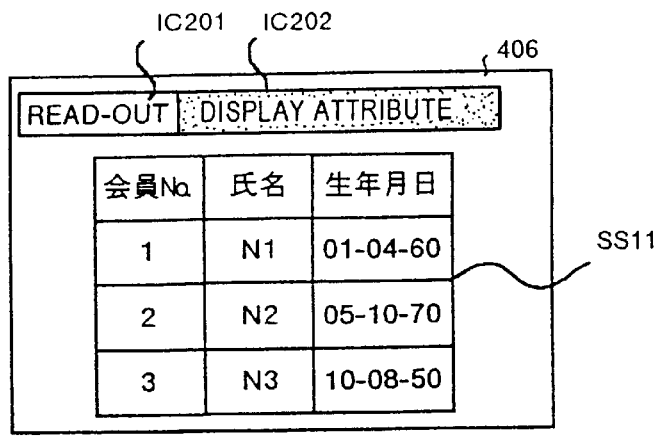
FIGS. 58A to 58C are views for explaining transitions of the display screen when data is read out according to the Embodiment 11.
Figure 58B:
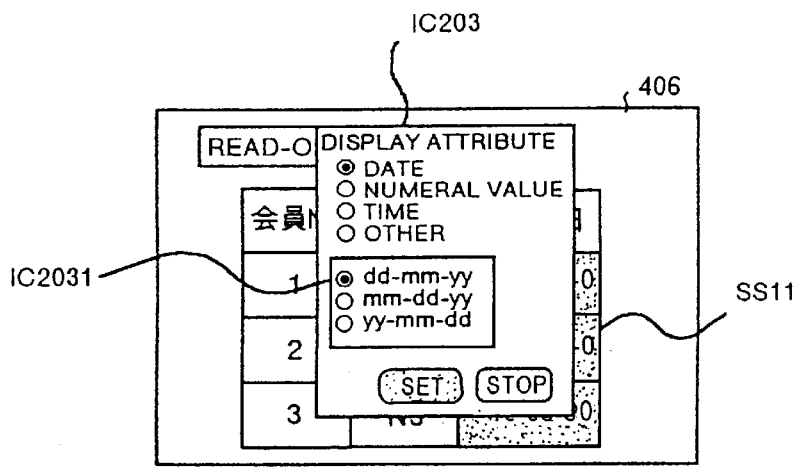
Figure 58C:
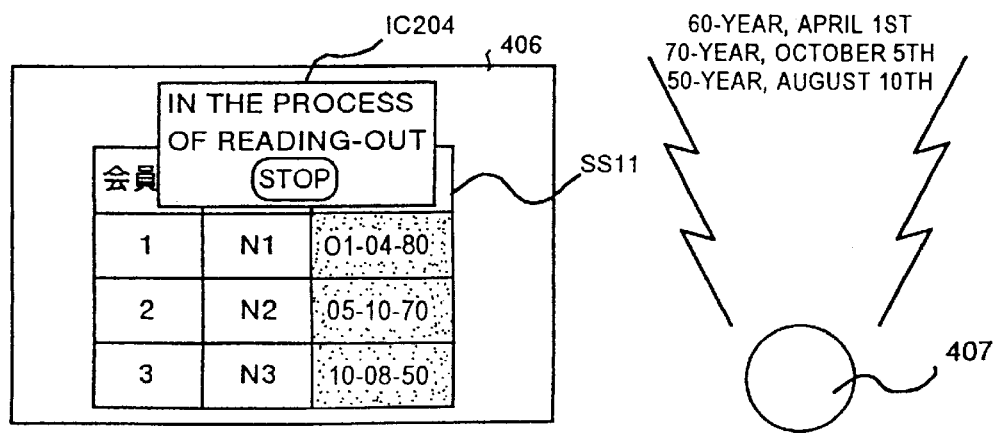
Figures 59, 60:
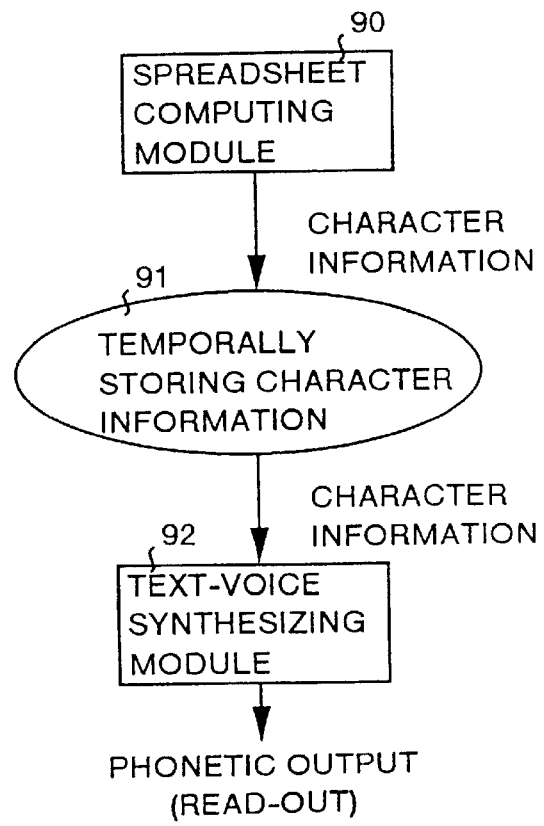
FIG. 59 is a view for explanation of contents stored in a way of reading out storing section according to the Embodiment 11.
FIG. 60 is a functional block diagram for explaining the internal functions of the apparatus for reading-out/collating of a table document based on the conventional technology.

In the next description is made for operations thereof. FIG. 57 is a flow chart for explaining operations in the Embodiment 11, FIGS. 58A to 58C are views for explaining transitions of a display screen during a reading-out operation in the Embodiment 11, and FIG. 59 is a view for explaining contents of data stored in the display format storing section 403. It should be noted that the following description of operations of the entire apparatus in which all the modules shown in FIG. 55 are linked.

During preparation of a table document, as shown in FIG. 58A, in the display section 406, in addition to the table document SS11 being prepared are displayed, a read-out icon IC201 for instructing a way of phonetically reading out the table document SS11 and a display attribute icon IC202 for setting the display attribute described above are displayed (step S141). The table document SS11 shown in FIG. 58A has the same contents as that of the table document SS2 shown in FIG. 12, so that description thereof is omitted herein.

During preparation of a table document, if any event operation is detected (step S142), determination is made as to whether the event operation is an operation ot the display attribute icon IC202 (step S143), an operation of the readout icon IC201 (step S144), or other operation such as terminating preparation of the table document. If the event operation is an operation to the display attribute icon IC202, as shown in FIG. 58A, the display attribute icon IC202 is displayed, for instance, in the a reverse mode (indicated by dots in the figure), and as shown in FIG. 58B, the window IC203 for setting a display attribute is displayed (step S145).

In the window IC203 for setting a display attribute described above, click boxes ("Date", "Numerical value", "Time", "Others") for setting one or a plurality of items as an object for setting a display attribute, a set button for instructing confirmation of setting, and a stop button for stopping the setting are displayed. After the window IC203 for setting a display attribute is displayed in step S145, when "Date" is selected in the click box, a click box IC2031 for an order of reading the item type "Date" is displayed. In this click box IC2031, as described above, an order of reading a date is displayed with a plurality of combined patterns of dd (day), mm (month), and yy (year). In the example shown in FIG. 58B, as a combined pattern, "dd-mm-yy" in the first stage is selected.

When the set button in the window IC203 for setting a display attribute is operated in the state shown in FIG. 58B (step S146), as shown in FIG. 58B, the set button is displayed in a reverse mode (indicated by dots in the figure), and as shown in FIG. 59, if the table document being processed currently is FILE-A, the file name "FILE-A", cells having addresses (2, C), (3, C), (4, C) as object cells, and display attribute of "Date: dd-mm-yy" are stored in the correlated form in the display format storing section 403 (step S147).

It is assumed herein that a cell which becomes an object for setting a display attribute is previously specified with an input device (included in the operating section 405) such as a mouse (shown in a reverse mode in FIG. 58B; namely by dots in the figure). Also, if the stop button in the window IC203 for setting a display attribute is operated during an operation for setting a display attribute in step S146, the window IC203 for setting a display attribute not shown herein is closed which is not shown here, and the control returns again to step S141.

Further, if the read-out icon IC202 is operated in the state (step S144), voice-generating data is generated according to a display format specified according to the display attribute stored in the display format storing section 403 for character strings corresponding to the cell addresses (2, C), (3, C), and (4, C). The table document is read out (step S148) as described above.

The operation for reading out is executed in the Embodiment 2 described above. Namely, voice-generating data, namely a character string at the address (2, C) is read out as "'60, April, first" according to the way of the display attribute setting as shown in FIG. 58B, and the voice-generating data, namely a character string as the address (3, C) as "'70, October, fifth", and voice-generating data, namely a character string at the address (4, C) as "'50, August, tenth".

When start of reading out is instructed in this state, as shown in FIG. 58C, a window IC24 including a message being read out and the stop button is displayed, and the cell data is phonetically read out with the pronunciation of "'60, April, first. '70, October, fifth. '50, August, tenth." is executed from the voice outputting section 106.

It should be noted that, in a case where other operation is detected instep S144, system control shifts to step S149 to execute the other processing, and then system control returns to step 141 again, but in a case where the other processing is processing for terminating preparation of a table document, termination is selected in step S150, and the processing is terminated.

As described above, with the Embodiment 11, display attribute specifying a display format of a character string in each cell is set, and phonetic output of a table document is executed by generating voice-generating data according to the display format of the character string specified by the display attribute, so that, even if any specific attribute is specified only for phonetic output, the table document is read out with a style suited to required collation of reading out from a display format set when the table document is prepared; whereby it is possible to realize efficient collation by reading out a table document with simple operations.

In each of the Embodiments 1 to 11 described above, a text in which Chinese characters and Kana (meaning: the Japanese characters) coexist is processed in the voice synthesis module, but this invention is not limited to this, and phonetic signs (including reading and accent) may be generated by the voice-generating data generation module in place of the text in which Chinese characters and Japanese characters coexist, and the voice synthesis module may receive the phonetic signs to synthesize voices.

As described above, with the invention as claimed in claim 1, data in each cell in a table document is correlated to each other in a pre-specified reading-out direction, and phonetic output is executed according to the correlated data, so that only the minimum information required for collation by reading out is read out and redundant information is prevented from being read out; whereby it is possible to obtain an apparatus for reading-out/collating a table document which can realize flexible collation of a table document by reading it out intended by user with simple operations, namely collation of a document (such as a hand-written document) for preparing a table document to a table document on a display screen by reading the document out without looking at a display substantially at all.

With the invention as claimed in claim 2 in combination with the one as described in claim 1, voice-generating data based on item information indicating the same item is selectively inserted in the beginning of voice-generating data in the same item, so that the voice-generating data is read out in combination with an item and contents of the item; whereby it is possible to obtain an apparatus for reading-out/collating a table document which additionally outputs item data in collation of a table document by reading it out.

With the invention as claimed in claim 3, a reading-out attribute restricting how a character string in a cell is to be read out is set, and a table document is phonetically outputted by generating voice-generating data according to a way of reading out a character string restricted by the reading-out attribute, so that a character string is not read out according to an order of the characters as it is, but is read out with a style suited to required collation by reading out; whereby it is possible to obtain an apparatus for reading-out/collating a table document which can realize efficient collation of a table document by reading it out intended by user with simple operations, namely collation of a document (such as a hand-written document) for preparing a table document to a table document on a display screen by reading the document out without looking at a display substantially at all.

With the invention as claimed in claim 4 in combination with the one as described in claim 3, a unique unit is added to voice-generating data in each cell, so that not only a style suited to collation by reading out can be obtained, but also addition of only minimum elements required for better understanding by listeners is necessary; whereby it is possible to obtain an apparatus for reading-out/collating a table document which can realize efficient collation of a table document by reading out with simple operations.

With the invention as claimed in claims 5 and 6, one or a plurality of ranges for phonetically reading out a displayed table document are specified, and phonetic output of the table document is executed within the specified one or a plurality of ranges for reading out, so that only cells requiring collation are read out; whereby it is possible to obtain an apparatus for reading-out/collating a table document which can realize flexible collation of a table document by reading it out intended by user with simple operations, namely collation of a document (such as hand-written document) for preparing a table document to a table document on a display screen by reading the document out without looking at a display substantially at all.

With the invention as claimed in claims 6 and 7, a way of reading out each character is specified according to a type of the character and phonetic output of the character is provided according to the specified way of reading out, so that a way of reading characters can be customized for each user; whereby it is possible to obtain an apparatus for reading-out/collating a table document which can make more flexible collation of a table document by reading out.

With the invention as claimed in claims 9 and 10, a display position for a cursor indicating a cell position where data is to be inputted is moved to a cell position for the data currently being phonetically outputted in association with phonetic output, and if phonetic output is interrupted, a cursor display position on the table document is returned to a cell by at least one cell before the current cell position, so that it is possible to correctly respond to the time difference between timing for recognizing an error in inputted data and timing for interrupting the operation for reading out for correcting the error; whereby it is possible to obtain an apparatus for reading-out/collating a table document which can reduce a work load for a user to remove the cursor to a position for modification after interruption of a reading-out operation.

With the invention as claimed in claims 11 and 12 in, pause state can be inserted, during phonetic output, in either one of between cells, between rows, and between columns, or in a combination of two or more of these, so that it can clearly be understood whether a pause is inserted between cells, between rows, or between columns; whereby it is possible to obtain an apparatus for reading-out/collating a table document which can accurately assist grasping change of a position for phonetic output.

With the invention as claimed in claims 13 and 14, duration of a pause can freely be specified, so that it is possible to obtain an apparatus for reading-out/collating a table document which can accurately assist recognizing change of a position for phonetic output by differentiating duration of pause between cells, between rows, and between columns from each other.

With the invention as claimed in claims 15 and 16, an effect sound can be inserted, during phonetic output, in either one of between cells, between rows, and between columns, or in a combination of two or more of these, whereby it is possible to obtain an apparatus for reading-out/collating a table document which can accurately assist recognizing whether a current position for phonetic output is between cells, between rows, or between columns.

With the invention as claimed in claims 17 and 18, an effect sounds previously prepared can freely be selected, so that it is possible to obtain an apparatus for reading-out/collating a table document which can accurately assist recognizing whether a current read-out position is between cells, between rows, or between columns by differentiating effect sounds for pauses between cells, between rows, and between columns from each other.

With the invention as claimed in claims 19 and 20, a sound, a message indicating a pause, or the like is included in data indicating a type of each effect sound, so that it is possible to obtain an apparatus for reading-out/collating a table document which can give variations to the effect sounds.

With the invention as claimed in claim 21, a cell position which is an object for reading out is displayed differently from other cell positions during phonetic output, so that it is possible to obtain an apparatus for reading-out/collating a table document which can easily and visually track a position for phonetic output.

With the invention as claimed in claim 22, cell positions arrayed in the column direction or in the row direction having an object for phonetic output are displayed differently from the other cell positions, so that it is possible to obtain an apparatus for reading-out/collating a table document which can easily and visually recognize a reading-out direction.

With the invention as claimed in claims 23 and 24, cursor display is provided for a cell as an object for reading out for different display, so that it is possible to obtain an apparatus for reading-out/collating a table document which can easily and visually recognize a reading-out direction with a cursor.

With the invention as claimed in claims 25 and 26, a display color for a cell as an object for reading out is changed to a display color different from those for the other cells, so that it is possible to obtain an apparatus for reading-out/collating a table document which can easily and visually recognize a reading-out direction with a display color.

With the invention as claimed in claims 27 and 28, cursor display position is moved to a cell position for current phonetic output, and in a case where phonetic output is interrupted, cursor movement is stopped, and then if phonetic output is resumed, cursor movement is started from a cell position at which the cursor had stopped, and phonetic output is restarted from this cell position, so that it is possible to provide an apparatus for reading-out/collating a table document in which work load for resetting a reading-out position after interruption can be saved and a work load to a user can be reduced.

With the invention as claimed in claims 29 and 30, an effect sound is generated to a cell position which is blank, so that it is possible to obtain an apparatus for reading-out/collating a table document which prevent any blank cell from being overlooked.

With the invention as claimed in claims 31 and 32, in a case where identical data is arrayed in a reading-out direction, voice-generating data that contains information on the times of repetition of the identical data is generated, so that it is possible to obtain an apparatus for reading-out/collating a table document in which inefficient processing such as reading out identical data repeatedly can be saved and it is possible to efficiently read out a table document as a whole.

With the invention as claimed in claim 33, a display attribute restricting a way of displaying a character string in a cell is set, and phonetic output of a table document is executed by generating voice-generating data according to the way of displaying the character string specified by the display attribute, so that a document is read out with a style suited to required collation by reading out from a display format set when an table document is prepared even if any specific attribute dedicated to phonetic output is not set; whereby it is possible to obtain an apparatus for reading-out/collating a table document which can realize efficient collation of a table document by reading it out with simple operations.

With the invention as claimed in claim 34, there are provided steps for correlating data in cells in a preset reading-out direction from a prepared table document, and phonetic output is executed according to the correlated data, so that only the minimum information required for collation of the table document for reading out is read out and redundant information is prevented from being read out; whereby it is possible to obtain a method for reading-out/collating a table document in which flexible collation of a table document intended by a user with simple documents can be realized.

With the invention as claimed in claim 35, a reading-out attribute specifying a way of reading out a character string in each cell is set, phonetic output of a table document is executed according to the specified way of reading out the character string specified by the reading-out attribute, so that a character string is not read out in an order of the characters as it is, but is read out with a style suited to the required collation; whereby it is possible to obtain a method for reading-out/collating table document in which flexible collation of a table document by reading it out intended by user with simple operations can be realized, namely collation of a document (such as hand-written documents) for preparing a table document to a table document on a display screen by reading the document out without looking at a display substantially at all.

With the invention as claimed in claim 36 and 37, one or a plurality ranges for phonetically reading out a displayed table document are set, and phonetic output of the table document is executed within the specified one or a plurality of ranges for reading out; whereby it is possible to obtain a method for reading-out/collating table document in which flexible collation of a table document by reading it out intended by user with simple operations can be realized, namely collation of a document (such as hand-written document) for preparing a table document to a table document on a display screen by reading the document out without looking at a display substantially at all.

With the invention as claimed in claim 38, a display attribute for specifying a way of displaying a character string in each cell is set and phonetic output of a table document by reading it out is executed by generating voice-generating data according to the way of displaying the character string specified by the display attribute, so that, even if any specific attribute dedicated for phonetic output is not set, a table document is read out with a style suited to required collation for reading out from a display format set when a table document is prepared; whereby it is possible to obtain a method for reading-out/collating table document in which efficient collation of a table document by reading it out intended by user with simple operations can be realized, namely collation of a document (such as hand-written document) for preparing a table document to a table document on a display screen by reading the document out without looking at a display substantially at all.

With the memory media according to claim 39, a program making a computer execute the method described in any of claims 34 to 38 is recorded therein, so that the computer can read out the program; whereby it is possible to realize each of the operations described in claims 34 to 38 with a computer.

This application is based on Japanese patent application No. HEI 9-96157 filed in the Japanese Patent Office on Apr. 14, 1997, the entire contents of which are hereby incorporated by reference.

Although the invention has been described with respect to a specific the Embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for reading-out/collating a table document, said table document having a plurality of cells arrayed in rows and columns for inputting character string data thereto, comprising:

a table document preparation module for preparing said table document by correlating item information indicating an item allocated to each cell to the data indicating contents of an item corresponding to the item information;

a generation module for generating a voice generating data by correlating said data indicating contents of an item of the cells of said table document arrayed in a preset read-out direction; and a voice synthesis module for outputting voices according to said voice-generating data.

2. An apparatus for reading-out/collating a table document to claim 1; wherein said generation module selectively inserts a voice-generating data that indicates same items in the beginning of the voice-generating data based on item information indicating the same items.

3. An apparatus for reading-out/collating a table document according to claim 1, said table document having a plurality of cells arrayed in rows and columns for inputting character string data thereto, further comprising:

a display for displaying said table document; and a range setting module for arbitrarily setting one or more ranges for phonetically reading out m (m: natural number) rows×n (n: natural number) columns of cells in said table document displayed on said display.

4. An apparatus for reading-out/collating a table document according claim 1 further comprising:

a character pronunciation setting module for arbitrarily setting a way of reading-out of each character according to the type of the character; and a character pronunciation storing memory for storing therein said way of reading-out of a character; wherein said voice synthesis module phonetically outputs a character according to the way of reading-out of that character stored in said character pronunciation storing memory.

5. An apparatus for reading-out/collating a table document according claim 1 further comprising:

a cursor position controlling module for a) moving a cursor display position, said cursor position indicating a cell where data is to be inputted, during output of voices from the cell in association with voice output by said voice synthesis module in the table document displayed on said display, and b) in case the voice output from the voice synthesis module is interrupted, for shifting said cursor position to a position which is at least one cell before the cell position where the voice output is interrupted.

6. An apparatus for reading-out/collating a table document according to claim 1 further comprising;

a pose setting module for either setting or not setting a pause in between two cells or in between two rows or in between two columns or in between a combination these; wherein said voice synthesis module inserts a pause state during output of voices when a pause is set by said pause setting module or not.

7. An apparatus for reading-out/collating a table document according to claim 6; wherein said pause setting module arbitrarily sets the duration of the pause.

8. An apparatus for reading-out/collating a table document according to claim 1 further comprising;

a effect sound setting module for either setting or not setting a effect sound in between two cells or in between two rows or in between two columns or in between a combination these; wherein said voice synthesis module inserts a effect sound during output of voices when an effect sound is set by said effect sound setting module.

9. An apparatus for reading-out/collating a table document according to claim 8; wherein said effect sound setting module arbitrarily selects one type of effect sound from many types of effect sounds previously prepared.

10. An apparatus for reading-out/collating a table document according to claim 9; wherein said types of effect sounds include a sound or a message indicating a pause.

11. An apparatus for reading-out/collating a table document according to claim 1 further comprising;

a cursor position controlling module for a) moving a cursor display position, said cursor position indicating a cell position where data is to be inputted to a cell position from which voice is being outputted in association with voice output by said voice synthesis module on a table document displayed on said display, and b) also for stopping cursor movement in a case where voice output by said voice synthesis module is interrupted and then resuming movement of the cursor from the cell position where the cursor is currently present when voice output by said voice synthesis module is resumed;

wherein said voice synthesis module resumes voice output from the cell position from which voice output is resumed by said cursor position controlling module in a case where voice output is to be resumed.

12. An apparatus for reading-out/collating a table document according to claim 1; wherein said generation module inserts voice-generating data for generating effect sounds to a cell position which is blank in said voice-generating data.

13. An apparatus for reading-out/collating a table document according to claim 1; wherein said generation module generates voice-generating data, in a case where the same data is arrayed in the reading-out direction, for reading out the number of times when the same data is to be read out repeatedly.

14. An apparatus for reading-out/collating a table document, said table document having a plurality of cells arrayed in rows and columns for inputting character string data thereto, comprising:

a read-out attribute setting module for setting readout attributes providing information on how a character string is to be read out in each cell of said table document;

a attribute storing memory for storing therein said read-out attributes in correlation to each cell of said table document; a generation module for generating voice-generation data from the character string data in each cell of said table document and the read-out attributes stored in said attribute storing memory; and a voice synthesis module for outputting voices according to said voice-generating data.

15. An apparatus for reading-out/collating a table document according to claim 14; wherein said read-out attributes include the type of the data to be inputted into a cell, further comprising:

a unit storing memory for storing therein a specific unit for each type of data, and said generation module appends a specific unit stored in said unit storing memory to said voice-generating data in each cell according to a type of data to be inputted into each cell.

16. An apparatus for reading-out/collating a table document according to claim 14, said table document having a plurality of cells arrayed in rows and columns for inputting character string data thereto, further comprising:

a display for displaying said table document; and a range setting module for arbitrarily setting one or more ranges for phonetically reading out m (m: natural number) rows×n (n: natural number) columns of cells in said table document displayed on said display.

17. An apparatus for reading-out/collating a table document according claim 14 further comprising:

a character pronunciation setting module for arbitrarily setting a way of reading-out of each character according to the type of the character; and a character pronunciation storing memory for storing therein said way of reading-out of a character; wherein said voice synthesis module phonetically outputs a character according to the way of reading-out of that character stored in said character pronunciation storing memory.

18. An apparatus for reading-out/collating a table document according to claim 14 further comprising:

a cursor position controlling module for
a) moving a cursor display position, said cursor position indicating a cell where data is to be inputted, during output of voices from the cell in association with voice output by said voice synthesis module in the table document displayed on said display, and
b) in case the voice output from the voice synthesis module is interrupted, for shifting said cursor position to a position which is at least one cell before the cell position where the voice output is interrupted.

19. An apparatus for reading-out/collating a table document according to claim 14 further comprising;

a pose setting module for either setting or not setting a pause in between two cells or in between two rows or in between two columns or in between a combination these; wherein said voice synthesis module inserts a pause state during output of voices when a pause is set by said pause setting module or not.

20. An apparatus for reading-out/collating a table document according to claim 19; wherein said pause setting module arbitrarily sets the duration of the pause.

21. An apparatus for reading-out/collating a table document according to claim 14 further comprising;

a effect sound setting module for either setting or not setting a effect sound in between two cells or in between two rows or in between two columns or in between a combination these; wherein said voice synthesis module inserts a effect sound during output of voices when an effect sound is set by said effect sound setting module.

22. An apparatus for reading-out/collating a table document according to claim 21; wherein said effect sound setting module arbitrarily selects one type of effect sound from many types of effect sounds previously prepared.

23. An apparatus for reading-out/collating a table document according to claim 22; wherein said types of effect sounds include a sound or a message indicating a pause.

24. An apparatus for reading-out/collating a table document according to claim 14; wherein said display displays a cell position which Is an object for reading-out by said voice synthesis module differently from the other cell positions.

25. An apparatus for reading-out/collating a table document according to claim 24; wherein said display changes the display color for a cell as an object for reading out, to a display color different from those for other cells.

26. An apparatus for reading-out/collating a table document according to claim 24; wherein said display displays a cell, which is an object for reading out, with a cursor.

27. An apparatus for reading-out/collating a table document according to claim 14; wherein said display displays the cells position arrayed in rows and columns which are the object for reading-out by said voice synthesis module differently from the other cell positions.

28. An apparatus for reading-out/collating a table document according to claim 27; wherein said display displays a cell, which is an object for reading out, with a cursor.

29. An apparatus for reading-out/collating a table document according to claim 27; wherein said display changes the display color for a cell as an object for reading out, to a display color different from those for other cells.

30. An apparatus for reading-out/collating a table document according to claim 14 further comprising;

a cursor position controlling module for
a) moving a cursor display position, said cursor position indicating a cell position where data is to be inputted to a cell position from which voice is being outputted in association with voice output by said voice synthesis module on a table document displayed on said display, and
b) also for stopping cursor movement in a case where voice output by said voice synthesis module is interrupted and then resuming movement of the cursor from the cell position where the cursor is currently present when voice output by said voice synthesis module is resumed;
wherein said voice synthesis module resumes voice output from the cell position from which voice output is resumed by said cursor position controlling module in a case where voice output is to be resumed.

31. An apparatus for reading-out/collating a table document according to claim 14; wherein said generation module inserts voice-generating data for generating effect sounds to a cell position which is blank in said voice-generating data.

32. An apparatus for reading-out/collating a table document according to claim 14; wherein said generation module generates voice-generating data, in a case where the same data is arrayed in the reading-out direction, for reading out the number of times when the same data is to be read out repeatedly.

33. An apparatus for reading-out/collating a table document said table document having a plurality of cells arrayed in rows and columns for inputting character string data thereto, comprising:

a display attribute setting module for setting display attributes restricting a display format of a character string in each cell of said table document;

a display attribute storing memory for storing therein display attributes set by said display attribute setting module correlating to each cell in said table document;

a generation module for generating voice-generating data based on input data in said table document according to a display format of a character string restricted by the display attributes stored in said display attribute storing memory; and a voice synthesis module for outputting voices according to said voice-generating data.

34. A method for reading-out/collating a table document said table document having plurality of cells arrayed in rows and columns for inputting character string data thereto, comprising:

a table document preparing step of preparing said table document correlating item information indicating an item allocated to each of said cells to data indicating contents of an item corresponding to the item information;

a generating step of correlating data indicating contents of said item between cells in a preset reading-out direction in a table document prepared in said table document preparing step and generating a series of voice-generating data according to the correlated input data; and a voice outputting step of outputting voices according to the voice-generating data generated in said generating step.

35. A method for reading-out/collating table document according to claim 34 further comprising:

a table document displaying step of displaying a table document with a plurality of cells for inputting therein data indicating a character string arrayed in rows and columns; and a range setting step of setting one or a plurality of ranges for phonetically reading m (m: natural number) rows×n (n: natural number) columns for each cell in the table document displayed in said table document displaying step.

36. A method for reading-out/collating table document comprising:

a read-out attribute setting step of setting read-out attributes restricting a way of reading out a character string for each cell in a table document with a plurality of cells for inputting therein data for indicating a character string arrayed in rows and columns;

a storing step of storing read-out attributes set in said read-out attribute setting step in correspondence to each cell in said table document;

a generating step of generating voice-generating data based on input data for said table document according to the way of reading out a character string restricted by the read-out attributes stored on a memory in said storing step; and a voice-outputting step of outputting voices according to the voice-generating data generated in said generating step.

37. A method for reading-out/collating table document according to claim 35 further comprising:

a table document displaying step of displaying a table document with a plurality of cells for inputting therein data indicating a character string arrayed in rows and columns; and a range setting step of setting one or a plurality of ranges for phonetically reading m (m: natural number) rows×n (n: natural number) columns for each cell in the table document displayed in said table document displaying step.

38. A method for reading-out/collating table document comprising:

a display attributes setting step of setting display attributes restricting a display format of a character string for each cell in a table document with a plurality of cells for inputting therein data indicating a character string arrayed in rows and columns;

a storing step of storing the display attributes set in correspondence to each cell in said table document in said display attributes setting step on a memory;

a generating step of generating voice-generating data based on input data in said table document according to a display format of a character string restricted by the display attributes stored on a memory in said storing step; and a voice outputting step of outputting voices according to the voice-generating data generated in said generating step.

39. A computer-readable recording medium; wherein a program is stored therein for making a computer execute a method according to claim 34.

* * * * *